US011678716B2

(12) United States Patent
Bartel et al.

(10) Patent No.: US 11,678,716 B2
(45) Date of Patent: Jun. 20, 2023

(54) FOOTWEAR PLATE

(71) Applicant: NIKE, Inc., Beaverton, OR (US)

(72) Inventors: Aaron Bartel, Beaverton, OR (US);
Stefan E. Guest, Portland, OR (US);
Sam Lacey, Portland, OR (US); Adam Thuss, Portland, OR (US); Christian Alexander Steinbeck, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 496 days.

(21) Appl. No.: 16/718,340

(22) Filed: Dec. 18, 2019

(65) Prior Publication Data

US 2020/0121021 A1  Apr. 23, 2020

Related U.S. Application Data

(63) Continuation of application No. 15/574,912, filed as application No. PCT/US2017/043160 on Jul. 20, 2017, now Pat. No. 10,548,368.

(Continued)

(51) Int. Cl.
*A43B 13/42* (2006.01)
*A43B 7/145* (2022.01)

(Continued)

(52) U.S. Cl.
CPC .............. *A43B 13/026* (2013.01); *A41D 1/08* (2013.01); *A42B 1/00* (2013.01); *A42B 1/02* (2013.01);

(Continued)

(58) Field of Classification Search
None
See application file for complete search history.

(56) References Cited

U.S. PATENT DOCUMENTS

| 859,382 A | 7/1907 | Hansen |
| 1,548,806 A | 8/1925 | Perry |

(Continued)

FOREIGN PATENT DOCUMENTS

| CN | 2633059 Y | 8/2004 |
| CN | 101090649 A | 12/2007 |

(Continued)

OTHER PUBLICATIONS

Composites World. "Composites 101: Fibers and resins". URL= https://www.compositesworld.com/articles/composites-101-fibers-and-resins. Accessed Jun. 5, 2020. Published Mar. 14, 2016. (Year: 2016).*

(Continued)

*Primary Examiner* — Jameson D Collier
(74) *Attorney, Agent, or Firm* — Honigman LLP; Matthew H. Szalach; Jonathan P. O'Brien

(57) ABSTRACT

A plate for an article of footwear includes a base layer, a first strand layer, and a second strand layer. The base layer has a peripheral edge defining a medial side and a lateral side extending between a heel region and a forefoot region. The first strand portion is attached to the base layer via first stitching that crosses over the first strand portion and penetrates the base layer at first attachment locations that are spaced apart from the first strand portion. The first strand portion further includes adjacent segments that form a first layer on the base layer. The second strand portion is disposed on the first layer to form a second layer on the first layer and is attached to the base layer via second stitching.

14 Claims, 28 Drawing Sheets

Related U.S. Application Data

(60) Provisional application No. 62/474,030, filed on Mar. 20, 2017, provisional application No. 62/364,585, filed on Jul. 20, 2016, provisional application No. 62/364,594, filed on Jul. 20, 2016.

(51) Int. Cl.
| | |
|---|---|
| *A43B 9/02* | (2006.01) |
| *A43B 13/02* | (2022.01) |
| *A43B 13/14* | (2006.01) |
| *A43B 13/12* | (2006.01) |
| *A43B 5/00* | (2022.01) |
| *A43B 5/02* | (2006.01) |
| *A43B 7/18* | (2006.01) |
| *A43B 13/04* | (2006.01) |
| *A43B 13/16* | (2006.01) |
| *A43B 13/18* | (2006.01) |
| *A43B 13/20* | (2006.01) |
| *A43B 13/22* | (2006.01) |
| *A43B 13/26* | (2006.01) |
| *A43B 13/32* | (2006.01) |
| *A43B 13/37* | (2006.01) |
| *A43B 21/24* | (2006.01) |
| *A43C 15/02* | (2006.01) |
| *A43C 15/16* | (2006.01) |
| *D05C 17/00* | (2006.01) |
| *A41D 1/08* | (2018.01) |
| *A42B 1/02* | (2006.01) |
| *A42B 3/06* | (2006.01) |
| *A43B 5/06* | (2022.01) |
| *A43B 7/148* | (2022.01) |
| *A43D 25/20* | (2006.01) |
| *A63B 71/12* | (2006.01) |
| *B29D 35/00* | (2010.01) |
| *B29D 35/12* | (2010.01) |
| *B32B 5/06* | (2006.01) |
| *B32B 5/12* | (2006.01) |
| *B32B 5/26* | (2006.01) |
| *B32B 27/12* | (2006.01) |
| *A42B 1/00* | (2021.01) |
| *A43B 23/02* | (2006.01) |
| *A43B 7/1445* | (2022.01) |
| *A42B 3/08* | (2006.01) |
| *B29K 105/08* | (2006.01) |

(52) U.S. Cl.
CPC ............ *A42B 3/06* (2013.01); *A42B 3/063* (2013.01); *A43B 5/00* (2013.01); *A43B 5/02* (2013.01); *A43B 5/06* (2013.01); *A43B 7/145* (2013.01); *A43B 7/148* (2013.01); *A43B 7/1445* (2013.01); *A43B 7/18* (2013.01); *A43B 9/02* (2013.01); *A43B 13/04* (2013.01); *A43B 13/12* (2013.01); *A43B 13/125* (2013.01); *A43B 13/127* (2013.01); *A43B 13/141* (2013.01); *A43B 13/143* (2013.01); *A43B 13/146* (2013.01); *A43B 13/16* (2013.01); *A43B 13/181* (2013.01); *A43B 13/186* (2013.01); *A43B 13/188* (2013.01); *A43B 13/189* (2013.01); *A43B 13/20* (2013.01); *A43B 13/22* (2013.01); *A43B 13/223* (2013.01); *A43B 13/26* (2013.01); *A43B 13/32* (2013.01); *A43B 13/37* (2013.01); *A43B 13/42* (2013.01); *A43B 21/24* (2013.01); *A43B 23/0225* (2013.01); *A43C 15/02* (2013.01); *A43C 15/161* (2013.01); *A43D 25/20* (2013.01); *A63B 71/1225* (2013.01); *B29D 35/0054* (2013.01); *B29D 35/122* (2013.01); *B29D 35/124* (2013.01); *B29D 35/126* (2013.01); *B32B 5/06* (2013.01); *B32B 5/12* (2013.01); *B32B 5/26* (2013.01); *B32B 27/12* (2013.01); *D05C 17/00* (2013.01); *A42B 3/08* (2013.01); *A63B 2071/125* (2013.01); *A63B 2071/1241* (2013.01); *A63B 2071/1258* (2013.01); *B29K 2105/08* (2013.01); *B32B 2260/023* (2013.01); *B32B 2260/046* (2013.01); *B32B 2262/02* (2013.01); *B32B 2262/106* (2013.01); *B32B 2262/14* (2013.01); *B32B 2307/56* (2013.01); *B32B 2437/02* (2013.01)

(56) References Cited

U.S. PATENT DOCUMENTS

| | | | |
|---|---|---|---|
| 2,124,819 A | 7/1938 | Halloran | |
| 2,203,929 A | 6/1940 | Shapiro | |
| 2,333,303 A | 11/1943 | Enos | |
| 2,391,564 A | 12/1945 | Gregg | |
| 2,408,736 A | 10/1946 | Codish | |
| 2,412,808 A * | 12/1946 | Goldstein | A43B 1/04 36/11.5 |
| 2,421,932 A | 6/1947 | Goldstein | |
| 2,430,497 A | 11/1947 | Enright | |
| 2,730,819 A * | 1/1956 | Foust | A43B 13/39 428/521 |
| 2,808,663 A | 10/1957 | Frieder | |
| 3,328,901 A | 7/1967 | Strickland | |
| 3,442,032 A | 5/1969 | Jonas | |
| 3,738,026 A | 6/1973 | Granger | |
| 4,079,568 A | 3/1978 | Wortman | |
| 4,271,608 A | 6/1981 | Tomuro | |
| 4,318,231 A | 3/1982 | Simoneau | |
| 4,439,934 A | 4/1984 | Brown | |
| 4,439,937 A | 4/1984 | Daswick | |
| 4,454,664 A | 6/1984 | MacNeil | |
| 4,561,195 A | 12/1985 | Onoda et al. | |
| 4,651,445 A | 3/1987 | Hannibal | |
| 4,651,448 A | 3/1987 | Chen | |
| 4,774,954 A | 10/1988 | Ibrahim | |
| 4,813,090 A | 3/1989 | Ibrahim | |
| 4,815,221 A | 3/1989 | Diaz | |
| 4,821,430 A | 4/1989 | Flemming et al. | |
| 4,922,636 A | 5/1990 | Chen | |
| 4,955,148 A | 9/1990 | Padilla | |
| 5,025,573 A | 6/1991 | Giese et al. | |
| 5,052,130 A | 10/1991 | Barry et al. | |
| 5,142,797 A | 9/1992 | Cole, III | |
| 5,401,564 A | 3/1995 | Lee et al. | |
| 5,406,723 A | 4/1995 | Okajima | |
| 5,529,826 A | 6/1996 | Tailor et al. | |
| 5,720,118 A | 2/1998 | Mayer et al. | |
| 5,918,338 A | 7/1999 | Wong | |
| 5,932,336 A | 8/1999 | Allen et al. | |
| 6,199,303 B1 | 3/2001 | Luthi et al. | |
| 6,389,713 B1 | 5/2002 | Kita | |
| 6,594,922 B1 | 7/2003 | Mansfield et al. | |
| 6,684,532 B2 | 2/2004 | Greene et al. | |
| 7,013,581 B2 | 3/2006 | Greene et al. | |
| 7,013,583 B2 | 3/2006 | Greene et al. | |
| 7,062,865 B1 | 6/2006 | Nordt, III | |
| 7,401,422 B1 | 7/2008 | Scholz et al. | |
| 7,421,808 B2 | 9/2008 | Baier et al. | |
| 7,437,838 B2 | 10/2008 | Nau | |
| 7,832,117 B2 | 11/2010 | Auger et al. | |
| 7,886,460 B2 | 2/2011 | Teteriatnikov et al. | |
| 7,934,327 B2 | 5/2011 | Gebhard | |
| 7,941,940 B2 | 5/2011 | Teteriatnikov et al. | |
| 8,256,145 B2 | 9/2012 | Baucom et al. | |
| 8,381,416 B2 | 2/2013 | Geer et al. | |
| 8,850,718 B2 | 10/2014 | Lubart | |
| 9,610,746 B2 | 4/2017 | Wardlaw et al. | |
| 9,930,934 B2 | 4/2018 | Cook et al. | |

(56) References Cited

U.S. PATENT DOCUMENTS

| | | |
|---|---|---|
| 10,743,606 B2 | 8/2020 | Bartel et al. |
| 10,758,005 B2 | 9/2020 | Bartel et al. |
| 10,952,498 B2 | 3/2021 | Bruce et al. |
| 11,089,834 B2 | 8/2021 | Chambers et al. |
| 2002/0011146 A1 | 1/2002 | Vaz |
| 2002/0152642 A1 | 10/2002 | Chu |
| 2002/0178615 A1 | 12/2002 | Saillet et al. |
| 2003/0051372 A1 | 3/2003 | Lyden |
| 2003/0069807 A1 | 4/2003 | Lyden |
| 2003/0121179 A1 | 7/2003 | Chen |
| 2003/0221337 A1 | 12/2003 | Farys et al. |
| 2004/0123495 A1 | 7/2004 | Greene et al. |
| 2004/0197529 A1 | 10/2004 | Cadamuro et al. |
| 2004/0205983 A1 | 10/2004 | Talbott |
| 2005/0022425 A1 | 2/2005 | Brown |
| 2005/0108897 A1 | 5/2005 | Aveni |
| 2005/0248749 A1 | 11/2005 | Kiehn et al. |
| 2005/0262737 A1 | 12/2005 | Vattes |
| 2007/0017124 A1 | 1/2007 | Koo et al. |
| 2007/0043630 A1 | 2/2007 | Lyden |
| 2009/0090031 A1 | 4/2009 | Jung |
| 2009/0094858 A1 | 4/2009 | Ungari et al. |
| 2009/0288312 A1 | 11/2009 | Dua |
| 2010/0263234 A1 | 10/2010 | Teteriatnikov et al. |
| 2010/0263239 A1 | 10/2010 | Biancucci et al. |
| 2010/0275471 A1 | 11/2010 | Teteriatnikov et al. |
| 2010/0281716 A1 | 11/2010 | Luthi et al. |
| 2010/0307028 A1 | 12/2010 | Teteriatnikov et al. |
| 2011/0078923 A1 | 4/2011 | Bartholet et al. |
| 2011/0113649 A1 | 5/2011 | Merritt et al. |
| 2011/0119959 A1 | 5/2011 | Bodner |
| 2011/0131831 A1 | 6/2011 | Peyton et al. |
| 2012/0137544 A1 | 6/2012 | Rosa et al. |
| 2012/0174432 A1 | 7/2012 | Peyton |
| 2012/0198723 A1 | 8/2012 | Borisov |
| 2012/0266500 A1 | 10/2012 | Cobb |
| 2012/0297641 A1 | 11/2012 | Pfister |
| 2013/0125421 A1 | 5/2013 | Stegmaier et al. |
| 2014/0026444 A1 | 1/2014 | Howley et al. |
| 2014/0059895 A1 | 3/2014 | Arciuolo |
| 2014/0134378 A1 | 5/2014 | Downs et al. |
| 2014/0223673 A1 | 8/2014 | Wardlaw et al. |
| 2014/0259462 A1 | 9/2014 | Taylor et al. |
| 2015/0040428 A1 | 2/2015 | Davis et al. |
| 2015/0107133 A1 | 4/2015 | Ganuza et al. |
| 2015/0113829 A1 | 4/2015 | Kodad |
| 2015/0196082 A1 | 7/2015 | Van Atta |
| 2015/0196087 A1 | 7/2015 | Meschter et al. |
| 2016/0029741 A1 | 2/2016 | Foxen |
| 2016/0031164 A1 | 2/2016 | Downs et al. |
| 2016/0058107 A1 | 3/2016 | Walker et al. |
| 2016/0114546 A1 | 4/2016 | Yang |
| 2016/0152825 A1 | 6/2016 | Lomoelder et al. |
| 2016/0206016 A1 | 7/2016 | Cross |
| 2017/0006962 A1 | 1/2017 | Tanabe et al. |
| 2017/0071291 A1 | 3/2017 | Follet et al. |
| 2017/0095033 A1 | 4/2017 | Farina et al. |
| 2017/0095034 A1 | 4/2017 | Dupre et al. |
| 2017/0157893 A1 | 6/2017 | Simmons et al. |
| 2017/0196305 A1 | 7/2017 | Sarnes et al. |
| 2017/0196306 A1 | 7/2017 | Arciuolo |
| 2017/0202309 A1 | 7/2017 | Sterman et al. |
| 2017/0368722 A1 | 12/2017 | Jacobsen |
| 2018/0020762 A1 | 1/2018 | Jamison |
| 2018/0177261 A1 | 6/2018 | Amis et al. |
| 2018/0192736 A1 | 7/2018 | Luedecke |
| 2019/0223546 A1 | 7/2019 | Bartel et al. |
| 2019/0225784 A1 | 7/2019 | Farr et al. |
| 2019/0313733 A1 | 10/2019 | Bartel et al. |

FOREIGN PATENT DOCUMENTS

| | | |
|---|---|---|
| CN | 101166435 A | 4/2008 |
| CN | 101516222 A | 8/2009 |
| CN | 102711543 A | 10/2012 |
| CN | 202950081 U | 5/2013 |
| CN | 103813730 A | 5/2014 |
| CN | 105120700 A | 12/2015 |
| CN | 105239261 A | 1/2016 |
| CN | 105361343 A | 3/2016 |
| CN | 105682500 A | 6/2016 |
| CN | 106102501 A | 11/2016 |
| DE | 2108204 A1 | 8/1972 |
| DE | 2736974 A1 | 3/1979 |
| DE | 4210292 A1 | 9/1993 |
| EP | 0931470 A2 | 7/1999 |
| EP | 1249184 A1 | 10/2002 |
| EP | 1405577 A2 | 4/2004 |
| EP | 1857005 A1 | 11/2007 |
| EP | 1869989 A1 | 12/2007 |
| EP | 2105058 A1 | 9/2009 |
| EP | 2462827 A2 | 6/2012 |
| EP | 3075277 A2 | 10/2016 |
| EP | 3349608 A1 | 7/2018 |
| JP | 2000106905 A | 4/2000 |
| JP | 2007268025 A | 10/2007 |
| JP | 5649151 B1 | 1/2015 |
| KR | 100912386 B1 | 8/2009 |
| KR | 10-2011-0004572 A | 1/2011 |
| KR | 20130000467 U | 1/2013 |
| WO | WO-1991/01660 A1 | 2/1991 |
| WO | WO-1994/21454 A1 | 9/1994 |
| WO | WO-2000/41544 A2 | 7/2000 |
| WO | WO-2009069871 A1 | 6/2009 |
| WO | WO-2011043507 A1 | 4/2011 |
| WO | WO-2016004360 A1 | 1/2016 |
| WO | WO-2016179265 A1 | 11/2016 |
| WO | WO-2017058419 A1 | 4/2017 |
| WO | WO-2018017890 A1 | 1/2018 |
| WO | WO-2018017893 A1 | 1/2018 |

OTHER PUBLICATIONS

European Patent Office as the International Searching Authority, International Search Report and Written Opinion for Application No. PCT/US2016/030759, dated Jul. 12, 2016.

Stefanyshyn, D.J. et al., "Energy Aspects Associated with Sports Shoes," Sportverl Sportschad, vol. 14, pp. 82-89, Georg Thieme Verlag, Stuttgart, DE, 2000.

Stefanyshyn, D.J. et al., "Influence of a midsole bending stiffness on joint energy and jump height performance," Medicine & Science in Sports & Exercise, vol. 32, No. 2, pp. 471-476, American College of Sports Medicine, 2000.

Stefanyshyn, D.J. et al., "Mechanical Energy Contribution of the Metatarsophalangeal Join to Running and Sprinting," J. Biomechanics, vol. 30, Nos. 11-12, pp. 1081-1085, Elsevier Science Ltd, 1997.

Nigg, Benno M. et al., "Shoes Inserts and Orthotics for Sport and Physical Activities," Medicine & Science in Sports & Exercise, vol. 31, Issue 7, pp. S421-S428, Jul. 1999.

Roy, Jean-Pierre R. et al., "Shoes Midsole Longitudinal Bending Stiffness and Running Economy, Joint Energy, and EMG," Medicine & Science in Sports & Excercise, vol. 38, No. 3, pp. 562-569, American College of Sports Medicine, 2006.

European Patent Office as the International Searching Authority, International Search Report and Written Opinion for Application No. PCT/US2016/048859, dated Nov. 7, 2016.

European Patent Office as the International Searching Authority, International Search Report and Written Opinion for Application No. PCT/US2016/048854, dated Nov. 25, 2016.

European Patent Office as the International Searching Authority, International Search Report and Written Opinion for Application No. PCT/US2017/043170, dated Oct. 27, 2017.

European Patent Office as the International Searching Authority, International Search Report and Written Opinion for Application No. PCT/US2017/043164, dated Oct. 24, 2017.

European Patent Office as the International Searching Authority, International Search Report and Written Opinion for Application No. PCT/US2017/043160, dated Oct. 24, 2017.

(56) References Cited

OTHER PUBLICATIONS

European Patent Office as the International Searching Authority, International Search Report and Written Opinion for Application No. PCT/US2017/043167, dated Oct. 27, 2017.
European Patent Office (ISA), International Preliminary Report on Patentabilty for Application No. PCT/2017/043160, dated Jul. 24, 2018.
European Patent Office (ISA), International Preliminary Report on Patentabilty for Application No. PCT/2017/043164, dated Jul. 24, 2018.
European Patent Office (ISA), International Preliminary Report on Patentabilty for Application No. PCT/2017/043170, dated Jul. 24, 2018.
European Patent Office (ISA), International Preliminary Report on Patentabilty for Application No. PCT/2017/043167, dated Jul. 24, 2018.
United States Patent and Trademark Office, Office Action for U.S. Appl. No. 15/248,051, dated Dec. 10, 2018.
European Patent Office (ISA), International Preliminary Report on Patentability for International Application No. PCT/US2016/048854, dated Apr. 12, 2018.
European Patent Office (ISA), International Preliminary Report on Patentability for International Application No. PCT/US2016/048859, dated Apr. 12, 2018.
United States Patent and Trademark Office, Notice of Allowance for U.S. Appl. No. 15/574,933, dated Mar. 4, 2019.
United States Patent and Trademark Office, Non-Final Office Action for U.S. Appl. No. 15/574,912, dated Jun. 6, 2019.
Japan Patent Office, Notice of Reasons for Rejection for JP Application No. 2018-516734, dated Jun. 3, 2019.
Korean Intellectual Property Office, Office Action for KR Application No. 10-2018-7012450, dated Jun. 19, 2019.
Korean Intellectual Property Office, Office Action for KR Application No. 10-2018-7012449, dated Jun. 19, 2019.
European Patent Office (ISA), International Search Report and Written Opinion for PCT Application No. PCT/US2019/027470, dated Jul. 25, 2019.
European Patent Office (ISA), International Search Report and Written Opinion for PCT Application No. PCT/US2019/027480, dated Aug. 9, 2019.
Japan Patent Office, Notice of Reasons for Rejection for JP Application No. 2018-516733, dated Jun. 17, 2019.
United States Patent and Trademark Office, Office Action for U.S. Application No. 16/318,735, dated Jul. 9, 2019.
Japan Patent Office, Notice of Reasons for Rejection for JP Application No. 2018-516734, dated Dec. 10, 2019.
United States Patent and Trademark Office, Notice of Allowance and Fee(s) Due for U.S. Appl. No. 16/384,154, dated Jan. 21, 2020.
United States Patent and Trademark Office, Non-Final Office Action for U.S. Appl. No. 15/904,664, dated Jan. 2, 2020.
United States Patent and Trademark Office, Non-Final Office Action for U.S. Appl. No. 15/248,051, dated Jan. 2, 2020.
United States Patent and Trademark Office, Notice of Allowance and Fee(s) Due for U.S. Appl. No. 15/904,568, dated Dec. 10, 2019.
Korean Intellectual Property Office, Office Action for Application No. 10-2019-7004900, dated Feb. 17, 2020.
Korean Intellectual Property Office, Office Action for Application No. 10-2018-7012450, dated Jan. 30, 2020.
United States Patent and Trademark Office, Non-Final Office Action for U.S. Appl. No. 15/248,051, dated May 15, 2018.
"Youngs Modulus is a Measure of Stiffness". ChristineDeMerchant. com. URL=https://www.christinedemerchant.com/youngsmodulus.html. Accessed Dec. 4, 2018. (Year: 2012).
United States Patent and Trademark Office, Non-Final Office Action for U.S. Appl. No. 15/248,059, dated Jun. 6, 2018.
Japan Patent Office, Notice of Reasons for Rejection for JP Application No. 2018-516733, dated Feb. 28, 2020.
European Patent Office, Communication pursuant to Article 94(3) EPC for EP Application No. 16760309.1, dated Mar. 5, 2020.
Korean Intellectual Property Office, Office Action for Application No. 10-2019-7004898, dated Feb. 17, 2020.
Korean Intellectual Property Office, Office Action for Application No. 10-2019-7004899, dated Feb. 17, 2020.
Korean Intellectual Property Office, Office Action for Application No. 10-2018-7012449, dated Feb. 24, 2020.
China National Intellectual Property Administration, Notification of the First Office Action and Search Report for No. 201680064966.9, dated Mar. 27, 2020.
China National Intellectual Property Administration, Notification of the First Office Action and Search Report for No. 201680064951.2, dated Mar. 27, 2020.
CompositesWord. "Composites 101: Fibers and resins". URL=https://www.compositesworld.com/articles/composites-101-fibers-and-resins. Accessed Jun. 5, 2020. Published Mar. 14, 2016. (Year 2016).
United States Patent and Trademark Office, Non-Final Office Action for U.S. Appl. No. 15/905,036, dated Jun. 10, 2020.
Japan Patent Office, Notice of Reasons for Rejection for JP Application No. 2018-516734, dated Aug. 4, 2020.
China National Intellectual Property Administration, Notification of First Office Action for CN Application No. 201780044388.7, dated Jun. 30, 2020.
China National Intellectual Property Administration, Notification of First Office Action for CN Application No. 201780044468.2, dated Jul. 1, 2020.
China Patent Office, Office Action dated May 21, 2021 for Application No. 201980007331.9.
United States Patent and Trademark Office, Non-Final Office Action for U.S. Appl. No. 17/231,349 dated Jun. 15, 2021.
United States Patent and Trademark Office, Non-Final Office Action for U.S. Appl. No. 17/231,617 dated Oct. 4, 2021.
Japanese Patent Office, Office Action for Application No. 2020-180295 dated Nov. 16, 2021.
China National Intellectual Property Administration, Second Office Action for application No. 201980007331.9 dated Nov. 25, 2021.
United States Patent and Trademark Office, Non-Final Office Action for U.S. Appl. No. 16/383,116, dated Sep. 18, 2020.
United States Patent and Trademark Office, Final Office Action for U.S. Appl. No. 16/383,116, dated Jan. 27, 2021.
United States Patent and Trademark Office, Non-Final Office Action for U.S. Appl. No. 16/383,116, dated Jun. 16, 2021.
Mexico Patent Office, Office Action for application No. MX/a/2018/004048 dated Jul. 27, 2021.
Japan Patent Office, Office Action for application No. 2020-180295 dated Nov. 16, 2021.
China Patent Office, Second Office Action for CN Application No. 202110225763.6 dated Jun. 15, 2022.
China National Intellectual Property Administration, First Office Action for application No. 202110857378.3 dated May 6, 2022.
China National Intellectual Property Administration, First Office Action for application No. 202110857946.X dated May 7, 2022.
China National Intellectual Property Administration, Second Office Action for Application No. 202110533408.5 dated Jul. 12, 2022.
European Patent Office, Extended European Patent Search Report for 21200615.9 dated Feb. 14, 2022.
United States Patent and Trademark Office, Non-Final Office Action for U.S. Appl. No. 17/231,220 dated Jul. 5, 2022.
United States Patent and Trademark Office, Non-Final Office Action for U.S. Appl. No. 17/231,274 dated Jul. 5, 2022.

* cited by examiner

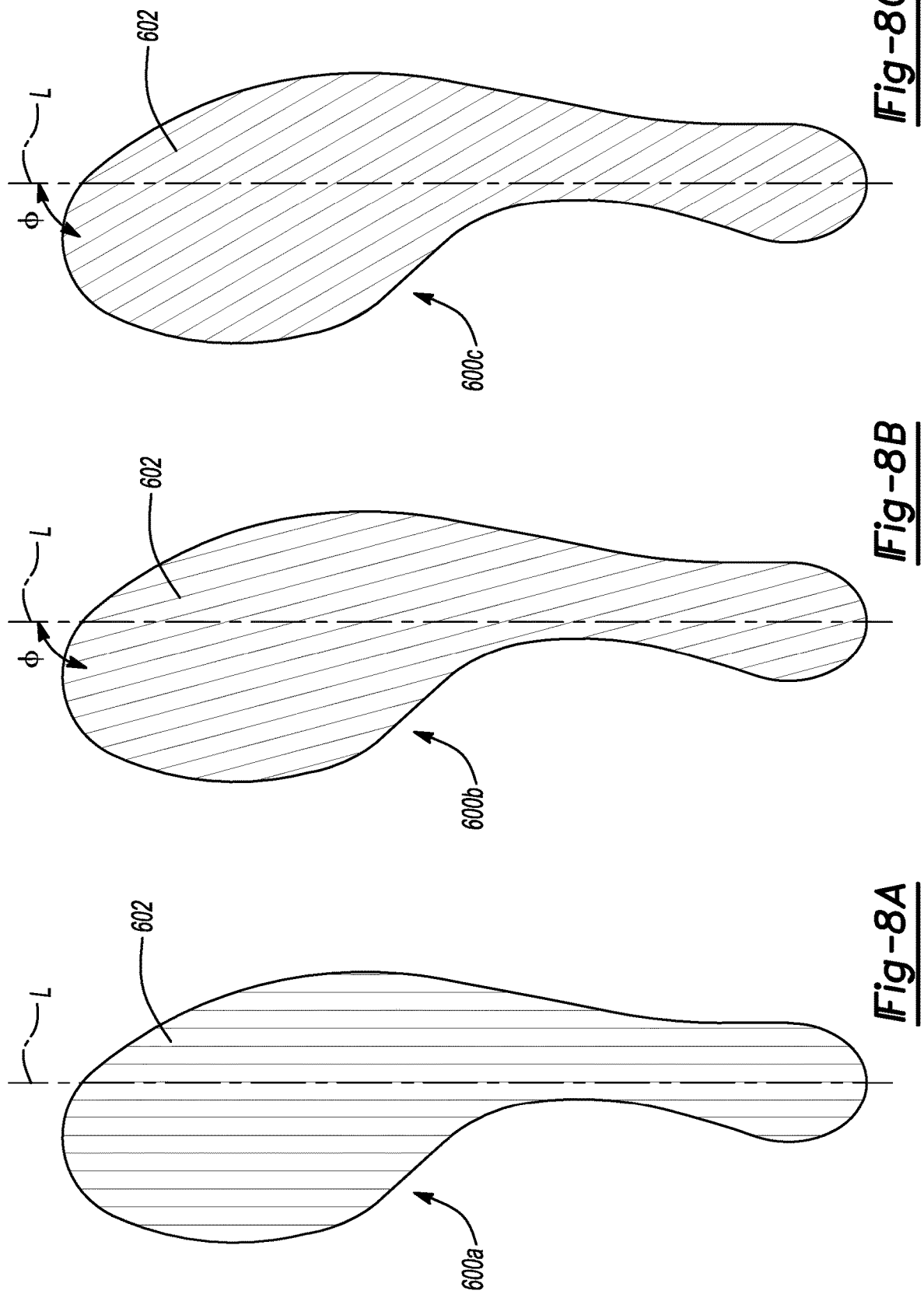

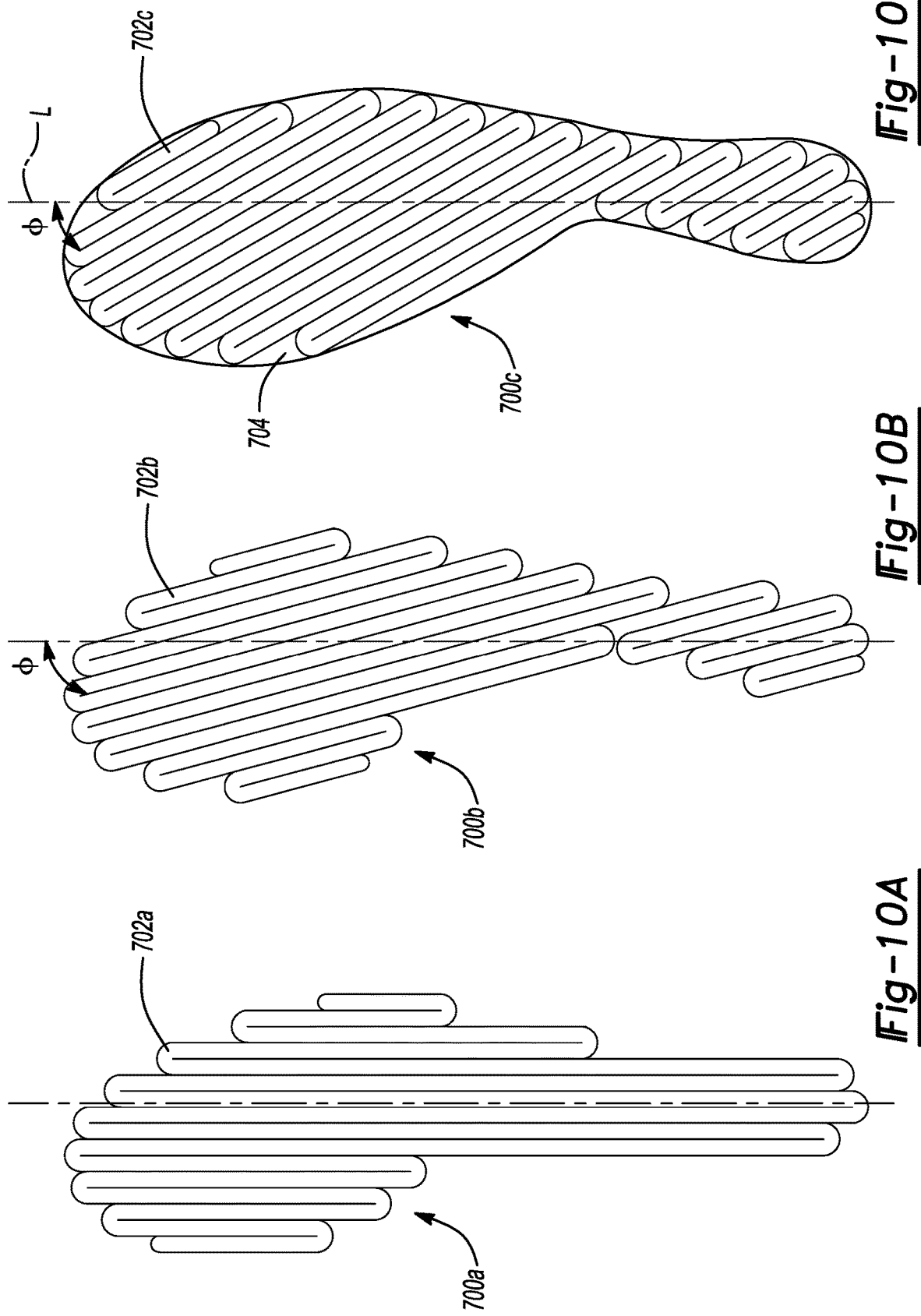

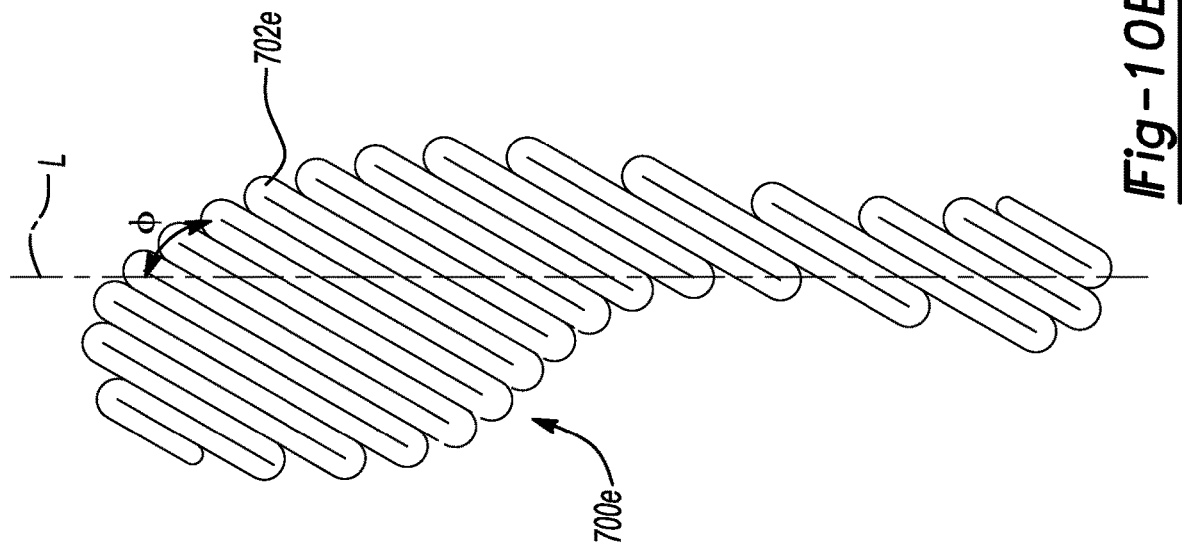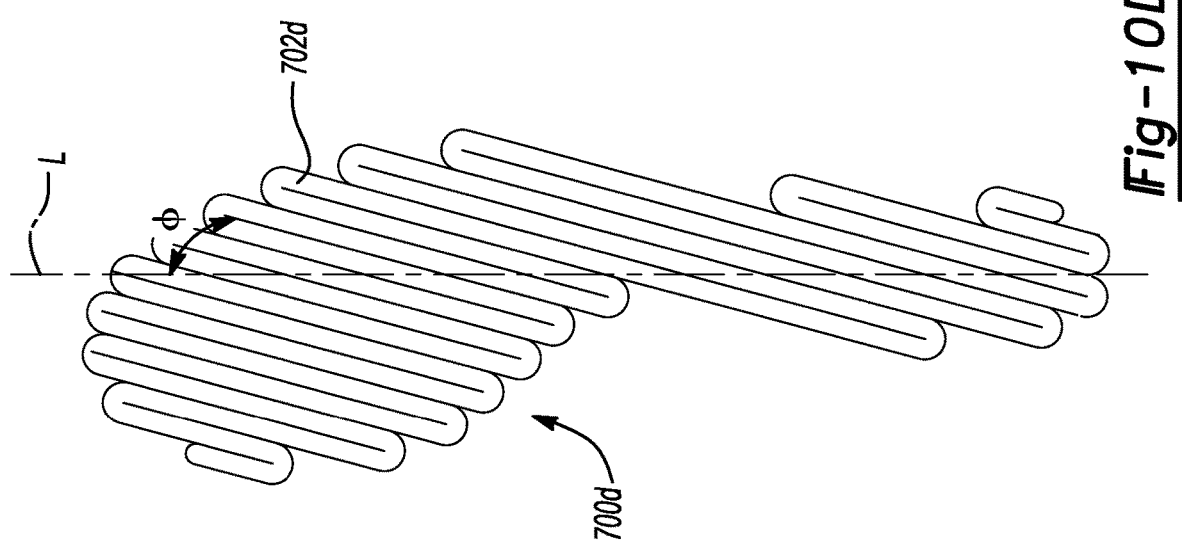

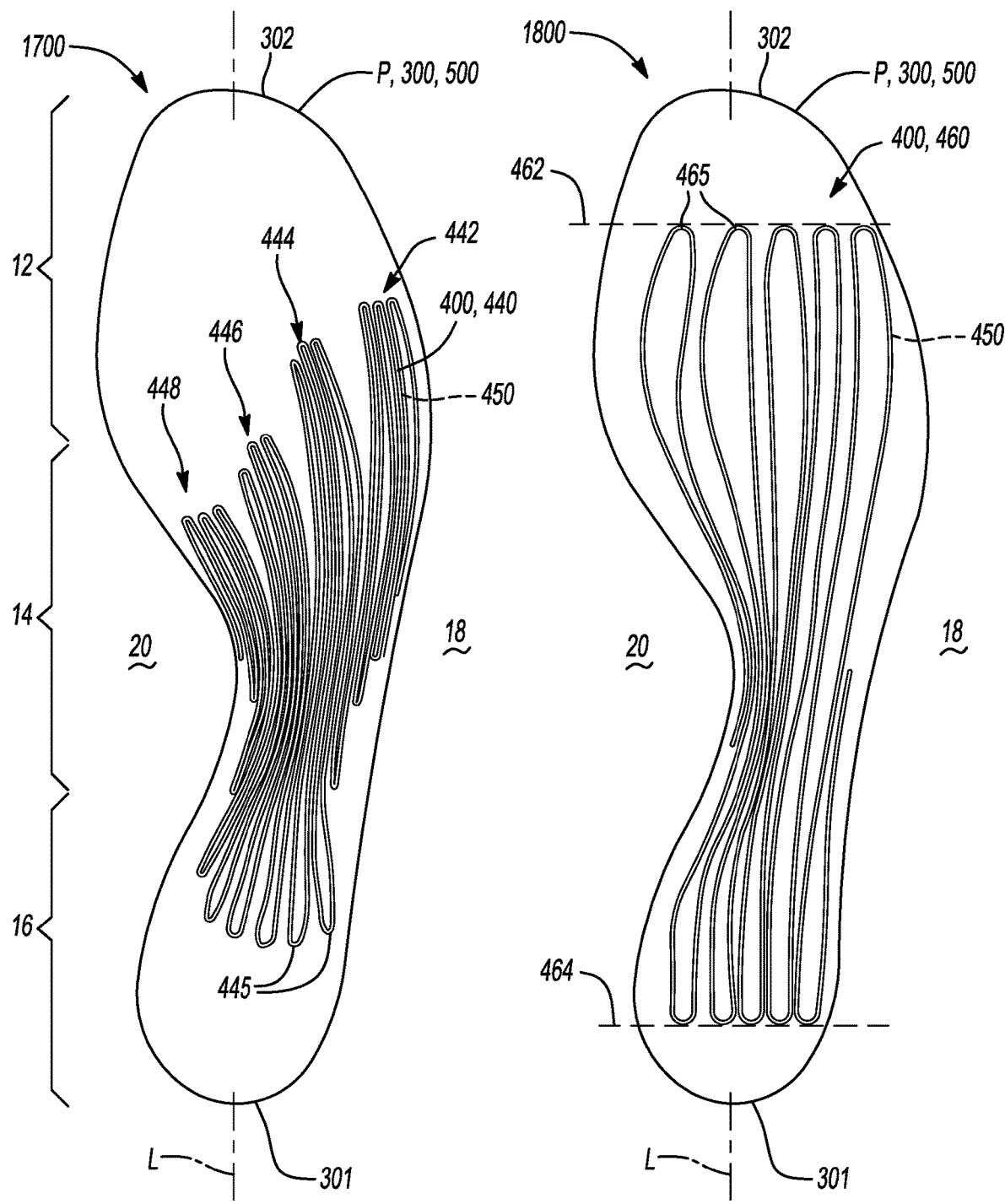

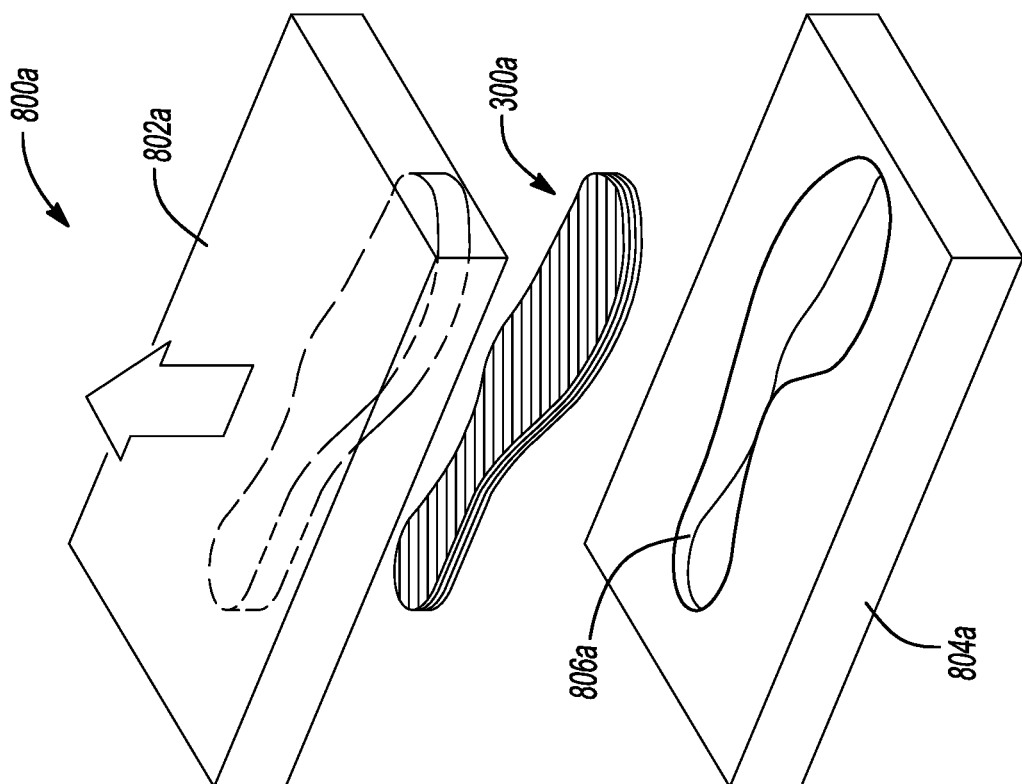
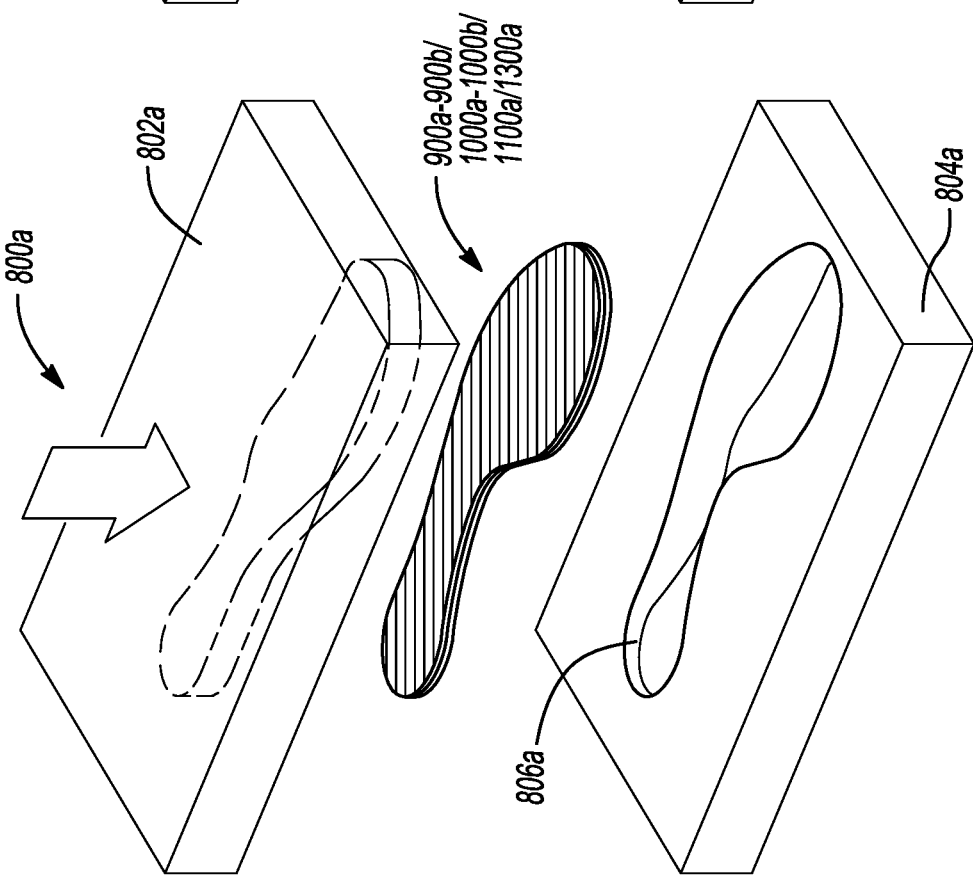

FOOTWEAR PLATE

CROSS REFERENCE TO RELATED APPLICATIONS

This application is a continuation of U.S. application Ser. No. 15/574,912, filed Nov. 17, 2017, which is the national phase of International Application No. PCT/US2017/043160, filed Jul. 20, 2017, which claims priority to U.S. Provisional Application Ser. No. 62/364,594, filed Jul. 20, 2016, to U.S. Provisional Application Ser. No. 62/364,585, filed Jul. 20, 2016, and to U.S. Provisional Application Ser. No. 62/474,030, filed Mar. 20, 2017, which are hereby incorporated by reference in their entireties.

TECHNICAL FIELD

The present disclosure relates to articles of footwear including sole structures incorporating footwear plates.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole or a sockliner located within a void proximate to the bottom portion of the upper.

The metatarsophalangeal (MTP) joint of the foot is known to absorb energy as it flexes through dorsiflexion during running movements. As the foot does not move through plantarflexion until the foot is pushing off of a ground surface, the MTP joint returns little of the energy it absorbs to the running movement and, thus, is known to be the source of an energy drain during running movements. Embedding flat and rigid plates having longitudinal stiffness within a sole structure is known to increase the overall stiffness thereof. While the use of flat plates stiffens the sole structure for reducing energy loss at the MTP joint by preventing the MTP joint from absorbing energy through dorsiflexion, the use of flat plates also adversely increases a mechanical demand on ankle plantar flexors of the foot, thereby reducing the efficiency of the foot during running movements, especially over longer distances.

DRAWINGS

The drawings described herein are for illustrative purposes only of selected configurations and are not intended to limit the scope of the present disclosure.

FIGS. 8A-8E show various prepreg fiber sheets used in forming a footwear plate in accordance with the principles of the present disclosure;

FIGS. 10A-10E show various layers of fiber strands used in forming a footwear plate in accordance with the principles of the present disclosure;

FIG. 17 is a top view of a fourth tow of fibers used to form a corresponding layer of a footwear plate in accordance with principles of the present disclosure;

FIG. 18 is a top view of a fifth tow of fibers used to form a corresponding layer of a footwear plate in accordance with principles of the present disclosure;

Figure 22:
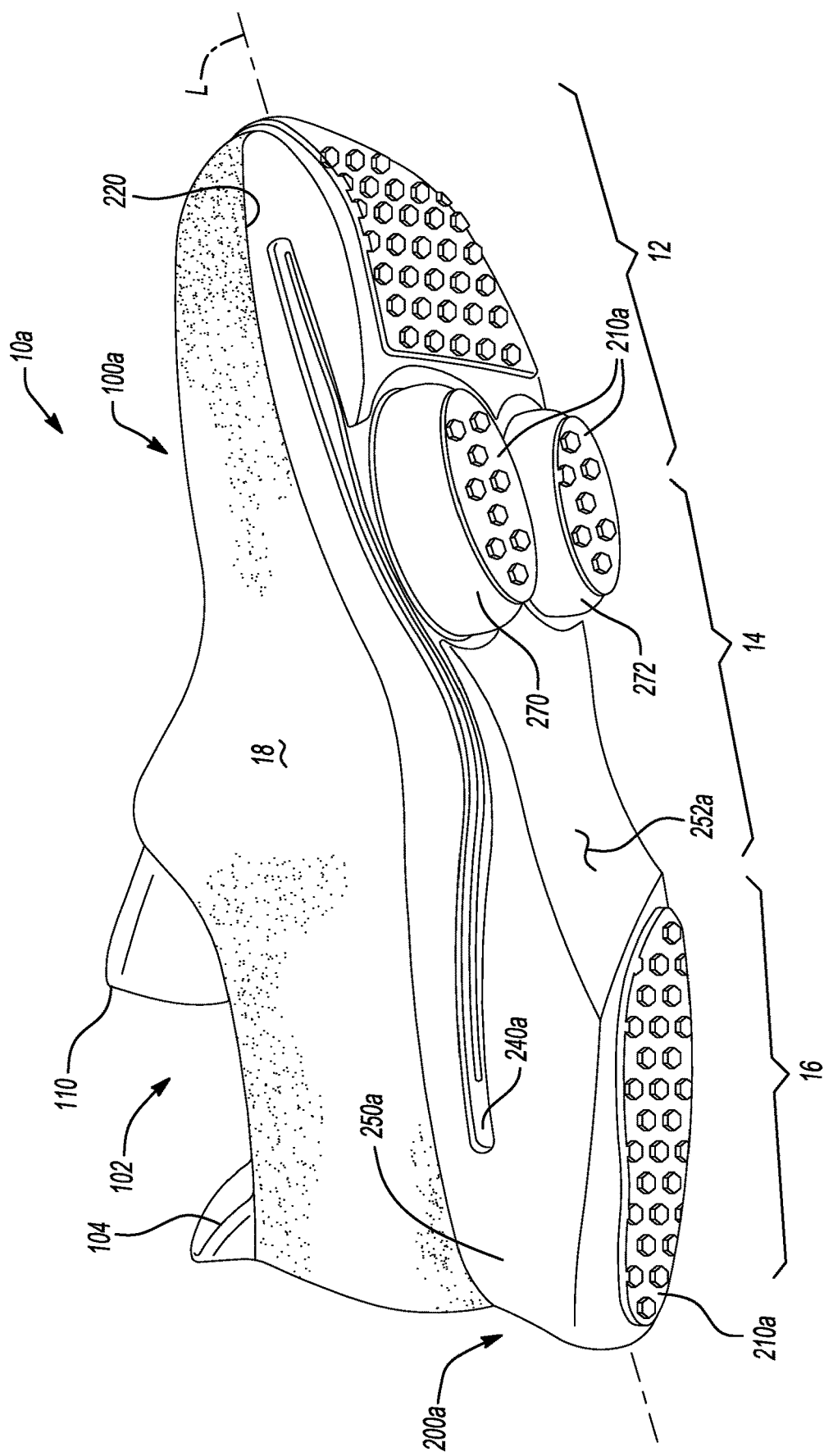
FIG. 22 is a bottom perspective view of an article of footwear in accordance with principles of the present disclosure.

FIG. 30 is a perspective view of a mold for use in forming the footwear plate of FIG. 22 in accordance with the principles of the present disclosure, the mold shown in conjunction with a stack of fibers prior to being formed into the footwear plate; and FIG. 31 is a perspective view of a mold for use in forming the footwear plate of FIG. 22 in accordance with the principles of the present disclosure, the mold shown in conjunction with the formed footwear plate.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a method of forming a plate for an article of footwear. The method includes applying a first strand portion to a base layer including positioning first segments of the first strand portion on the base layer adjacent to one another to form a first layer on the base layer. The method also includes removing portions of the first segments to define an outer edge of the plate and applying at least one of heat and pressure to the first strand portion and to the base layer to conform the first strand portion and the base layer to a predetermined shape.

Implementations of the disclosure may include one or more of the following optional features. In some implementations, removing portions of the first segments includes severing the first strand portion at a first end of each first segment and severing the first strand portions at a second end of each first segment located at an opposite end of the respective first strand portions than the first end. Removing portions of the first segments may include removing loops of the first strand portion connecting adjacent first segments.

In some examples, applying the first strand portion to a base layer may include applying the first strand portion to a second layer having a plurality of fibers and/or to a second layer formed from unidirectional tape. Applying the first strand portion to a base layer may also include applying the first strand portion to a substrate. Applying the first strand portion to a base layer may further include attaching the first strand portion to the base layer via stitching. Applying the first strand portion to a base layer may also include applying a continuous strand.

In some implementations, applying a continuous strand of the first strand portion includes forming loops of the first strand portion. Removing portions of the first segments may include removing the loops between adjacent first segments of the first strand portion. The method may also include forming the first strand portion from a first tow of fibers. Forming the first strand portion from a first tow of fibers may include forming the first strand portion from at least one of carbon fibers, boron fibers, glass fibers, and polymeric fibers.

Applying the first strand portion to a base layer may include positioning adjacent first segments closer to one another across a width of the plate between a medial side and a lateral side at a midfoot region of the plate than at a forefoot region of the plate. In some examples, applying the first strand portion to a base layer includes positioning adjacent first segments closer to one another across a width of the plate between a medial side and a lateral side at a midfoot region of the plate than at a heel region of the plate. The method further includes incorporating the plate into an article of footwear.

Another aspect of the disclosure provides a method of forming a plate for an article of footwear. The method includes applying a first strand portion to a base layer including positioning adjacent first segments of the first strand portion closer to one another across a width of the plate between a medial side and a lateral side at a midfoot region of the plate than at a heel region of the plate to form a first layer on the base layer. The method also includes applying at least one of heat and pressure to the first strand portion and to the base layer to conform the first strand portion and the base layer to a predetermined shape.

Implementations of the disclosure may include one or more of the following optional features. In some implementations, the method includes removing portions of the first segments to define an outer edge of the plate. Removing portions of the first segments may include severing the first strand portion at a first end of each first segment and severing the first strand portions at a second end of each first segment located at an opposite end of the respective first strand portions than the first end. Removing portions of the first segments may also include removing loops of the first strand portion connecting adjacent first segments.

In some examples, applying the first strand portion to a base layer includes applying the first strand portion to a second layer having a plurality of fibers and/or to a second layer formed from unidirectional tape. Applying the first strand portion to a base layer may also include applying the first strand portion to a substrate. Applying the first strand portion to a base layer may also include attaching the first strand portion to the base layer via stitching. In some examples, applying the first strand portion to a base layer includes applying a continuous strand. Applying a continuous strand of the first strand portion may include forming loops of the first strand portion.

In some implementations, the method includes removing the loops between adjacent first segments of the first strand portion to define an outer edge of the plate. The method may also include forming the first strand portion from a first tow of fibers. Forming the first strand portion from a first tow of fibers may include forming the first strand portion from at least one of carbon fibers, boron fibers, glass fibers, and polymeric fibers. Applying the first strand portion to a base layer may include positioning adjacent first segments closer to one another across the width of the plate between the medial side and the lateral side at the midfoot region of the plate than at a forefoot region of the plate. The method further includes incorporating the plate into an article of footwear.

Yet another aspect of the disclosure provides a method of forming a plate for an article of footwear. The method includes applying a first strand portion to a base layer including positioning adjacent first segments of the first strand portion closer to one another across a width of the plate between a medial side and a lateral side at a midfoot region of the plate than at a forefoot region of the plate to form a first layer on the base layer. The method also includes applying at least one of heat and pressure to the first strand portion and to the base layer to conform the first strand portion and the base layer to a predetermined shape.

Implementations of the disclosure may include one or more of the following optional features. In some implementations, the method includes removing portions of the first segments to define an outer edge of the plate. Removing portions of the first segments may include severing the first strand portion at a first end of each first segment and severing the first strand portions at a second end of each first segment located at an opposite end of the respective first strand portions than the first end. Removing portions of the first segments may further include removing loops of the first strand portion connecting adjacent first segments.

In some examples, applying the first strand portion to a base layer includes applying the first strand portion to a second layer having a plurality of fibers and/or to a second layer formed from unidirectional tape. Applying the first strand portion to a base layer may include applying the first strand portion to a substrate. Applying the first strand portion to a base layer may also include attaching the first strand portion to the base layer via stitching. Applying the first strand portion to a base layer may further include applying a continuous strand. Applying a continuous strand of the first strand portion may include forming loops of the first strand portion.

In some implementations, the method includes removing the loops between adjacent first segments of the first strand portion to define an outer edge of the plate. The method may also include forming the first strand portion from a first tow of fibers. Forming the first strand portion from a first tow of fibers may include forming the first strand portion from at least one of carbon fibers, boron fibers, glass fibers, and polymeric fibers. Applying the first strand portion to a base layer may include positioning adjacent first segments closer to one another across the width of the plate between the medial side and the lateral side at the midfoot region of the plate than at a heel region of the plate. The method further includes incorporating the plate into an article of footwear.

Yet another aspect of the disclosure provides a plate for an article of footwear. The plate includes a first layer including first high tensile strength fibers, a second layer including second high tensile strength fibers, and a third layer including third high tensile strength fibers. The plate also includes a polymeric resin consolidating the first high tensile strength fibers, the second high tensile strength fibers, and the third high tensile strength fibers. The plate includes a forefoot region, a heel region, and a midfoot region disposed between the forefoot region and the heel region. The forefoot region includes a stiffness of about 80 N/mm to about 90 N/mm.

Implementations of the disclosure may include one or more of the following optional features. In some implementations, a stiffness of the heel region is about 20 N/mm to about 30 N/mm. A stiffness of the midfoot region may be about 75 N/mm to about 120 N/mm. In other implementations, a stiffness of the heel region is about 50 N/mm to about 60 N/mm. A stiffness of the midfoot region may be about 20 N/mm to about 55 N/mm.

In some examples, at least one of the first high tensile strength fibers, the second high tensile strength fibers, and the third high tensile strength fibers include at least one of carbon fibers, boron fibers, glass fibers, and polymeric fibers. The polymeric resin may be a thermoset resin or a thermoplastic resin.

In some configurations, at least one of the first high tensile strength fibers, the second high tensile strength fibers, and the third high tensile strength fibers are applied in a unidirectional tape. In other configurations, at least one of the first high tensile strength fibers, the second high tensile strength fibers, and the third high tensile strength fibers are applied as a strand of fibers stitched down to a base layer. Additionally or alternatively, at least two of the first high tensile strength fibers, the second high tensile strength fibers, and the third high tensile strength fibers may be applied in a unidirectional tape and the other the first high tensile strength fibers, the second high tensile strength fibers, and the third high tensile strength fibers may be applied as a strand of fibers stitched down to a base.

In some examples, at least one of the first high tensile strength fibers, the second high tensile strength fibers, and the third high tensile strength fibers are applied as a strand of fibers stitched down to a base layer. Here, adjacent segments of the strand of fibers may be positioned closer to one another across a width of the plate between a medial side and a lateral side at the midfoot region of the plate than at the heel region of the plate to form the first layer. Similarly, adjacent segments of the strand of fibers may be positioned closer to one another across a width of the plate between a medial side and a lateral side at the midfoot region of the plate than at the forefoot region of the plate to form the first layer.

Yet another aspect of the disclosure includes a plate for an article of footwear. The plate includes a first layer including first high tensile strength fibers, a second layer including second high tensile strength fibers, a third layer including third high tensile strength fibers. The plate also includes a polymeric resin consolidating the first high tensile strength fibers, the second high tensile strength fibers, and the third high tensile strength fibers. The plate includes a forefoot region, a heel region, and a midfoot region disposed between the forefoot region and the heel region. The midfoot region includes a stiffness of about 60 N/mm to about 70 N/mm.

Implementations of the disclosure may include one or more of the following optional features. In some implementations, a stiffness of the heel region is about 20 N/mm to about 30 N/mm. A stiffness of the forefoot region may be about 95 N/mm to about 105 N/mm. In other implementations, a stiffness of the heel region is about 50 N/mm to about 60 N/mm. A stiffness of the forefoot region may be about 75 N/mm to about 120 N/mm.

In some implementations, at least one of the first high tensile strength fibers, the second high tensile strength fibers, and the third high tensile strength fibers include at least one of carbon fibers, boron fibers, glass fibers, and polymeric fibers. The polymeric resin may be a thermoset resin or a thermoplastic resin.

In some examples, at least one of the first high tensile strength fibers, the second high tensile strength fibers, and the third high tensile strength fibers are applied in a unidirectional tape. In other examples, at least one of the first high tensile strength fibers, the second high tensile strength fibers, and the third high tensile strength fibers are applied as a strand of fibers stitched down to a base layer. Additionally or alternatively, at least two of the first high tensile strength fibers, the second high tensile strength fibers, and the third high tensile strength fibers may be applied in a unidirectional tape and the other the first high tensile strength fibers, the second high tensile strength fibers, and the third high tensile strength fibers may be applied as a strand of fibers stitched down to a base layer. Optionally, the first high tensile strength fibers, the second high tensile strength fibers, and the third high tensile strength fibers are applied as strands of fibers stitched down to a base layer and each including a different pattern.

In some configurations, at least one of the first high tensile strength fibers, the second high tensile strength fibers, and the third high tensile strength fibers are applied as a strand of fibers stitched down to a base layer. Here, adjacent segments of the strand of fibers may be positioned closer to one another across a width of the plate between a medial side and a lateral side at the midfoot region of the plate than at the heel region of the plate to form the first layer. Similarly, adjacent segments of the strand of fibers may be positioned closer to one another across a width of the plate between a medial side and a lateral side at the midfoot region of the plate than at the forefoot region of the plate to form the first layer.

Yet another aspect of the disclosure includes a plate for an article of footwear. The plate includes a first layer including first high tensile strength fibers, a second layer including second high tensile strength fibers, a third layer including third high tensile strength fibers, and a polymeric resin consolidating the first high tensile strength fibers, the second high tensile strength fibers, and the third high tensile strength fibers. The plate also includes a forefoot region, a heel region, and a midfoot region disposed between the forefoot region and the heel region, the heel region including a stiffness of about 35 N/mm to about 45 N/mm.

Implementations of the disclosure may include one or more of the following optional features. In some implementations, a stiffness of the midfoot region is about 20 N/mm to about 55 N/mm and a stiffness of the forefoot region is about 95 N/mm to about 105 N/mm. In other implementations, a stiffness of the midfoot region is about 75 N/mm to about 120 N/mm and a stiffness of the forefoot region is about 75 N/mm to about 120 N/mm.

In some examples, at least one of the first high tensile strength fibers, the second high tensile strength fibers, and the third high tensile strength fibers include at least one of carbon fibers, boron fibers, glass fibers, and polymeric fibers. The polymeric resin may be a thermoset resin or a thermoplastic resin.

In some configurations, at least one of the first high tensile strength fibers, the second high tensile strength fibers, and the third high tensile strength fibers are applied in a unidirectional tape. In other configurations, at least one of the first high tensile strength fibers, the second high tensile strength fibers, and the third high tensile strength fibers are applied as a strand of fibers stitched down to a base layer. Additionally or alternatively, at least two of the first high tensile strength fibers, the second high tensile strength fibers, and the third high tensile strength fibers may be applied in a unidirectional tape and the other the first high tensile strength fibers, the second high tensile strength fibers, and the third high tensile strength fibers may be applied as a strand of fibers stitched down to a base layer. Optionally, the first high tensile strength fibers, the second high tensile strength fibers, and the third high tensile strength fibers may be applied as strands of fibers stitched down to a base layer and each including a different pattern.

In some examples, at least one of the first high tensile strength fibers, the second high tensile strength fibers, and the third high tensile strength fibers are applied as a strand of fibers stitched down to a base layer. Here, adjacent segments of the strand of fibers are positioned closer to one another across a width of the plate between a medial side and a lateral side at the midfoot region of the plate than at the heel region of the plate to form the first layer. Similarly, adjacent segments of the strand of fibers are positioned closer to one another across a width of the plate between a medial side and a lateral side at the midfoot region of the plate than at the forefoot region of the plate to form the first layer.

Another aspect of the disclosure provides a method of forming a plate for an article of footwear. The method includes applying a first strand portion to a base layer including positioning adjacent segments of the first strand portion to form a first layer on the base layer, the adjacent segments of the first strand portion having a greater density across a width of the plate between a medial side and a lateral side at a midfoot region of the plate than at a forefoot region of the plate and at a heel region of the plate. The method also includes applying at least one of heat and pressure to the first strand portion and to the base layer to conform the first strand portion and the base layer to a predetermined shape.

Implementations of the disclosure may include one or more of the following optional features. In some examples, the method includes removing loops of the first strand portion connecting adjacent segments to define an outer edge of the plate. Applying the first strand portion to the base layer may include applying the first strand portion to at least one of a substrate and a second layer having a plurality of fibers and/or to a second layer formed from unidirectional tape.

In some implementations, the method includes positioning a second strand portion on the first layer to form a second layer on the first layer. In some examples, applying the first strand portion to the base layer includes applying first stitching that crosses over the first strand portion and penetrates the base layer at first attachment locations that are spaced apart from the first strand portion. Positioning the second strand portion on the first layer may include applying second stitching that crosses over the second strand portion, extends through the first strand portion, and penetrates the base layer at second attachment locations. Applying the first strand portion to a base layer may further include positioning adjacent segments closer to one another across the width of the plate between the medial side and the lateral side at the midfoot region of the plate than at the forefoot region of the plate and at the heel region of the plate.

In some examples, applying the first strand portion to the base layer includes positioning first segments of the first strand portion on the base layer. In these examples, each first segment has a corresponding length that extends between a corresponding first end and a corresponding second end. The first end is proximate to one of the medial side and the lateral side at the forefoot region of the plate and the second end is proximate to the one of the one of the medial side and the lateral side at the heel region of the plate. The first segments may be disposed adjacent and substantially parallel to one another.

Applying the first strand portion to the base layer may further include positioning second segments of the first strand portion on the base layer. Here, each second segment has a corresponding length that extends between a corresponding first end and a corresponding second end. The first end is proximate to the other one of the medial side and the lateral side at the forefoot region of the plate and the second end is proximate to the other one of the medial side and the lateral side at the heel region of the plate. The second segments may be convergent with the first segments and disposed adjacent and substantially parallel with one another.

In some examples, positioning the second segments of the first strand portion on the base layer also includes crossing the second segments over the first segments within an interior region of the plate at the midfoot region. Additionally, positioning the first segments may also include positioning each adjacent first segment with a substantially uniform spacing across the corresponding length of the first segments. Similarly, positioning the second segments may also include positioning each adjacent second segment with a substantially uniform spacing across the corresponding length of the second segments.

In some implementations, the method includes forming the first strand portion from a first tow of fibers including at least one of carbon fibers, boron fibers, glass fibers, and polymeric fibers. The method may also include consolidating fibers of the first strand portion with a polymeric resin during the application of heat and/or pressure, the polymeric resin being a thermoset resin or a thermoplastic resin.

In some examples, forming the plate includes forming the plate with the forefoot region including a stiffness of about 80 N/mm to about 90 N/mm, the midfoot region including a stiffness of about 75 N/mm to about 120 N/mm or of about 20 N/mm to about 55 N/mm, and the heel region including a stiffness of about 20 N/mm to about 30 N/mm or of about 50 N/mm to about 60 N/mm.

In other examples, forming the plate includes forming the plate with the forefoot region including a stiffness of 95 N/mm to about 105 N/mm or of about 75 N/mm to about 120 N/mm, the midfoot region including a stiffness of about 60 N/mm to about 70 N/mm, and the heel region including a stiffness of about 20 N/mm to about 30 N/mm or of about 50 N/mm to about 60 N/mm.

In another example, forming the plate includes forming the plate with the forefoot region including a stiffness of about 95 N/mm to about 105 N/mm or of about 75 N/mm to about 120 N/mm, the midfoot region including a stiffness of about 20 N/mm to about 55 N/mm or of about 75 N/mm to about 120 N/mm, and the heel region including a stiffness of about 35 N/mm to about 45 N/mm.

Another aspect of the disclosure provides a method of forming a plate for an article of footwear. The method includes applying a first strand portion to a base layer including positioning adjacent segments of the first strand portion to form a first layer on the base layer. The adjacent segments of the first strand portion have a greater density across a width of the plate between a medial side and a lateral side at a midfoot region of the plate than at a forefoot region of the plate and at a heel region of the plate. The method also includes applying at least one of heat and pressure to the first strand portion and to the base layer to conform the first strand portion and the base layer to a predetermined shape.

Implementations of the disclosure may include one or more of the following optional features. In some implementations, the method includes removing portions of the segments to define an outer edge of the plate. Removing portions of the segments may include severing the first strand portion at a first end of each segment and severing the first strand portions at a second end of each segment located at an opposite end of the respective first strand portions than the first end. Removing portions of the segments may further include removing loops of the first strand portion connecting adjacent segments.

In some configurations, applying the first strand portion to a base layer includes applying the first strand portion to a second layer having a plurality of fibers and/or to a second layer formed from unidirectional tape. Applying the first strand portion to a base layer may also include applying the first strand portion to a substrate. In some examples, applying the first strand portion to a base layer includes applying stitching to attach the first strand portion to the base layer. Applying stitching may include zigzagging the stitching across the first strand portion between first attachment locations.

In some implementations, the method includes positioning a second strand portion on the first layer to form a second layer on the first layer. Applying the first strand portion to the base layer may include applying first stitching that crosses over the first strand portion and penetrates the base layer at first attachment locations that are spaced apart from the first strand portion. Similarly, positioning the second strand portion on the first layer may include applying second stitching that crosses over the second strand portion, extends through the first strand portion, and penetrates the base layer at second attachment locations.

In some examples, applying the first strand portion to a base layer includes positioning adjacent segments closer to one another across the width of the plate between the medial side and the lateral side at the midfoot region of the plate than at the forefoot region of the plate. Applying the first strand portion to a base layer may also include positioning adjacent segments closer to one another across the width of the plate between the medial side and the lateral side at the midfoot region of the plate than at the heel region of the plate.

In some implementations, applying the first strand portion to the base layer includes positioning adjacent first segments of the first strand portion on the base layer. In these examples, each first segment has a corresponding length that extends between a corresponding first end and a corresponding second end. The first end may be proximate to one of the medial side and the lateral side at the forefoot region of the plate and the second end may be proximate to the one of the medial side and the lateral side at the heel region of the plate.

Applying the first strand portion to the base layer may include positioning adjacent second segments of the first strand portion on the base layer with each second segment having a corresponding length that extends between a corresponding first end and a corresponding second end. The first end may be proximate to the other one of the medial side and the lateral side at the forefoot region of the plate and the second end may be proximate to the other one of the medial side and the lateral side at the heel region of the plate. In some examples, positioning the adjacent first segments and positioning the adjacent second segments includes overlapping the first segments and the second segments with one another within an interior region of the plate at the midfoot region.

Positioning the adjacent first segments and positioning the adjacent second segments may further include extending the first segments and the second segments substantially parallel to a longitudinal axis of the plate at the midfoot region and diverging the first segments and the second segments away from one another when extending from the midfoot region toward the corresponding first ends at the forefoot region.

In some configurations, positioning the adjacent first segments includes positioning the adjacent first segments with a substantially uniform spacing across the corresponding length of each first segment. Similarly, positioning the adjacent second segments may include positioning the adjacent second segments with a substantially uniform spacing across the corresponding length of each second segment. Additionally, positioning the adjacent second segments may include positioning the adjacent second segments with a corresponding length longer than a corresponding length of the adjacent first segments.

In some implementations, applying the first strand portion to the base layer includes positioning adjacent third segments of the first strand portion on the base layer between the first segments and the second segments. In these examples, each third segment has a corresponding length that extends between a corresponding first end at the forefoot region of the plate and a corresponding second end at the heel region of the plate. Positioning the adjacent third segments of the first strand portion may further include positioning the adjacent third segments with a corresponding length that is different than the corresponding lengths of the first segments and the third segments.

In some examples, applying the first strand portion to a base layer includes applying a continuous strand. Applying a continuous strand of the first strand portion may include forming loops of the first strand portion. Applying a continuous strand of the first strand portion may further include removing the loops between adjacent segments of the first strand portion to define an outer edge of the plate.

In some implementations, the method includes forming the first strand portion from a first tow of fibers. Forming the first strand portion from a first tow of fibers may include forming the first strand portion from at least one of carbon fibers, boron fibers, glass fibers, and polymeric fibers. The method may further include incorporating the plate into an article of footwear. In some examples, the method includes consolidating fibers of the first strand portion with a polymeric resin. Here, consolidating the fibers with a polymeric resin is performed during the application of heat and/or pressure.

The details of one or more implementations of the disclosure are set forth in the accompanying drawings and the description below. Other aspects, features, and advantages will be apparent from the description and drawings, and from the claims.

During running movements, an application point of footwear providing the push-off force from the ground surface is located in a forefoot portion of the footwear. The application point of the footwear opposes a metatarsophalangeal (MTP) joint of the foot. A distance between an ankle joint of the athlete and a line of action of the application point providing the push-off force defines a lever arm length about the ankle. A mechanical demand for the ankle plantarflexors (e.g., calf muscles tendon unit) can be based on a push-off moment at the ankle determined by multiplying the length of the lever arm by a magnitude of the push-off force controlled by the athlete. Stiff and flat footwear plates generally increase the mechanical demand at the ankle due to the stiff, flat plate causing the application point with the ground surface to shift anteriorly. As a result, the lever arm distance and the push-off moment increases at the ankle joint. Implementations herein are directed toward shorting the length of the lever arm from the ankle joint to reduce the push-off moment at the ankle.

Figure 1:
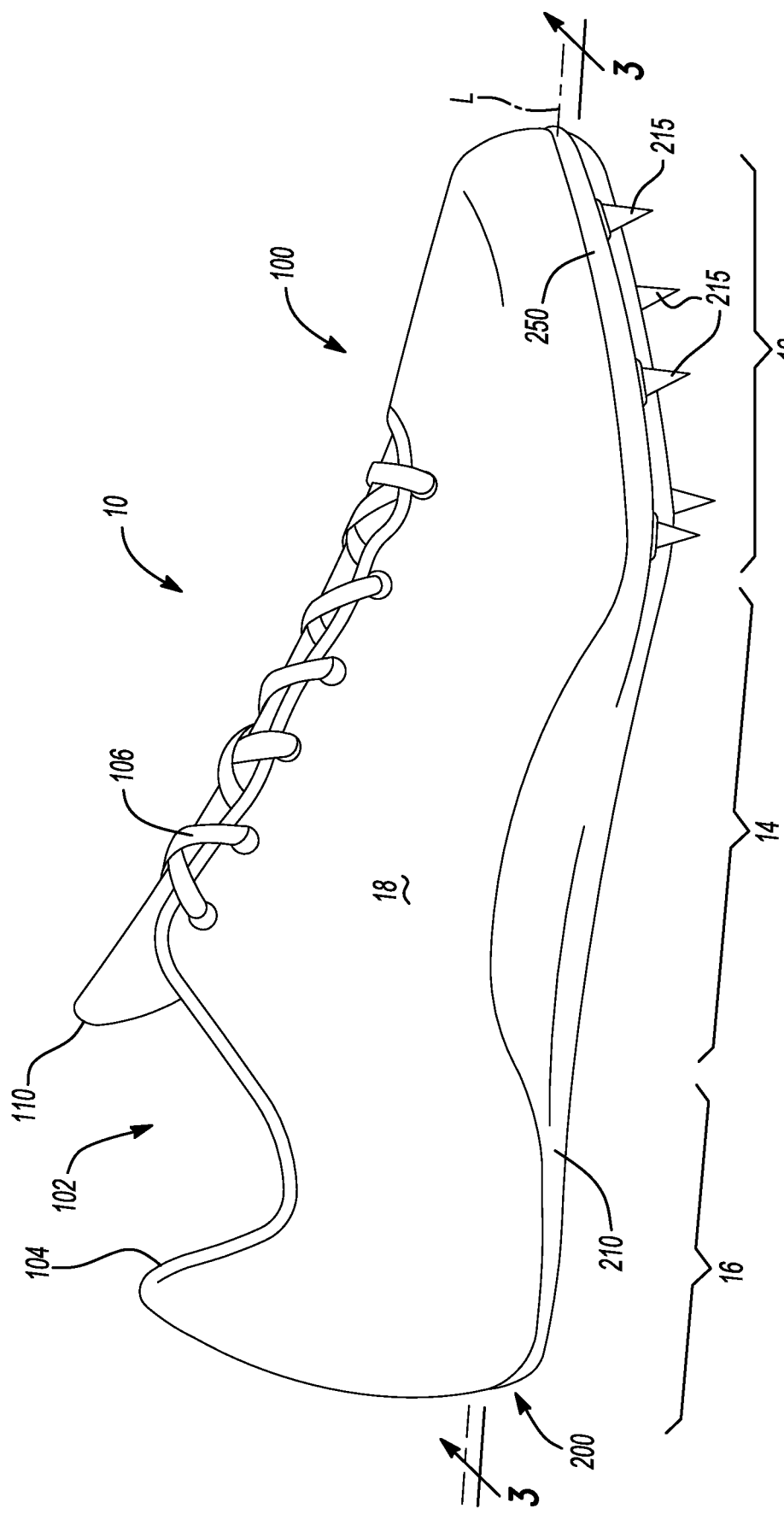
FIG. 1 is a top perspective view of an article of footwear in accordance with principles of the present disclosure.
Figure 2:
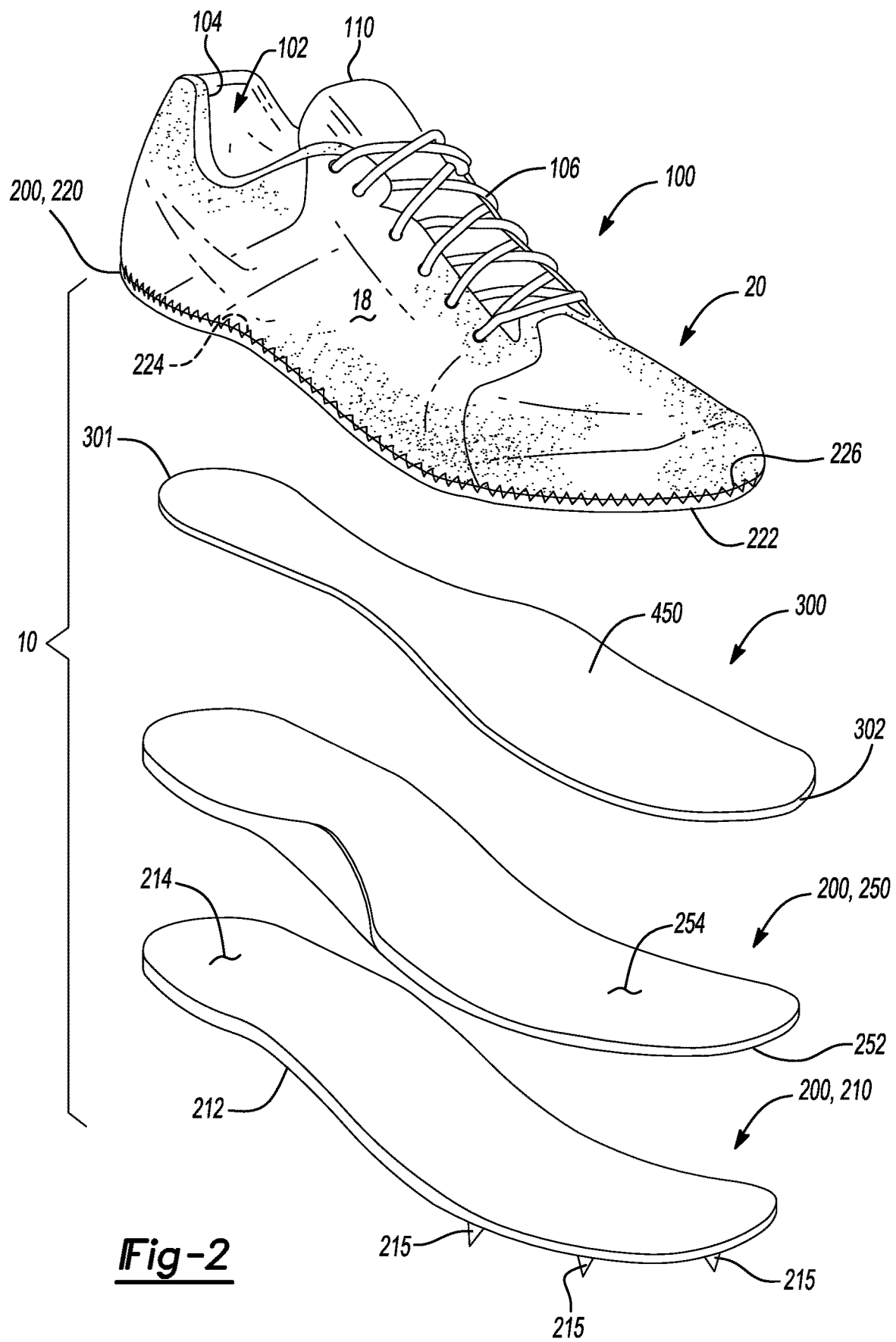
FIG. 2 is an exploded view of the article of footwear of FIG. 1 showing a footwear plate and a cushioning member disposed within a cavity between an inner surface of an outsole and a bottom surface of a midsole.
Figure 3:
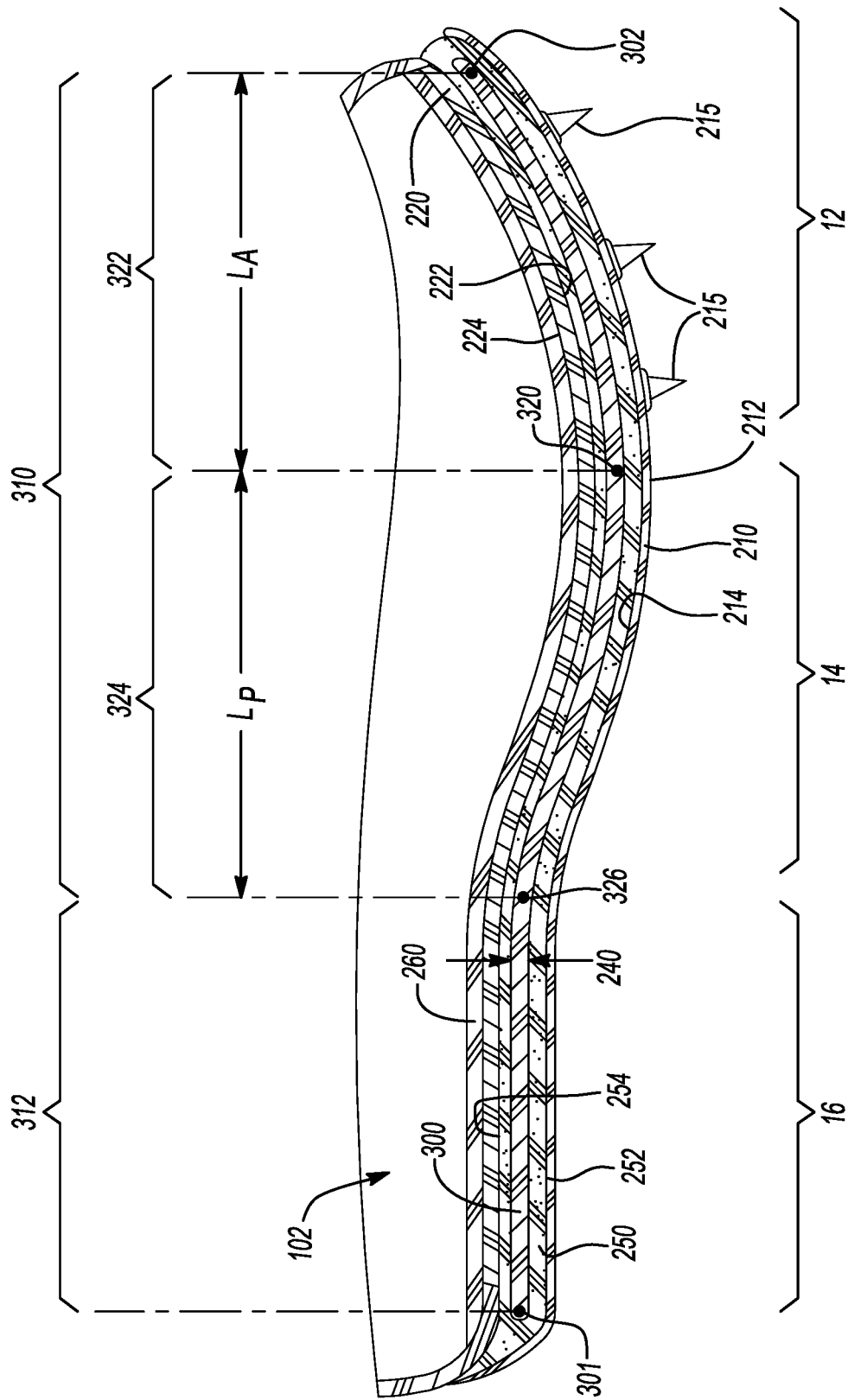
FIG. 3 is a cross-sectional view taken along line 3-3 of FIG. 1 showing a footwear plate and a cushioning member disposed within a cavity between an inner surface of an outsole and a bottom surface of a midsole.

Referring to FIGS. 1-3, an article of footwear 10 is provided and includes an upper 100 and a sole structure 200 attached to the upper 100. The article of footwear 10 may be divided into one or more portions. The portions may include a forefoot portion 12, a midfoot portion 14, and a heel portion 16. The forefoot portion 12 may correspond with toes and joints connecting metatarsal bones with phalanx bones of a foot during use of the footwear 10. The forefoot portion 12 may correspond with the metatarsophalangeal (MTP) joint of the foot. The midfoot portion 14 may correspond with an arch area of the foot, and the heel portion 16 may correspond with rear portions of the foot, including a calcaneus bone, during use of the article of footwear 10.

The footwear 10 may include lateral and medial sides 18, 20, respectively, corresponding with opposite sides of the footwear 10 and extending through the portions 12, 14, 16.

The upper 100 includes interior surfaces that define an interior void 102 that receives and secures a foot for support on the sole structure 200, during use of the article of footwear 10. An ankle opening 104 in the heel portion 16 may provide access to the interior void 102. For example, the ankle opening 104 may receive a foot to secure the foot within the void 102 and facilitate entry and removal of the foot to and from the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

In some implementations, the sole structure 200 includes an outsole 210, a cushioning member 250, and a midsole 220 arranged in a layered configuration. The midsole 220 is optional and corresponds to a conventional strobel. The sole structure 200 (e.g., the outsole 210, the cushioning member 250, and the midsole 220) defines a longitudinal axis L. For example, the outsole 210 engages with a ground surface during use of the article of footwear 10, the midsole 220 attaches to the upper 100, and the cushioning member 250 is disposed therebetween to separate the midsole 220 from the outsole 210. For example, the cushioning member 250 defines a bottom surface 252 opposing the outsole 210 and a top surface 254 disposed on an opposite side of the cushioning member 250 than the bottom surface 252 and opposing the midsole 220. The top surface 254 may be contoured to conform to the profile of the bottom surface (e.g., plantar) of the foot within the interior void 102. In some examples, the sole structure 200 may also incorporate additional layers such as an insole 260 (FIGS. 2 and 3) or sockliner, which may reside within the interior void 102 of the upper 100 to receive a plantar surface of the foot to enhance the comfort of the footwear 10. In some examples, a sidewall surrounds at least a portion of a perimeter of the cushioning member 250 and separates the cushioning member 250 and the midsole 220 to define a cavity therebetween. For instance, the sidewall and the top surface 254 of the cushioning member 250 may cooperate to retain and support the foot upon the cushioning member 250 when the interior void 102 receives the foot therein. In one configuration, the sidewall may define a rim around at least a portion of the perimeter of the contoured top surface 254 of the cushioning member 250 to cradle the foot during use of the footwear 10 when performing walking or running movements. The rim may extend around the perimeter of the midsole 220 when the cushioning member 250 attaches to the midsole 220.

While the article of footwear 10 will be described and shown as including a cushioning member 250, the cushioning member 250 is optional. As such, a footwear plate 300 could be attached directly to both the midsole (i.e., strobel) 220 and the outsole 210 without having a cushioning member—such as cushioning member 250—disposed between the plate 300 and either element 210, 220. Further, while the cushioning member 250 will be described and shown as being disposed on both sides of the plate 300, the cushioning member 250 may only be disposed between the plate 300 and the upper 100 or, alternatively, between the plate 300 and the outsole 210.

In some examples, one or more protruding elements 215 (e.g., spikes or cleats) extend from the ground-engaging surface 212 in a direction away from the sole structure 200 and the upper 100 to provide traction with soft ground surfaces, such as grass. For instance, each protruding element 215 may attach to the ground-engaging surface 212 of the outsole 210 and extend in a direction substantially perpendicular to the longitudinal axis L of the sole structure 200. In the example shown, the protruding elements 215 include spikes extending from the outsole 210 at the forefoot portion 12. In other examples, cleats or spikes may extend from one or more of the portions 12, 14, 16 in any arrangement.

In some configurations, the footwear plate 300 is disposed within the sole structure 210 to reduce energy loss at the MTP joint while enhancing rolling of the foot as the footwear 10 rolls for engagement with a ground surface during a running motion. In some configurations, the cushioning member 250 defines a sleeve/cavity 240 (FIG. 3) within an interior portion between the top surface 254 and the bottom surface 252. The footwear plate 300 may be received within the cavity 240 and may be held in place between the top surface 254 and the bottom surface 252. In other configurations, the footwear plate 300 is disposed upon the top surface 254 of the cushioning member 250 and underneath the midsole 220. In these configurations, the midsole 220 is optional and the footwear plate 300 may secure to the upper 100 to define the interior void 102 with or without the insole 260 disposed on top of the footwear plate 300. For instance, the footwear plate 300 may secure to the upper 100 using adhesives. In some implementations, the footwear plate 300 is sandwiched between the top surface 254 of the cushioning member 250 and an additional cushioning member (not shown) underneath the midsole 220. The footwear plate 300 may define a length extending through at least a portion of the length of the sole structure 200. In some examples, the length of the plate 300 extends through the forefoot, midfoot, and heel portions 12, 14, 16 of the sole structure 200. In other examples, the length of the plate 300 extends through the forefoot portion 12 and the midfoot portion 14, and is absent from the heel portion 16. In other configurations, the plate 300 is disposed upon a footbed 224 (FIG. 3) of the midsole/strobel 220 within the interior void 102 of the upper 100 and the cushioning member 250, or an additional cushioning member, may be disposed within the interior void 102 to sandwich the plate 300 between the footbed 224 of the midsole 220 and the bottom surface 252 of the cushioning member 250 within the interior void 102.

In some examples, the footwear plate 300 includes a uniform local stiffness (e.g., tensile strength or flexural strength) throughout the entire surface area of the plate 300. The stiffness of the plate may be anisotropic where the stiffness in one direction across the plate is different from the stiffness in another direction. For instance, the plate 300 may be formed from at least two layers of fibers 450 anisotropic to one another to impart gradient stiffness and gradient load paths across the plate 300. In one configuration, the plate 300 provides a greater longitudinal stiffness (e.g., in a direction along the longitudinal axis L) than a transverse stiffness (e.g., in a direction transverse to the longitudinal axis L). In one example, the transverse stiffness is at least ten percent (10%) lower than the longitudinal stiffness. In another example, the transverse stiffness is from about ten percent (10%) to about twenty percent (20%) of the longitudinal stiffness. In some configurations, the plate 300 is formed from one or more layers of tows 400 (FIG. 4) of fibers 450 and/or layers of fibers 450 including at least one of carbon fibers, boron fibers, glass fibers, and polymeric fibers. The polymeric fibers can be formed of a thermoplastic material or a thermoset material. The polymeric fibers can compositionally comprise a polyurethane, a polyamide, a polyester, a polyether, a polyurethane co-polymer, a polyamide co-polymer, a polyester co-polymer, a polyether co-polymer, and any combination thereof. The polyurethane can be a thermoplastic polyurethane (TPU). The polymeric fibers can compositionally comprise polyethylene terephthalate (PET). The polymeric fibers can compositionally comprise an aramid. The polymeric fibers can compositionally comprise poly(p-phenylene-2,6-benzobisoxazole) (PBO).

In a particular configuration, the fibers 450 include carbon fibers, or glass fibers, or a combination of both carbon fibers and glass fibers. The tows 400 of fibers 450 may be affixed to a substrate. The tows 400 of fibers 450 may be affixed by stitching and/or using an adhesive. Additionally or alternatively, the tows 400 of fibers 450 and/or layers of fibers 450 may be consolidated with a resin formed from a thermoset polymer material(s) and/or a thermoplastic polymer material(s). The tows of fibers 450 may be affixed to the substrate, or other base layer, using any of the techniques disclosed in U.S. Provisional Application Ser. No. 62/364,594, filed Jul. 20, 2016 and in U.S. Provisional Application Ser. No. 62/364,585, filed Jul. 20, 2016, which are hereby incorporated by reference in their entirety.

Accordingly, the plate 300 may have a tensile strength or flexural strength in a transverse direction substantially perpendicular to the longitudinal axis L. The stiffness of the plate 300 may be selected for a particular wearer based on the wearer's tendon flexibility, calf muscle strength, and/or MTP joint flexibility. Moreover, the stiffness of the plate 300 may also be tailored based upon a running motion of the athlete. In other configurations, the plate 300 is formed from one or more layers/plies of unidirectional tape. In some examples, each layer in the stack includes a different orientation than the layer disposed underneath. The plate 300 may be formed from unidirectional tape including at least one of carbon fibers, boron fibers, glass fibers, and polymeric fibers. In some examples, the one or more materials forming the plate 300 include a Young's modulus of at least 70 gigapascals (GPa).

In some implementations, the plate 300 includes a substantially uniform thickness and may range from about 0.6 millimeter (mm) to about 3.0 mm. In one example, the thickness of the plate is substantially equal to one 1.0 mm. In other implementations, the thickness of the plate 300 is non-uniform such that the plate 300 may define a greater thickness in the midfoot portion 14 of the sole structure 200 than the thicknesses in the forefoot portion 12 and/or the heel portion 16.

The outsole 210 may include a ground-engaging surface 212 and an opposite inner surface 214. The outsole 210 may attach to the upper 100. In some examples, the bottom surface 252 of the cushioning member 250 affixes to the inner surface 214 of the outsole 210. The example of FIG. 1 shows the outsole 210 attaching to the upper 100 proximate to a tip of the forefoot portion 12. The outsole 210 generally provides abrasion-resistance and traction with the ground surface during use of the article of footwear 10. The outsole 210 may be formed from one or more materials that impart durability and wear-resistance, as well as enhance traction with the ground surface. For example, rubber may form at least a portion of the outsole 210.

The midsole 220 may include a bottom surface 222 and a footbed 224 disposed on an opposite side of the midsole 220 than the bottom surface 222. Stitching 226 or adhesives may secure the midsole 220 to the upper 100. The footbed 224 may be contoured to conform to a profile of the bottom surface (e.g., plantar) of the foot. The bottom surface 222 may oppose the inner surface 214 of the outsole 210 to define a space therebetween for receiving the cushioning member 250. While element 220 is described as being a midsole, element 220 may correspond to a strobel that is stitched or otherwise fixedly attached to the upper 100.

FIG. 2 provides an exploded view of the article of footwear 10 showing the outsole 210, the cushioning member 250 disposed upon the inner surface 214 of the outsole 210, and the substantially rigid footwear plate 300 disposed between the top surface 254 of the cushioning member 250 and the bottom surface 222 of the midsole 220. The cushioning member 250 may be sized and shaped to occupy at least a portion of empty space between the outsole 210 and the midsole 220. In some examples, unoccupied space between the cushioning member 250 and the bottom surface 222 of the midsole 220 defines a cavity configured to receive the footwear plate 300. Accordingly, the cushioning member 250 and the plate 300 may substantially occupy the entire volume of space between the bottom surface 222 of the midsole 220 and the inner surface 214 of the outsole 210. However, the cushioning member 250 may occupy the entire space between the midsole 220 and the outsole 210 and define the cavity 240 (FIG. 3) configured to receive the plate 300 therein, thereby embedding the plate 300 within the cushioning member 250. The cushioning member 250 may compress resiliently between the midsole 220 and the outsole 210. In some configurations, the cushioning member 250 corresponds to a slab of polymer foam having a surface profile configured to receive the footwear plate 300 thereon.

The cushioning member 250 may be formed from any suitable materials that compress resiliently under applied loads. Examples of suitable polymer materials for the foam materials include ethylene vinyl acetate (EVA) copolymers, polyurethanes, polyethers, and olefin block copolymers. The foam can also include a single polymeric material or a blend of two or more polymeric materials including a polyether block amide (PEBA) copolymer, the EVA copolymer, a thermoplastic polyurethane (TPU), and/or the olefin block copolymer. The cushioning member 250 may include a density within a range from about 0.05 grams per cubic centimeter ($g/cm^3$) to about 0.20 $g/cm^3$. In some examples, the density of the cushioning member 250 is approximately 0.1 $g/cm^3$. Moreover, the cushioning member 250 may include a hardness within the range from about eleven (11) Shore A to about fifty (50) Shore A. The one or more materials forming the cushioning member 250 may be suitable for providing an energy return of at least 60-percent (60%).

The length of the footwear plate 300 may extend between a first end 301 and a second end 302. The first end 301 may be disposed proximate to the heel portion 16 of the sole structure 200 and the second end 302 may be disposed proximate to the forefoot portion 12 of the sole structure 200. The first end 301 may also be referred to as a "posterior-most point" of the plate 300 while the second end 302 may also be referred to as an "anterior-most point" of the plate.

In some examples, the length of the footwear plate 300 is less than a length of the cushioning member 250. The footwear plate 300 may also include a thickness extending substantially perpendicular to the longitudinal axis L of the sole structure 200 and a width extending between the lateral side 18 and the medial side 20. Accordingly, the length, the width, and the thickness of the plate 300 may substantially occupy the cavity 240 defined by the cushioning member 250 and the bottom surface 222 and may extend through the forefoot, midfoot, and heel portions 12, 14, 16, respectively, of the sole structure 200. In some examples, peripheral edges of the footwear plate 300 are visible along the lateral and/or medial sides 18, 20 of the footwear 10.

Referring to FIG. 3, a partial cross-sectional view taken along line 3-3 of FIG. 1 shows the footwear plate 300 residing within the cavity 240 defined by the cushioning member 250 and the cushioning member 250 disposed between the midsole 220 and the outsole 210. The insole 260 may be disposed upon the footbed 224 within the interior void 102 under the foot. The cushioning member 250 may define a greater thickness in the heel portion 16 of the sole structure 200 than in the forefoot portion 12. In other words, the gap or distance separating the outsole 210 and the midsole 220 decreases in a direction along the longitudinal axis L of the sole structure 200 from the heel portion 16 toward the forefoot portion 12. In some implementations, the top surface 254 of the cushioning member 250 is smooth and includes a surface profile contoured to match the surface profile of the footwear plate 300 such that the footwear plate 300 and the cushioning member 250 mate flush with one another. The cushioning member 250 may define a thickness in the forefoot portion 12 of the sole structure within a range from about seven (7) millimeters (mm) to about twenty (20) mm. In one example, the thickness of the cushioning member 250 in the forefoot portion 12 is about twelve (12) mm.

In some configurations, the cushioning member 250 may be absent and the plate 300 may be disposed directly on top of the inner surface 214 of the outsole 210. Moreover, cushioning material associated with the same cushioning member 250 or a different cushioning member may be disposed between the plate 300 and the midsole 220 and extend through the forefoot, midfoot, and heel portions 12, 14, 16, respectively.

The footwear plate 300 includes a curved region 310 extending through the forefoot portion 12 and the midfoot portion 14 of the sole structure 200. The terms "curved portion", "concave portion", and "circular portion" may also be used to describe the curved region 310. The footwear plate 300 may optionally include a substantially flat region 312 extending through the heel portion 16 from the curved region 310 to the posterior-most point 301 of the plate 300. The curved region 310 is associated with a radius of curvature about an MTP point 320 to define an anterior curved portion 322 extending from one side of the MTP point 320 and a posterior curved portion 324 extending from the other side of the MTP point 320. For instance, the anterior curved portion 322 extends between the MTP point 320 and the anterior-most point (AMP) 302 (e.g., second end 302) of the plate 300, while the posterior curved portion 324 extends between the MTP point 320 and an aft point 326 disposed at a junction of the curved region 310 and the flat region 312. In some examples, the anterior curved portion 322 and the posterior curved portion 324 are associated with the same radius of curvature that is mirrored about the MTP point 320. In other examples, the anterior curved portion 322 and the posterior curved portion 324 are each associated with a different radius of curvature. In some configurations, a portion of the posterior curved portion 324 is associated with the same radius of curvature as the anterior curved portion 322. Accordingly, the curved portions 322, 324 may each include a corresponding radius of curvature that may be the same or may be different from one another. In some examples, the radius of curvatures differ from one another by at least two percent (2%). The radius of curvatures for the curved regions 322, 324 may range from 200 millimeters (mm) to about 400 mm. In some configurations, the anterior curved portion 322 includes a radius of curvature that continues the curvature of the posterior curved portion 324 such that the curved portions 322, 324 define the same radius of curvature and share a same vertex. Additionally or alternatively, the plate may define a radius of curvature that connects the posterior curved portion 324 to the substantially flat region 312 of the plate 300. As used herein, the term "substantially flat" refers to the flat region 312 within five (5) degrees horizontal, i.e., within five (5) degrees parallel to the ground surface.

The MTP point 320 is the closest point of the footwear plate 300 to the inner surface 214 of the outsole 210 while the aft point 326 and the AMP 302 of the plate 300 are disposed further from the outsole 210 than the MTP point 320. In some configurations, the posterior-most point 301 and the AMP 302 are co-planar. In some examples, the MTP point 320 of the plate 300 is disposed directly below the MTP joint of the foot when the foot is received within the interior void 102 of the upper 100. In other examples, the MTP point 320 is disposed at a location that is further from a toe end of the sole structure 200 than the MTP joint. The anterior curved and posterior curved portions 322, 324, respectively, of the curved region 310 provide the plate 300 with a longitudinal stiffness that reduces energy loss proximate to the MTP joint of the foot, as well as enhances rolling of the foot during running motions to thereby reduce a lever arm distance and alleviate strain on the ankle joint.

In some implementations, the AMP 302 and the aft point 326 are located above the MTP point 320 by a distance/height H (FIG. 5) extending from the MTP 320 in a direction substantially perpendicular to the longitudinal axis L of the sole structure 200. The height H ranges from about three (3) millimeters (mm) to about twenty-eight (28) mm. In other examples, the height H ranges from about three (3) mm to about seventeen (17) mm. In one example, the height H is equal to about seventeen (17) mm. Thus, the toes of the foot residing above the anterior curved portion 322 may be biased upward due to the anterior curved portion 322 extending away from the outsole 210 from the MTP point 320 toward the AMP 302. Additionally or alternatively, a length $L_A$ of the anterior curved portion 322 may be substantially equal to a length $L_P$ of the posterior curved portion 324. As used herein, the $L_A$ and $L_P$ are each measured along a line extending substantially parallel to the longitudinal axis L between the MTP point 320 and respective ones of the AMP 302 and the aft point 326. In other words, the lengths $L_A$ and $L_P$ are each associated with a distance between the MTP point 320 and a corresponding one of the AMP 302 and the aft point 326. In some configurations, the $L_A$ and the $L_P$ are each equal to about thirty percent (30%) of a total length of the plate 300 while a length of the flat region 312 accounts for the remaining forty percent (40%) of the total length of the plate 300. In other configurations, the $L_A$ is equal from about twenty-five percent (25%) to about thirty-five percent (35%) of the total length of the plate 300, $L_P$ is equal from about twenty-five percent (25%) to about thirty-five percent (35%) of the total length of the plate 300, and the length of the flat region 312 is equal to the balance. In other configurations, $L_A$, $L_P$, and the length of the flat region 312 are substantially equal. Varying the radius of curvature of the curved region 310 causes the lengths $L_A$ and $L_P$ and/or the distance/height of the anterior-most point 302 and the aft point 306 to change relative to the MTP point 320. For instance, decreasing the radius of curvature causes an angle between the MTP point 320 and the AMP 302 to increase as well as the height H of the AMP 302 above the MTP point 320 to also increase. In configurations when the curved portions 322, 324 each include a different radius of curvature, the corresponding lengths $L_A$ and $L_P$ and/or the height H from the MTP point 320 may be different. Accordingly, the radius of curvature of the curved region 310 may vary for different shoe sizes, may vary depending upon an intended use of the footwear 10, and/or may vary based upon the anatomical features of the foot on a wearer-by-wear basis.

In some implementations, the MTP point 320 is located approximately thirty percent (30%) of the total length of the plate from the AMP 302. A center of the radius of curvature of the curved region 310 may be located at the MTP point 320. In some examples, the curved region 310 (e.g., concave portion) is associated with a constant radius of curvature that extends from the AMP 302 past the MTP point 320. In these examples, the constant radius of curvature may extend from the AMP 302 past the MTP point 320 at least forty percent (40%) of the total length of the plate 300 from the AMP 302.

Figure 4:
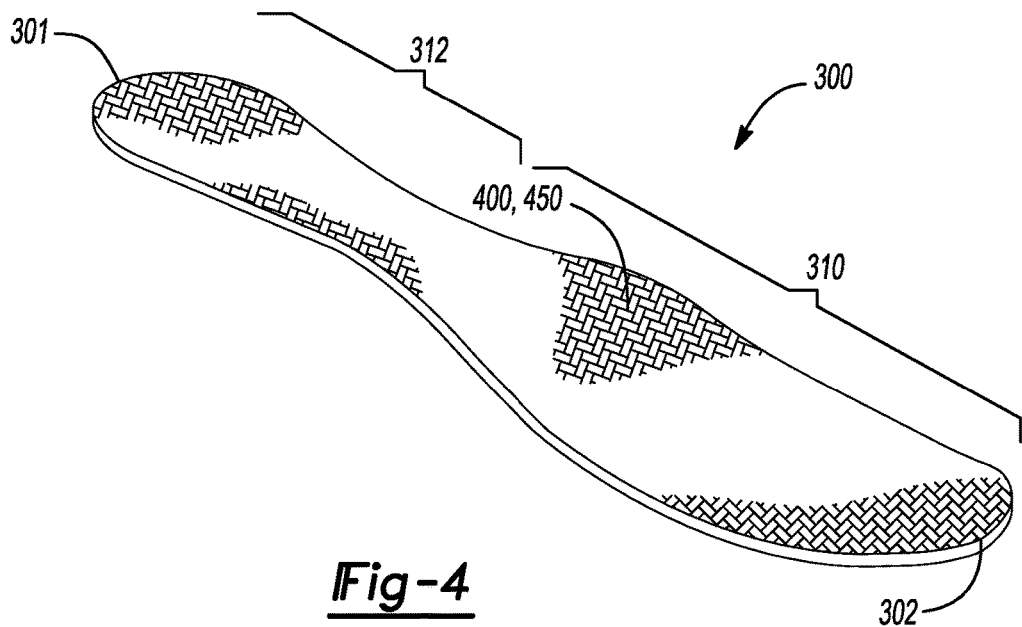
FIG. 4 is a top perspective view of a footwear plate for use in an article of footwear in accordance with principles of the present disclosure.

FIG. 4 is a top perspective view of the footwear plate 300 for use in the article of footwear 10 of FIG. 1. The plate 300 defines a length extending between the first end 301 corresponding to the posterior-most point and the second end 302 corresponding to the anterior most point (PMP) of the plate 300. The terms "first end" and "posterior-most point" will be used interchangeably herein. The terms "second end" and "AMP" of the plate 300 will be used interchangeably herein. FIG. 4 shows the footwear plate 300 including the curved region 310 and the substantially flat region 312.

In some implementations, the footwear plate 300 is substantially rigid and formed from one or more composite materials. In contrast with conventional composite plates formed from unidirectional tapes that only afford directional stiffness properties, the footwear plate 300 is formed from one or more strand portions 400 arranged in selected patterns to impart anisotropic stiffness and gradient load paths throughout the plate 300. Each strand portion 400 may refer to a tow of a plurality of fibers 450, a monofilament, yarn, or polymer pre-impregnated tows that include ribbon or strips of unidirectional tape. The present disclosure will refer to each strand portion 400 as a corresponding tow 400 of fibers 450 unless indicated otherwise. As used herein, the term "tow" refers to a bundle (i.e., plurality) of filaments (e.g., fibers 450) that may be twisted or untwisted and each tow may be designated a size associated with a number of fibers 450 that the corresponding tow 400 contains. For instance, the at least one tow 400 forming the footwear plate 300 may range in size from about 1,000 fibers per bundle to about 48,000 fibers per bundle. In some examples, the at least one tow 400 includes 3,000 fibers per bundle. In other examples, the at least one tow 400 includes 12,000 carbon fibers per bundle.

In some configurations, the fibers 450 associated with the at least one tow 400 include at least one of carbon fibers, boron fibers, glass fibers, and polymeric fibers. Additionally, at least a portion of the fibers 450 associated the at least one tow 400 may be formed from a first thermoplastic material. Fibers such as carbon fibers, aramid fibers, and boron fibers may provide a high modulus while glass fibers (e.g., fiberglass) and polymer fibers (e.g., synthetic fibers) provide a medium modulus. The fibers may also include Basalt fibers or a combination of carbon/basalt fibers.

In some examples, the density of fiber per unit area varies within a single tow 400 of fibers 450. Additionally or alternatively, the type of fibers 450 forming a corresponding tow 400 may vary across the plate 300 between the forefoot region 12 and the heel region 16 and between the lateral side 18 and the medial side 20. In doing so, the plate 300 can be designed to have a stiffness gradient based on anatomical features of the foot. For instance, a stiffness of the plate 300 may increase along the length of the plate 200 from the forefoot portion 12 to the heel portion 16. In some examples, the patterns for each tow 400 of fibers 450 provides a stiffness gradient between the lateral side 18 and the medial side 20 of the plate 300 through at least one of the portions 12, 14, 16. For instance, the stiffness of the plate 300 in the forefoot portion 12 may increase in a direction from the medial side 20 to the lateral side 18. Thus, the one or more tows 400 of fibers 450 may include paths with multiple curves to steer around voids and/or to change directions in the load path of the plate 300 to accommodate anatomical features as well as to enhance performance of the footwear 10 for its intended use.

In some configurations, the footwear plate 300 has a stiffness in the forefoot region 12 of about 80 Newton per millimeter (N/mm) to about 90 N/mm, and a stiffness in the midfoot region 14 of about 20 N/mm to about 55 N/mm. In other configurations, the footwear plate 300 has a stiffness in the forefoot region 12 of about 80 N/mm to about 90 N/mm, and a stiffness in the midfoot region 14 of about 75 N/mm to about 120 N/mm. In yet another configuration, the plate 300 has a stiffness in the forefoot region 12 of about 75 N/mm to about 120 N/mm, and a stiffness in the midfoot region 14 of about 60 N/mm to about 70 N/mm. In even yet another configuration, the plate 300 has a stiffness in the forefoot region 12 of about 95 N/mm to about 105 N/mm, and a stiffness in the midfoot region 14 of about 60 N/mm to about 70 N/mm.

In some implementations, the footwear plate 300 has a stiffness in the forefoot region 12 of about 80 N/mm to about 90 N/mm, and a stiffness in the heel region 16 of about 20 N/mm to about 30 N/mm. In another implementation, the footwear plate 300 has a stiffness in the forefoot region 12 of about 80 N/mm to about 90 N/mm, and a stiffness in the heel region 16 of about 50 N/mm to about 60 N/mm.

In some configurations, the plate 300 has a stiffness in the midfoot region 14 of about 60 N/mm to about 70 N/mm, and a stiffness in the heel region 16 of about 20 N/mm to about 30 N/mm. In another configuration, the plate 300 has a stiffness in the midfoot region 14 of about 60 N/mm to about 70 N/mm, and a stiffness in the heel region 16 of about 50 N/mm to about 60 N/mm.

In some scenarios, the plate 300 has a stiffness in the forefoot region 12 of about 75 N/mm to about 120 N/mm, and a stiffness in the heel region 16 of about 35 N/mm to about 45 N/mm. In other scenarios, the plate 300 has a stiffness in the forefoot region 12 of about 95 N/mm to about 105 N/mm, and a stiffness in the heel region 16 of about 35 N/mm to about 45 N/mm.

In some configurations, the plate 300 has a stiffness in the midfoot region 14 of about 20 N/mm to about 55 N/mm, and a stiffness in the heel region 16 of about 35 N/mm to about 45 N/mm. In other scenarios, the plate 300 has a stiffness in the midfoot region 14 of about 75 N/mm to about 120 N/mm, and a stiffness in the heel region 16 of about 35 N/mm to about 45 N/mm.

In some implementations, the plate 300 is formed by embroidering at least two tows 400 of fibers 450 in a layered configuration while being affixed to a same substrate, or by affixing at least two tows 400 of fibers 450 separately to corresponding substrates and stacking the substrates such that the at least two tows 400 of fibers 450 are embroidered in a layered configuration. As used herein, the substrate refers to any one of a veil, carrier, or backer at which the at least one tow 400 of fibers 450 affix to and bind with. The substrate may be formed from a thermoset polymeric material or a thermoplastic polymeric material and can be a textile (e.g., knit, woven, or non-woven), an injection molded article, an organosheet, or a thermoformed article. In some examples, the thermoplastic polymeric material used to form the substrate includes spunbond non-woven Nylon 6-6 manufactured by Cerex Advanced Fabrics, INC. having a density of within the range of about 10 grams per square meter (gsm) to about 50 gsm. In one example, the density of the Nylon 6-6 used to form the substrate is approximately 25 grams per square meter (gsm).

Generally, it is difficult to manufacture a non-flat (e.g., curved/contoured) and substantially rigid composite plate in its final state from a preform plate that is initially rigid and flat in shape. Implementations herein are directed toward an embroidered preform that affixes the one or more tows 400 of fibers 450 to the same substrate or different substrates and applying heat to mold the embroidered preform to form the footwear plate 300 with a desired shape and curvature. Thereafter, the plate 300 may be cured to impart structural rigidity. That is to say, both the substrate(s) and each tow 400 of fibers 450 are thin and flexible to allow the embroidered preform to be positioned into a mold to impart a curved shape to a plate 300 while allowing the finished plate 300 to have structural rigidity. In some examples, manufacturing the plate 300 includes infusing liquid thermoplastic material and/or liquid thermoset material into the embroidered preform (e.g., one or more tows 400 of fibers 450 affixed to the substrate) and using vacuum molding and/or compression molding techniques to form the plate 300. The liquid thermoplastic material and/or thermoset material may include a resin having at least one of polymerizable compositions or pre-polymer materials to assist with binding/affixing the one or more tows 400 to the substrate. Additional polymers/toughening agents (such as softer polymers, rubber, and/or block copolymers) may be added to the liquid thermoplastic material and/or the liquid thermoset material to reduce brittleness of the plate 300. The thermoplastic/thermoset materials may further include at least one of epoxy, polyurethane, and a pre-polymer.

In other examples, the substrate, or a portion thereof, is formed from a thermoset polymeric material and/or a thermoplastic polymeric material. The thermoplastic polymeric material includes a melting point below a melting point or degradation temperature of the fibers 450 of the tows 400. Here, incorporating the thermoplastic material and/or the thermoset polymeric material into the substrate may be used in addition to, or in lieu of, the liquid thermoplastic material and/or the liquid thermoset material infused into the embroidered preform to melt/infuse the embroidered preform during the vacuum molding process and/or the compression molding process. Additionally or alternatively, thermoplastic yarns may be comingled with the fibers 450 of the one or more tows 400 to assist with melting/infusing the embroidered preform during vacuum molding or compression molding. Optionally, the embroidered preform may be power coated with the thermoset and/or thermoplastic polymeric materials or injection-molding techniques may be used to overmold and/or impregnate the embroidered preform with the thermoset and/or thermoplastic polymeric materials.

Figure 5:
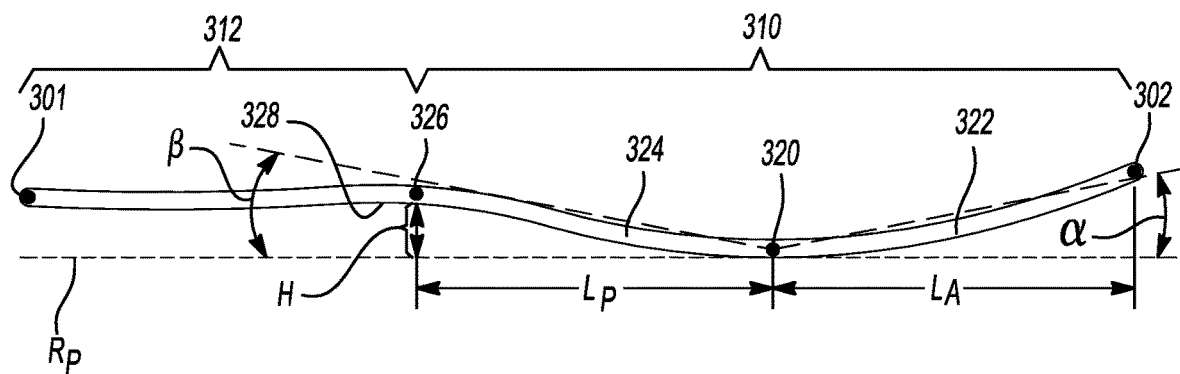
FIG. 5 is a side view of the footwear plate of FIG. 4.

FIG. 5 provides a side view of the footwear plate 300 of FIG. 4 showing the MTP point 320 as a closed point of the plate 300 to a horizontal reference plane RP extending substantially parallel to a ground surface (not shown). For instance, the MTP point 320 is tangent to the horizontal reference plane RP and may be disposed directly beneath the MTP joint of the foot when the foot is received by the interior void 102 of the footwear 10. In other configurations, the MTP point 320 is disposed beneath and slightly behind the MTP joint of the foot such that anterior curved portion 322 is underneath the MPT joint of the foot. The anterior curved portion 322 of the curved region 310 may define a corresponding radius of curvature and a length $L_A$ between the MTP point 320 and the AMP 302, while the posterior curved portion 324 of the curved region 310 may define a corresponding radius of curvature and a length $L_P$ between the MTP point 320 and the aft point 326. As used herein, the $L_A$ and $L_P$ are each measured along the horizontal reference plane RP between the MTP point 320 and respective ones of the AMP 302 and the aft point 326. In some examples, the $L_A$ of the anterior curved portion 322 accounts for approximately thirty percent (30%) of the length of the sole structure 200, the $L_P$ of the posterior curved portion 324 accounts for approximately thirty percent (30%) of the length of the sole structure 200, and the substantially flat portion 312 accounts for approximately forty percent (40%) of the length of the sole structure 200. In other examples, the $L_A$ of the anterior curved portion 322 is within the range from about twenty-five percent (25%) to about thirty-five percent (35%) of the length of the sole structure 200, the $L_P$ of the posterior curved portion 324 is within the range from about twenty-five percent (25%) to about thirty-five percent (35%) of the length of the sole structure 200, and the substantially flat region 312 includes the remainder of the length of the sole structure 200.

The radius of curvature associated with the anterior curved portion 322 results in the AMP 302 extending from the MTP point 320 at an angle α relative to the horizontal reference plane RP. Accordingly, the anterior curved portion 322 allows the toe segment 362 of the plate 300 to bias the toes of the foot in a direction away from the ground surface. The angle α may include a value within a range from about 12-degrees to about 35-degrees. In one example, angle α includes a value approximately equal to 24-degrees. Similarly, the radius of curvature associated with the posterior curved portion 324 results in the aft point 326 extending from the MTP point 320 at an angle β relative to the horizontal reference plane RP. The angle β may include a value within a range from about 12-degrees to about 35-degrees. In one example, angle β includes a value approximately equal to 24-degrees. In some configurations, angles α and β are substantially equal to one another such that the radii of curvature are equal to one another and share the same vertex. In other configurations, angles α and β are different from one another.

In some implementations, the aft point 326 is disposed along a blend portion 328 along the curved region 310 of the plate 300 that includes a radius of curvature configured to join the curved region 310 at the posterior curved portion 324 to the substantially flat region 312. Thus, the blend portion 328 is disposed between and connecting the constant radius of curvature of the curved region 310 and the substantially flat region 312. In some examples, the blend portion 328 includes a substantially constant radius of curvature. The blend portion 328 may allow the substantially flat region 312 of the plate 300 to extend between the first end 301 (posterior-most point) and the aft point 326 in a direction substantially parallel to the horizontal reference plane RP (as well as the ground surface). As a result of the radius of curvature of the posterior curved portion 324 and the radius of curvature of the blend portion 328, the aft point 326 may include the position height H above the MTP point 320. As used herein, the position height H of the aft point 326 corresponds to the separation distance extending in a direction substantially perpendicular to the horizontal reference plane RP between the aft point 326 and the reference plane RP. The position height H may include a value within the range from about 3 mm to about 28 mm in some examples, while in other examples the position height H may include a value within the range from about 3 mm to about 17 mm. In one example, the position height H is equal to about 17 mm. In some implementations, the posterior-most point 301 and the AMP 302 are co-planer at a junction of the blend portion 328 and the substantially flat region 312. The footwear plate 300 may incorporate any of the footwear plate geometries disclosed in U.S. Provisional Application Ser. No. 62/474,030, filed on Mar. 20, 2017, U.S. patent application Ser. No. 15/248,051, filed on Aug. 26, 2016, and U.S. patent application Ser No. 15/248,059, filed on Aug. 26, 2016, which are hereby incorporated by reference in their entirety.

Figure 6:
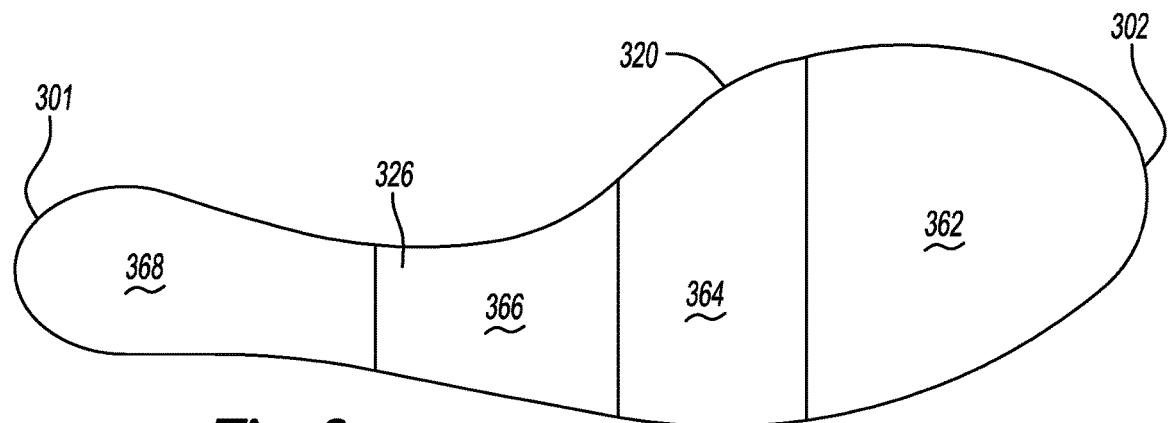
FIG. 6 is a top view of the footwear plate of FIG. 4.

FIG. 6 provides a top view of the footwear plate 300 of FIG. 4 showing the shape of the footwear plate 300 segmented across the length to define a toe segment 362, a MTP segment 364, a bridge segment 366, and a heel segment 368. The toe segment 362 corresponds to the toes of the foot and the MTP segment 364 corresponds to the MTP joint connecting the metatarsal bones with the phalanx bones of the foot. The toe segment 362 and the MTP segment 364 of the plate 300 may correspond to the forefoot portion 12 of the sole structure 200 of FIGS. 1-3. The bridge segment 366 corresponds with the arch area of the foot and connects the MTP segment 364 to the heel segment 368. The bridge segment 366 may correspond to the midfoot portion 14 and the heel segment 368 may correspond to the heel portion 16 when the plate 300 is incorporated into the sole structure 200. The MTP point 320 may reside within the MTP segment 364 joining the toe segment 362 to the bridge segment 366. The aft point 326 may be disposed within the bridge segment 366 at a location proximate to where the bridge segment 366 joins with the heel segment 368. For instance, the radius of curvature of the blend portion 328 (FIG. 5) may seamlessly join the bridge segment 366 associated with the posterior curved portion 324 to the heel segment 368 associated with the flat region 312 of the plate 300.

With reference to FIGS. 7 and 8A-8E, the footwear plate 300 is shown as being formed by using a series of stacked, prepreg fiber sheets 600a-600e. The prepreg fiber sheets 600a-600e may be formed from the same or different materials. For example, each of the sheets 600a-600e may be a unidirectional tape or a multi-axial fabric having a series of fibers 602 that are impregnated with resin. The resin may include a two part epoxy-amine resin manufactured by Applied Poleramics, Inc. under the tradename CR-157A/DD3-76-6B. The concentration of resin may range from about 25% to about 45%, and more preferably from about 30% to about 35%. The fibers 602 may include at least one of carbon fibers, aramid fibers, boron fibers, glass fibers, and other polymer fibers that form the unidirectional sheet or multi-axial fabric. Fibers such as carbon fibers, aramid fibers, and boron fibers may provide a high Young's modulus while glass fibers (e.g., fiberglass) and other polymer fibers (e.g., synthetic fibers such as polyamides other than aramid, polyesters, and polyolefins) provide a medium modulus. Alternatively, some of the sheets 600a-600e may be a unidirectional tape while others of the sheets 600a-600e are a multi-axial fabric. Further, each of the sheets 600a-600e may include fibers 602 formed from the same material or, alternatively, one or more of the sheets 600a-600e includes fibers 602 formed from a different material than the fibers 602 of the other sheets 600a-600e.

During manufacturing of the footwear plate 300, unidirectional tape or multi-axial fabric is provided and is cut into fiber plies. The plies are cut out and angled with respect to one another and the shapes of the various sheets 600a-600e are cut from the stacked plies into the shapes shown in FIGS. 8A-8E. In so doing, the sheets 600a-600e include fibers 602 formed at different angles relative to one another such that a longitudinal axis of the fibers 602 of the unidirectional tape or multi-axial fabric is positioned at an angle (Φ) relative to a longitudinal axis (L) of each sheet 600a-600e once cut. Accordingly, when the sheets 600a-600e are stacked on one another, the longitudinal axes of the fibers 602 are positioned at different angles relative to the longitudinal axis of the plate 300.

Figure 7:
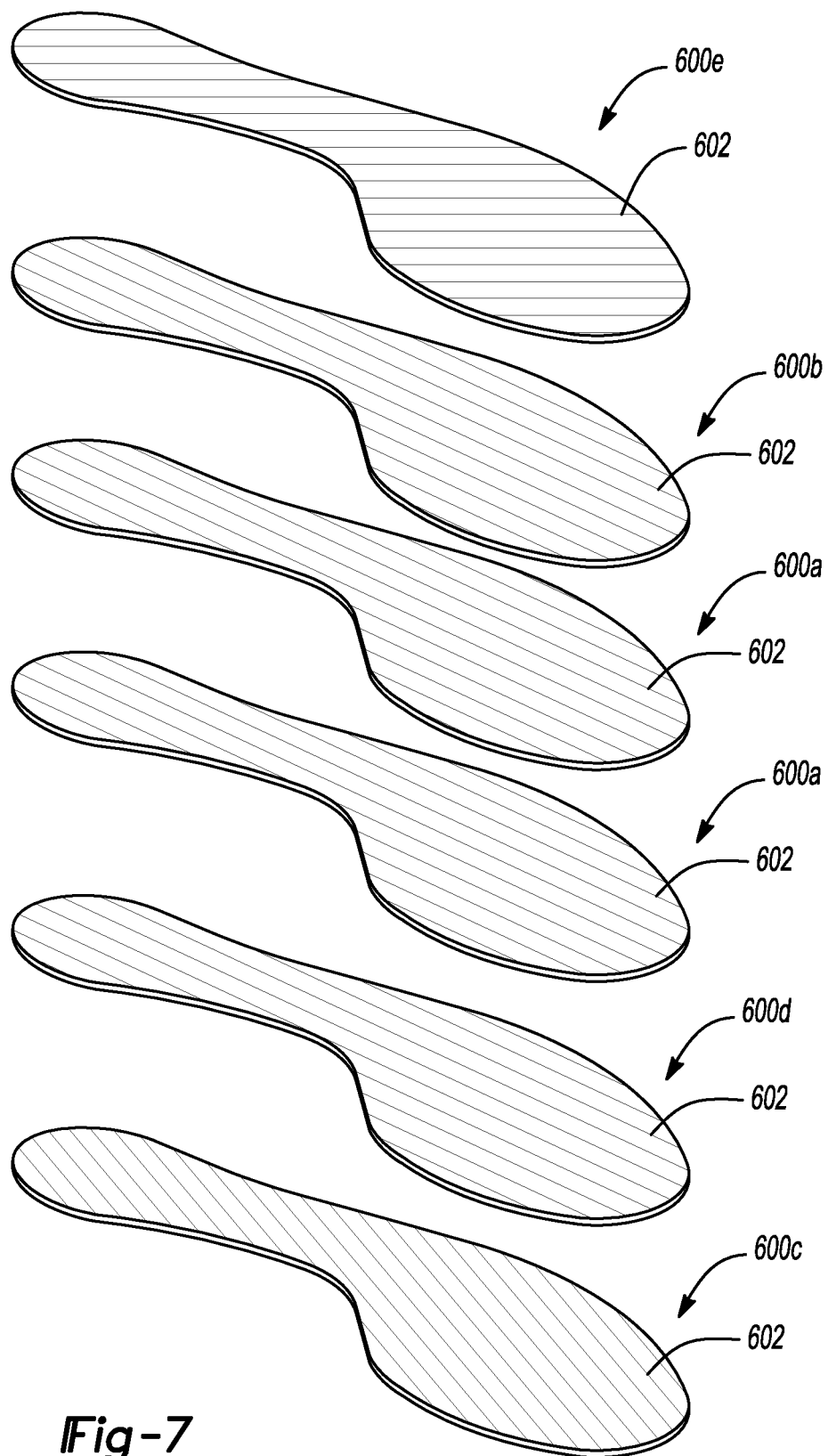
FIG. 7 is an exploded view of a stack of prepreg fiber sheets used to form a footwear plate in accordance with the principles of the present disclosure.
Figure 8E:
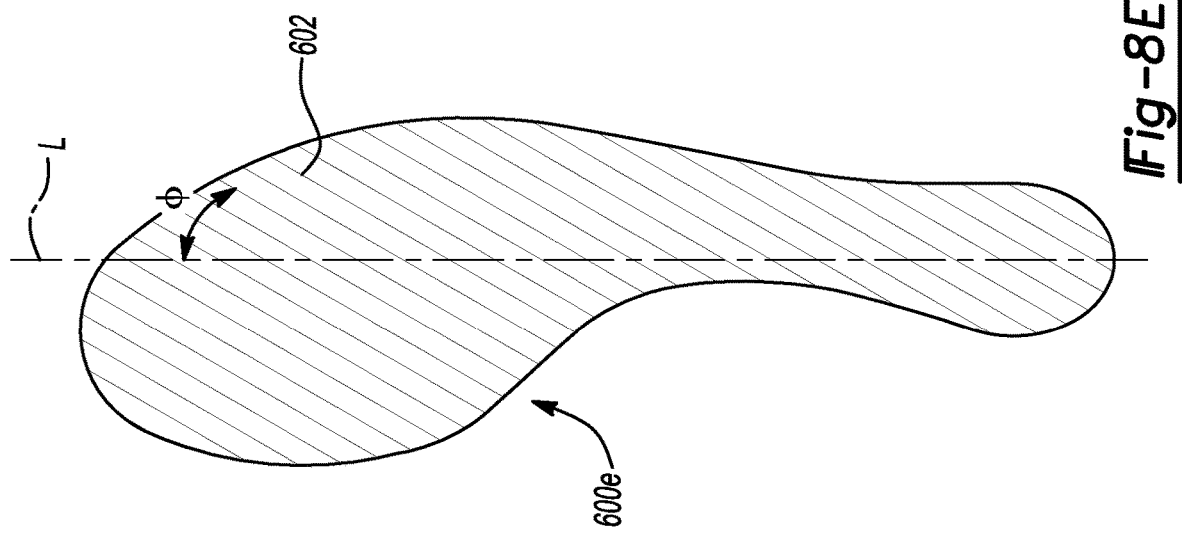
Figure 8D:
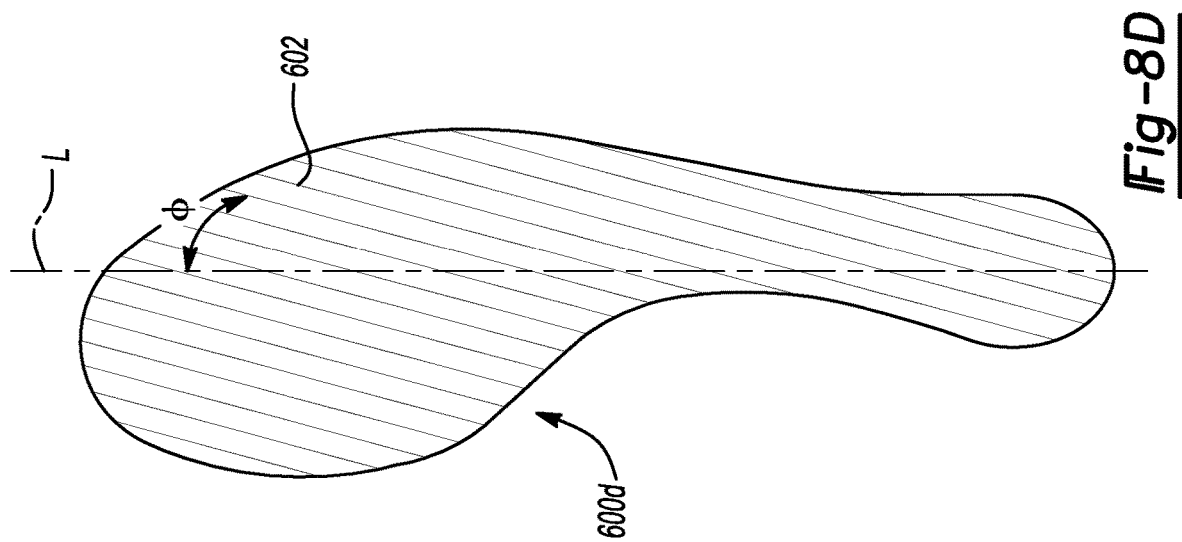

In one configuration, the angle (Φ) shown in FIG. 8A is zero degrees (0°), the angle (Φ) shown in FIG. 8B is −15 degrees (−15°), the angle (Φ) shown in FIG. 8C is −30 degrees (−30°), the angle (Φ) shown in FIG. 8D is 15 degrees (15°), and the angle (Φ) shown in FIG. 8E is 30 degrees (30°). When manufacturing the footwear plate 300, the plies are stacked such that when the sheets 600a-600e are cut from the stacked plies, the sheets 600a-600e have the shapes shown in FIGS. 8A-8E and are stacked in the order shown in FIG. 7. Namely, the bottom sheet 600c includes fibers 602 positioned at −30° relative to the longitudinal axis (L), the next sheet 600d includes fibers positioned at 15° relative to the longitudinal axis (L), the next two sheets 600a include fibers positioned at 0° relative to the longitudinal axis (L), the next sheet 600b includes fibers positioned at −15° relative to the longitudinal axis (L), and top and final sheet 600e includes fibers 602 positioned at 30° relative to the longitudinal axis (L). While the bottom sheet 600c is described as being positioned at an angle (Φ) of −30° relative to the longitudinal axis (L) and the top sheet 600e is described as being positioned at an angle (Φ) of 30° relative to the longitudinal axis (L), the bottom sheet 600c could alternatively be positioned at an angle (Φ) of −15° relative to the longitudinal axis (L) and the top sheet 600e could alternatively be positioned at an angle (Φ) of 15° relative to the longitudinal axis (L). Further, while two (2) sheets 600a are described as being provided at an angle (Φ) of 0° relative to the longitudinal axis (L), more than two sheets 600a at an angle (Φ) of 0° could be provided. For example, eight (8) sheets 600a could be provided. In one configuration, three (3) sheets 600a provided at the angle (Φ) of 0° relative to the longitudinal axis (L) are provided as the three middle layers, while the bottom sheet 600c is positioned at the angle (Φ) of −15° or −30° relative to the longitudinal axis (L) and the top sheet 600e is positioned at the angle (Φ) of 15° or 30° relative to the longitudinal axis (L). In this configuration, the completed footwear plate 300 is formed from seven (7) sheets/plies stacked in a layered configuration.

Once the plies are stacked and cut into the sheets 600a-600e, the stack is subjected to heat and pressure to impart the specific shape of the footwear plate 300 to the staked sheets 600a-600e, as will be described in detail below in FIGS. 20 and 21. Additionally, when fibers which are pre-impregnated with resin are used, subjecting the stack to heat and pressure can melt or soften the pre-impregnated resin and affix the plies together and hold them in the specific shape. Alternatively or additionally, a liquid resin can be applied to the plies to affix the plates together and in some cases to consolidate the fibers, thereby increasing the tensile strength of the plate once the resin has solidified. The pre-impregnated resin may include a two part epoxy-amine resin manufactured by Applied Poleramics, Inc. under the tradename CR-157A/DD3-76-6B. The concentration of resin may range from about 25% to about 45%, and more preferably from about 30% to about 35%.

With reference to FIGS. 9 and 10A-10E, the footwear plate 300 is shown as being formed by using a process of affixing strands 702 of fibers to a substrate 704. Namely, the footwear plate 300 is formed from one or more strands 702 of fibers arranged in selected patterns to impart anisotropic stiffness and gradient load paths throughout the footwear plate 300. The strands 702 of fibers may be affixed to the same or separate substrates 704 and embroidered in a layered configuration. If the strands 702 of fibers are applied to separate substrates 704, the individual substrates 704 are stacked on top of one another once each substrate 704 is supplied with a strand 702 of fibers. If, on the other hand, only one substrate 704 is utilized in forming the footwear plate 300, a first strand 702 of fibers is applied to the substrate 704 with additional strands 702 of fibers (i.e., layers) being applied on top of the first strand 702. Finally, a single, continuous strand 702 of fibers may be used to form the footwear plate 300, whereby the strand 702 is initially applied and affixed to the substrate 704 and is subsequently layered on top of itself to form the layered construction shown in FIG. 9. While each of the foregoing processes may be used to form the footwear plate 300, the following process will be described as employing a single substrate 704 with individual strands 702 of fiber applied to form the construction shown in FIG. 9, whereby individual strands 702a-702e respectively form layers 700a-700e of a pre-formed plate, i.e., the footwear plate 300 of FIGS. 1-6.

Each strand 702a-702e may refer to a tow of a plurality of fibers, a monofilament, yarn, or polymer pre-impregnated tows. For example, the strand 702 may include a plurality of carbon fibers and a plurality of resin fibers that, when activated, solidify and hold the carbon fibers in a desired shape and position relative to one another. As used herein, the term "tow" refers to a bundle (i.e., plurality of filaments (e.g., fibers 450) that may be twisted or untwisted and each tow may be designated a size associated with a number of fibers the corresponding tow contains. For instance, a single strand 702 may range in size from about 1,000 fibers per bundle to about 48,000 fibers per bundle. As used herein, the substrate 704 refers to any one of a veil, carrier, or backer to which at least one strand 702 of fibers is attached. The substrate 704 may be formed from a thermoset polymeric material or a thermoplastic polymeric material and can be a textile (e.g., knit, woven, or non-woven), an injection molded article, an organosheet, or a thermoformed article. In some configurations, the fibers associated with each strand 702 include at least one of carbon fibers, boron fibers, glass fibers, and polymeric fibers. Fibers such as carbon fibers, aramid fibers, and boron fibers may provide a high Young's modulus while glass fibers (e.g., fiberglass) and polymer fibers (e.g., synthetic fibers) provide a medium modulus.

When forming the plate 300, a first strand 702c may be applied to the substrate 704. Namely, the first strand 702c may be applied directly to the substrate 704 and may be stitched to the substrate 704 to hold the first strand 702c in a desired location. In one configuration, the first strand 702c is applied to the substrate 704 such that the strand 702c is positioned at an angle ($\Phi$) shown in FIG. 10C as being −30 degrees (−30°) relative to a longitudinal axis (L) of the substrate 704. Another or second strand 702d may be applied to the first strand 702c via stitching, for example, and may be formed at an angle ($\Phi$) shown in FIG. 10D as being 15 degrees (15°) relative to a longitudinal axis (L) of the substrate 704. In some examples, the first strand 702c attaches to the substrate 704 via first stitching that crosses over the first strand 702c and penetrates the substrate 704 at first attachment locations that are spaced apart from the first strand. A third strand 702a may be applied to the second strand at an angle ($\Phi$) shown in FIG. 10A as being zero degrees (0°) relative to a longitudinal axis (L) of the substrate 704. A fourth strand 702b may be applied to the third strand at an angle ($\Phi$) shown in FIG. 10B as being −15 degrees (−15°) relative to a longitudinal axis (L) of the substrate 704. A fifth and final strand 702e may be applied to the second strand at an angle ($\Phi$) shown in FIG. 10E as being 30 degrees) (30°) relative to a longitudinal axis (L) of the substrate 704. While the first strand 702c is shown and described as being applied at an angle ($\Phi$) shown in FIG. 10C as being −30 degrees (−30°) relative to a longitudinal axis (L) of the substrate 704 and the fifth strand 702e is shown and described as being applied at an angle ($\Phi$) shown in FIG. 10E as being 30 degrees (30°) relative to a longitudinal axis (L) of the substrate 704, these angles ($\Phi$) could alternatively be −15 degrees) (−15°) and 15 degrees (15°), respectively.

The strands 702a-702e form the various layers 700a-700e of a pre-formed plate 300. Once the layers 700a-700e are formed, the layers 700a-700e are subjected to heat and pressure to activate the impregnated resin of the various strands 702a-702e and, further, to impart the specific shape of the plate 300 to the layers 700a-700e, as will be described in detail below in FIGS. 20 and 21.

As set forth above, the footwear plate 300 is formed using a carbon fiber plate (CFP) process that includes one fewer layer than by forming the plate 300 via the prepreg fiber sheets 600a-600e. Namely, the CFP process may only utilize a single layer 700a having an angle ($\Phi$) shown in FIG. 10A as being zero degrees (0°) relative to a longitudinal axis (L) of the substrate 704. While the CFP process uses one less layer in forming the plate 300, the resulting plate 300 has substantially the same properties (i.e., stiffness, thickness, etc.) to the plate 300 when using a prepreg fiber sheet. However, in other configurations, the CFP process may utilize two (2) or more layers 700a provided at the angle ($\Phi$) of 0° relative to the longitudinal axis (L) to form the footwear plate 300 from six (6) or more layers 700a-700e of strands 702a-702e of fibers.

Figure 11:
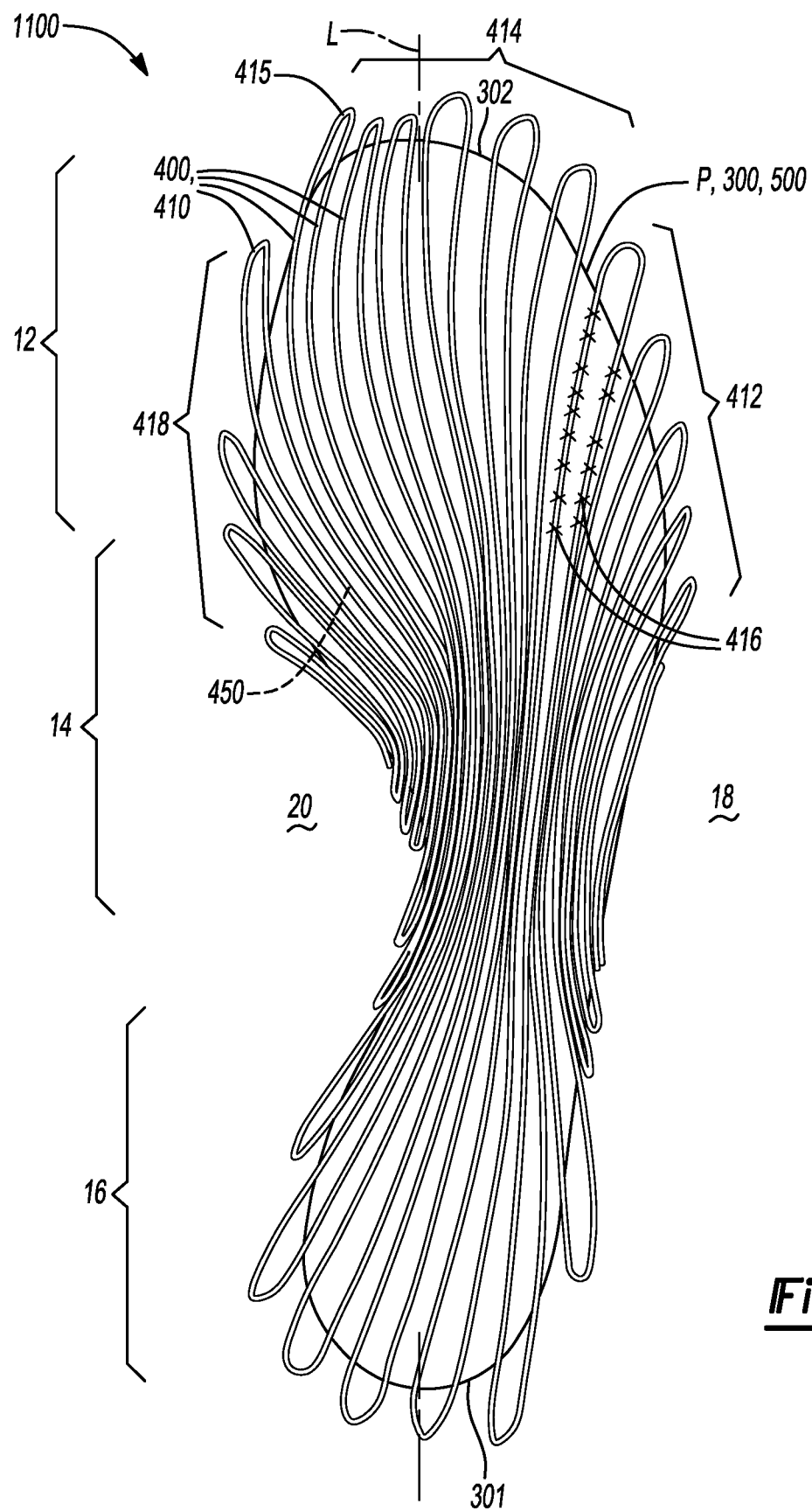
FIG. 11 is a top view of a first tow of fibers used to form a corresponding layer of a footwear plate in accordance with principles of the present disclosure.
Figure 12:
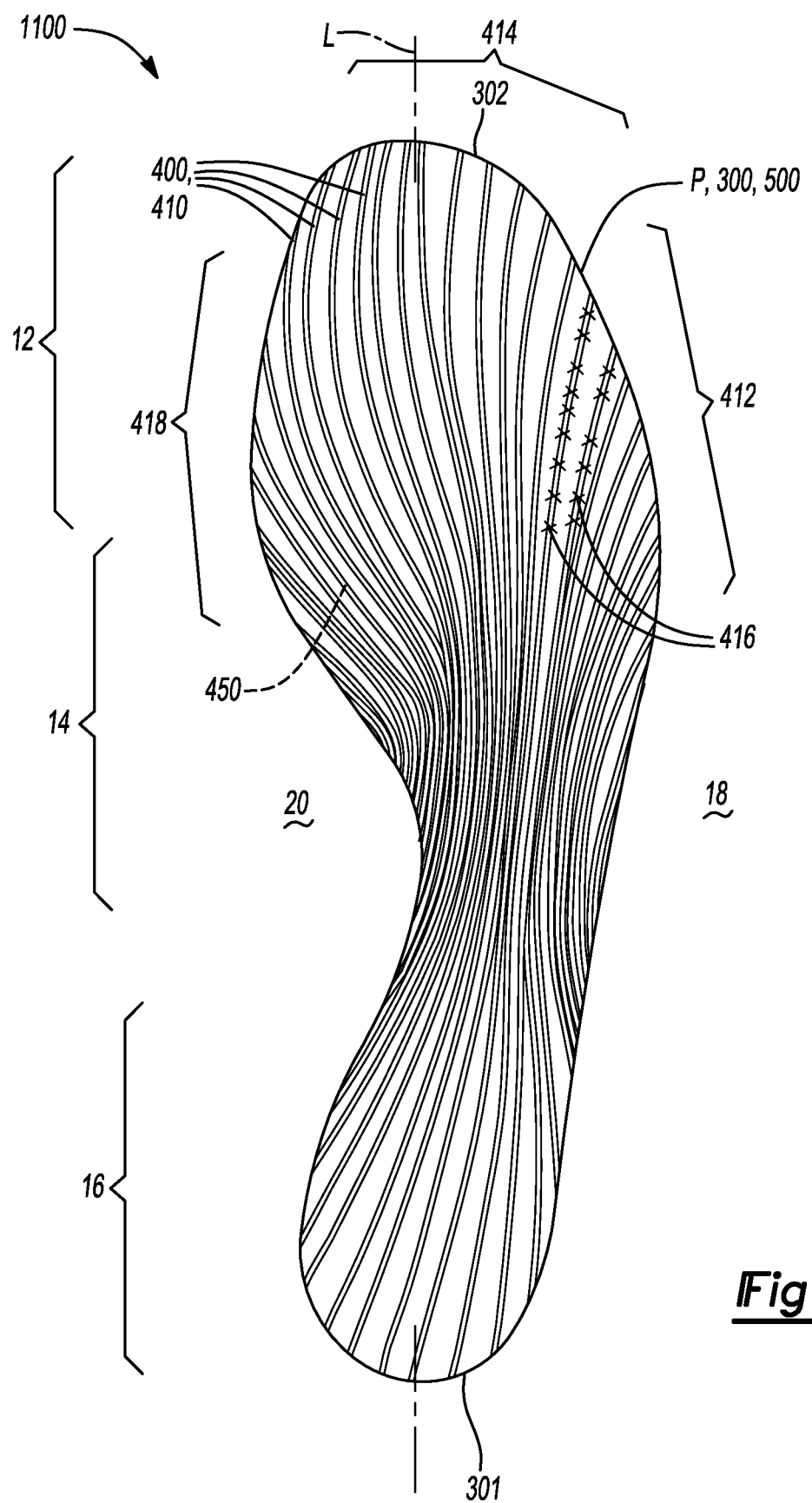
FIG. 12 is a top view of the first tow of fibers of FIG. 11 cut to align around a perimeter of the finished footwear plate.

FIGS. 11 and 12 provide a top view of a first strand/tow 400, 410 of fibers 450 that may form a layer 1100 of the footwear plate 300. The pattern of the first tow 410 of fibers 450 is shown relative to a peripheral edge P of the finished footwear plate 300. In some examples, the first tow 410 is affixed/attached to a base layer that includes a corresponding substrate 500, e.g., substrate 704. In other examples, the first tow 410 is affixed/attached on top of a base layer that includes an underlying sheet 600a-600e (FIG. 7) (e.g., unidirectional tape) or layer 700a-700e (FIG. 9) (e.g., strand/tow) of fibers all affixed/attached to a single substrate 500 in a layered configuration. For instance, one or more layers 1100 of the first tow 410 of fibers 450 may replace one or more of the sheets 600a-600e of FIG. 7 or layers 700a-700e of FIG. 9 to form the finished footwear plate 300. Accordingly, any layers/sheets 600a-600e, 700a-700e of fibers lying underneath or over top the layer 1100 associated with the first tow 410 of fibers 450 are omitted from the examples shown in FIGS. 11 and 12.

In some examples, the first tow 410 is formed from a corresponding continuous strand of fibers 450. In other configurations, however, the first tow 410 is formed from two or more strands of fibers 450. The first tow 410 may range in size from about 1,000 fibers per bundle to about 48,000 fibers per bundle. In some examples, the first tow 410 includes 12,000 fibers per bundle. The first tow 410 may include the same or different fiber types than the fiber types forming the layers/sheets 600a-600e, 700a-700e of fibers lying underneath or over top the first tow in the layered configuration to form the finished footwear plate 300. For instance, the first tow 410 may include at least one of carbon fibers, boron fibers, glass fibers, and polymeric fibers. The fibers 450 may be comingled with a thermoset polymer material and/or a thermoplastic polymer material to assist with affixing the first tow 410 to the substrate 500 and/or any layers/sheets 600a-600e, 700a-700e of fibers lying underneath or over top first tow 410 of fibers 450 to form the plate 300.

FIG. 11 shows the first tow 410 of fibers 450 including looped portions 415 disposed outside the peripheral edge P of the footwear plate 300 or substrate 500 for connecting adjacent segments/courses 412, 414, 418 of the first tow 410. The loop portions 415 may be consolidated when the first tow 410 and other layers/sheets 600a-600e, 700a-700e are subjected to heat and pressure to consolidate the fibers 450, and thereby form the footwear plate 300. In some scenarios, the looped portions 415 extending outside the peripheral edge P create pinch points when the layered configuration is subjected to pressure (e.g., molding) for consolidating the fibers 450 to form the footwear plate 300. Accordingly, FIG. 12 shows the first tow 410 of fibers 450 cut along the peripheral edge P of the footwear plate 300 to remove the looped portions 415, thereby removing the presence of pinch points when applying pressure to form the finished footwear plate 300.

In some configurations, the first tow 410 of fibers attaches to the substrate 500 via stitching 416. For example, the stitching 416 may zigzag across the first tow 410 between first attachment locations located on the substrate 500 or a layer of fibers (e.g., strand or unidirectional tape) lying underneath. Here, the attachment locations may be spaced apart from the first tow 410 along the perimeter edge P of the finished footwear plate 300. The stitching 416 may be formed from the same material as the substrate 500 or the stitching 416 may be formed from a different material than the material forming the substrate 500 such that the stitching 416 is associated with a higher melting point than the substrate 500. Providing the stitching 416 with a higher melting point than the substrate 500 allows the stitching 416 to melt after the substrate 500 when heat is applied, thereby allowing the stitching 416 to melt after the substrate 500 begins to melt. In some examples, the stitching 416, or at least a portion thereof, is formed from resin. In some configurations, a sheet 600a-600e (FIG. 7) (e.g., unidirectional tape) or layer 700a-700e (FIG. 9) (e.g., strand/tow) of fibers 602, 702 is disposed between the substrate 500 and the first tow 410 and the stitching 416 may zigzag across the first tow 410 between attachment locations located on the substrate 500. In these configurations, the stitching 416 may penetrate the substrate 500 at the attachment locations and/or may also extend through the sheet/layer 600a-600e, 700a-700e of fibers 602, 702 disposed upon the substrate 500 and underlying the first tow 410. For instance, the stitching 416 may attach the first tow 410 of fibers 450 to the substrate 500 by crossing over the first tow 410 of fibers 450, extending through the sheet/layer 600a-600e, 700a-700e of fibers 602, 702, and penetrating the substrate 500 at the attachment locations.

The first tow 410 of fibers 450 includes a plurality of lateral courses/segments 412, a plurality of interior courses/segments 414, and a plurality of medial courses/segments 418. The lateral segments 412 may be disposed adjacent and substantially parallel to one another. Each lateral segment 412 has a corresponding length that extends between a corresponding first end proximate to the perimeter edge P at the lateral side 18 in the forefoot region 12 or the midfoot region 14, and a corresponding second end proximate to the perimeter edge P at the lateral side 18 in the heel region 16 or the midfoot region 14. Moreover, each lateral segment 412 of the first tow 410 traverses the footwear plate 300 in the shape of a "C" such that portions along the length of each lateral segment 412 extend into the interior region along the midfoot region 14 of the footwear plate 300. Here, portions of the segments 412 may extend in a direction substantially parallel to the longitudinal axis L of the footwear plate 300 in the midfoot region 14. FIGS. 11 and 12 show a spacing between each adjacent lateral segment 412 that is closer in the midfoot region 14 than in the forefoot region 12 and/or the heel region 16. In other words, the distances separating adjacent lateral segments 412 decreases as the segments 412 traverse away from the lateral side 18 of the footwear plate 300 and toward the interior region.

On the other hand, each medial segment 418 has a corresponding length that extends between a corresponding first end proximate to the perimeter edge P at the medial side 20 in the forefoot region 12 or the midfoot region 14, and a corresponding second end proximate to the perimeter edge P at the medial side 20 in the heel region 16 or the midfoot region 14. Here, the medial segments 418 of the first tow 410 define a shape inverted relative to the shape of the lateral segments 412 such that each medial segment 418 traverses the footwear plate 300 in the shape of a "backwards C." Accordingly, portions along the length of each medial segment 418 extend into the interior region along the midfoot region 14 of the footwear plate 300. As with the lateral segments 412, portions of the medial segments 418 may extend in a direction substantially parallel to the longitudinal axis L of the footwear plate 300 in the midfoot region 14. FIGS. 11 and 12 show a spacing between each adjacent medial segment 418 is closer in the midfoot region 14 than in the forefoot region 12 and/or the heel region 16. In other words, the distances separating adjacent medial segments 418 decreases as the segments 412 traverse away from the medial side 20 of the footwear plate 300 and toward the interior region.

The interior segments 414 of the first tow 410 of fibers 450 are disposed between the lateral segments 412 and the medial segments 418 and define corresponding lengths that extend along the length of the footwear plate 300 between the first end 301 and the second end 302 of the footwear plate 300. The interior segments 414 may be disposed adjacent and substantially parallel to one another and traverse the footwear plate 300 in the shape of an "S" through the interior regions of the plate 300. As with the lateral segments 412 and the medial segments 418, a spacing between each adjacent interior segment 414 is closer in the midfoot region 14 than in the forefoot region 12 and in the heel region 16. Thus, the distances separating adjacent interior segments 414 increases as the segments 414 extend away from the midfoot region 14 in opposite directions toward the forefoot and heel regions 12, 16, respectively.

Due to the spacing between adjacent segments 412, 414, 418 of the first tow 410 of fibers 450 being closer in the midfoot region 14 compared to the spacing in the forefoot and heel regions 12, 16, respectively, the segments 412, 414, 418 collectively provide a greater concentration/density of fibers 450 in the midfoot region 14 compared to the concentration/density of fibers in the forefoot and heel regions 12, 16, respectively. Accordingly, the first tow 410 of fibers 450 provides the footwear plate 300 with a stiffness in the midfoot region 14 that is greater than the stiffness of the footwear plate 300 in each of the forefoot region 12 and the heel region 16.

In one configuration, the layer 1100 associated with the first tow 410 of fibers 450 is provided as a top and final layer of the stacked, prepreg fiber sheets 600a-600e stacked in the order shown in FIG. 7. Here, the first tow 410 of fibers 450 may be affixed/attached to the underlying sheet 600e that includes the fibers 602 positioned at the angle (Φ) of 30° or 15° relative to the longitudinal axis (L) to form the footwear plate 300 from seven (7) sheets/plies. In another configuration, the layer 1100 associated with the first tow 410 of fibers 450 is provided as a top and final layer of the strands 702a-702e forming the various layers 700a-700e layered in the order shown in FIG. 9. Here, the first tow 410 of fibers 450 may be affixed/attached (e.g., via stitching 416) to the underlying layer 700e that includes the fifth strand 702e of fibers positioned at the angle (Φ) of 30° or 15° relative to the longitudinal axis (L) to form the footwear plate 300.

Figure 13:
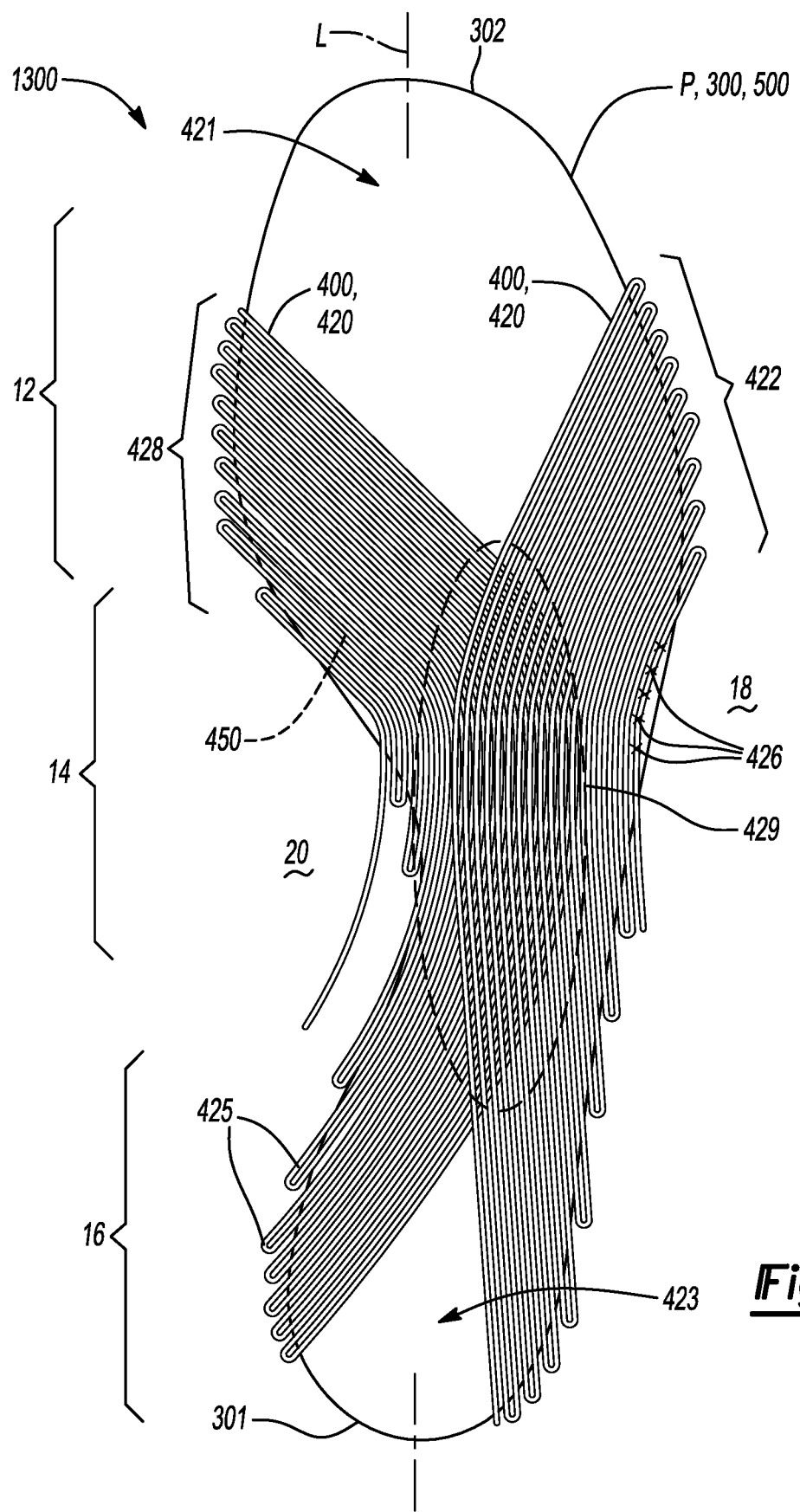
FIG. 13 is a top view of a second tow of fibers used to form a corresponding layer of a footwear plate in accordance with principles of the present disclosure.
Figure 14:
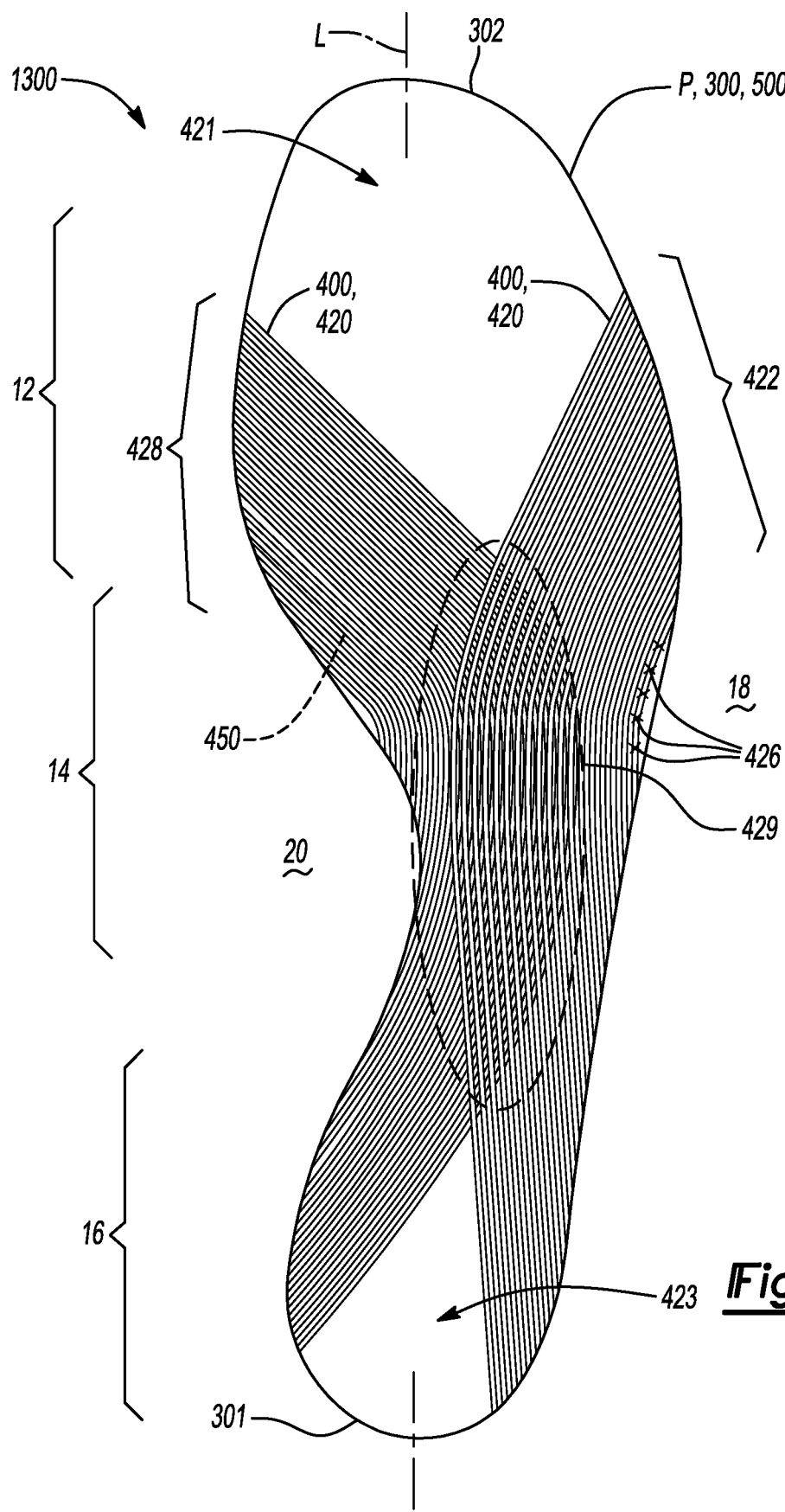
FIG. 14 is a top view of the second tow of fibers of FIG. 13 cut to align around a perimeter of the finished footwear plate.

FIGS. 13 and 14 provide a top view of a second strand/tow 400, 420 of fibers 450 that may form a layer 1300 of the footwear plate 300. The pattern of the second tow 420 of fibers 450 is shown relative to a peripheral edge P of the finished footwear plate 300. In some examples, the second tow 420 is affixed/attached to a base layer that includes a corresponding substrate 500, e.g., substrate 704. In other examples, the second tow 420 is affixed/attached on top of a base layer that includes an underlying sheet 600a-600e (FIG. 7) (e.g., unidirectional tape) or layer 700a-700e (FIG. 9) (e.g., strand/tow) of fibers 602, 702 all affixed/attached to a single substrate 500 in a layered configuration. For instance, one or more layers 1300 of the second tow 420 of fibers 450 may replace one or more of the sheets 600a-600e of FIG. 7 or layers 700a-700e of FIG. 9 to form the finished footwear plate 300. Accordingly, any layers/sheets 600a-600e, 700a-700e of fibers 602, 702 lying underneath or over top the layer 1300 associated with the second tow 420 of fibers 450 are omitted from the examples shown in FIGS. 13 and 14.

As with the first tow 410 of fibers 450 of FIGS. 11 and 12, the second tow 420 of fibers 450 may be formed from a corresponding continuous strand of fibers 450 or two or more strands of fibers 450, and may include at least one of carbon fibers, boron fibers, glass fibers, and polymeric fibers. The fibers 450 of the second tow 420 may also be comingled with a thermoset polymer material and/or a thermoplastic polymer material. Similar to the looped portions 415 associated with the first tow 410, FIG. 13 shows the second tow 420 including corresponding looped portions 425 disposed outside the peripheral edge P of the plate/substrate 300, 500 for connecting adjacent segments 422, 428 of the second tow 420. To eliminate the presence of pinch points when subjecting the second tow 420 to pressure (e.g., molding) to form the footwear plate 300, FIG. 14 shows the second tow 420 of fibers 450 cut along the peripheral edge P to remove the looped portions 425 extending outside the peripheral edge P.

In some configurations, the second tow 420 of fibers attaches to the substrate 500, or a sheet 600a-600e (FIG. 7) (e.g., unidirectional tape) or layer 700a-700e (FIG. 9) (e.g., strand/tow) of fibers 602, 702 lying underneath, via stitching 426. For example, the stitching 426 may zigzag across the second tow 420 between attachment locations located on the substrate 500 or the strand/layer 600a-600e, 700a-700e of fibers 602, 702 lying underneath. Here, the attachment locations may be spaced apart from the second tow 420 along the perimeter edge P of the finished footwear plate 300. The stitching 426 may be formed from the same materials (e.g. resin) as the stitching 416 of FIGS. 11 and 12 to allow the stitching 426 to melt after the substrate 500 begins to melt when heat is applied, thereby allowing the stitching 416 to melt after the substrate 500 begins to melt. In some examples, the stitching 426 may penetrate the substrate 500 at the attachment locations and/or may also extend through the sheet/layer 600a-600e, 700a-700e of fibers 602, 702 disposed upon the substrate 500 and underlying the second tow 420. For instance, the stitching 426 may attach the second tow 420 of fibers 450 to the substrate 500 by crossing over the second tow 420 of fibers 450, extending through the sheet/layer 600a-600e, 700a-700e of fibers 602, 702, and penetrating the substrate 500 at the attachment locations.

The second tow 420 of fibers 450 includes a plurality of lateral courses/segments 422 and a plurality of medial courses/segments 428 that interweave or overlap within an interior region 429 of the footwear plate 300 in the midfoot region 14. In some configurations, the lateral courses/segments 422 and the medial courses/segments 428 are associated with separate toes of fibers 420. The lateral segments 422 may be disposed adjacent and substantially parallel to one another, whereby each lateral segment 422 has a corresponding length that extends between a corresponding first end proximate to the perimeter edge P at the lateral side 18 in the forefoot region 12, and a corresponding second end proximate to the perimeter edge P at the lateral side 18 in the heel region 16. The lateral segments 422 traverse the footwear plate 300 in the shape of a "C" such that portions along the corresponding length of each lateral segment 412 extend into the interior region 429. Here, the portions of the lateral segments 422 in the interior region 429 extend in a direction substantially parallel to the longitudinal axis L of the footwear plate 300. In some implementations, the spacing between each adjacent lateral segment 422 is substantially uniform across the lengths of the lateral segments 422.

On the other hand, each medial segment 428 has a corresponding length that extends between a corresponding first end proximate to the perimeter edge P at the medial side 20 in the forefoot region 12, and a corresponding second end proximate to the perimeter edge P at the medial side 20 in the heel region 16. The shape of the medial segments 428 are inverted relative to the shape of the lateral segments 422, and therefore traverse the footwear plate 300 in the shape of a "backwards C" such that portions along the corresponding length of each medial segment extend into the interior region 429. Here, the portions of the medial segments 428 in the interior region 429 extend in a direction substantially parallel to the longitudinal axis L of the footwear plate 300.

The medial segments 428 extending into and out of the interior region 429 may cross-cross, overlap, and/or interweave with one or more of the lateral segments 422 extending into and out of the interior region 429. While the spacing between each adjacent medial segment 428 may be substantially uniform across the lengths of the medial segments 428, each medial segment 428 may be disposed between two corresponding lateral segments 422 in an alternating fashion within the interior region 429. Accordingly, the lateral segments 422 and the medial segments 428 of the second tow 420 may extend substantially parallel to the longitudinal axis L within the interior region 429 and diverge away from one another when extending toward their respective ends at one of the lateral and medial sides 18, 20, respectively. In some implementations, the second tow 420 provides the layer 1300 with a greater concentration/density of fibers 450 within the interior region 429 compared to the concentration/density of fibers outside the interior region 429, thereby increasing the stiffness of the footwear plate 300 within the interior region 429. In some examples, the stitching 426 zigzags across the lateral segments 422 within the interior region 429 to attach the lateral segments 422 to the substrate 500 and also zigzags across the medial segments 428 within the interior region 429 to attach the medial segments 428 to the substrate 500 at corresponding attachment locations within the interior region 429. In some configurations, the stitching 426 may attach the lateral segments 422 and the medial segments 428 to the substrate 500 by zigzagging across one of the lateral segments 422 and the medial segments 428 within the interior region 429, extending through the other one of the lateral segments 422 and the medial segments 428 within the interior region 429, and penetrating the substrate 500 at the attachment locations within the interior region 429. Moreover, comingling the fibers 450 of the second tow 420 with the thermoset polymer material and/or the thermoplastic polymer material may facilitate bonding between the corresponding layer 1300 associated with the second tow/strand 400, 420 of fibers 450, the substrate 500, and/or any other sheets/layers 600a-600e, 700a-700e lying underneath or over top to form the footwear plate 300 when heat and pressure is applied.

Whereas the first tow 410 of fibers 450 includes interior segments 414 extending along the length of the plate 300, the second tow 420 of fibers 450 defines a void 421 in the forefoot region 12 and a void 423 in the heel region 16 whereat the presence of fibers 450 is absent. In some examples, the voids 421, 423 expose one or more layers/sheets 600a-600e, 700a-700e situated underneath the layer 1300 associated with the second tow 420 of fibers 450. When incorporated in a layered configuration to form the footwear plate 300, the layer 1300 associated with the second tow 420 does not impart any stiffness properties in the areas of the forefoot region 12 and the heel region 16 where the voids 421 and 423 are formed.

Figure 15:
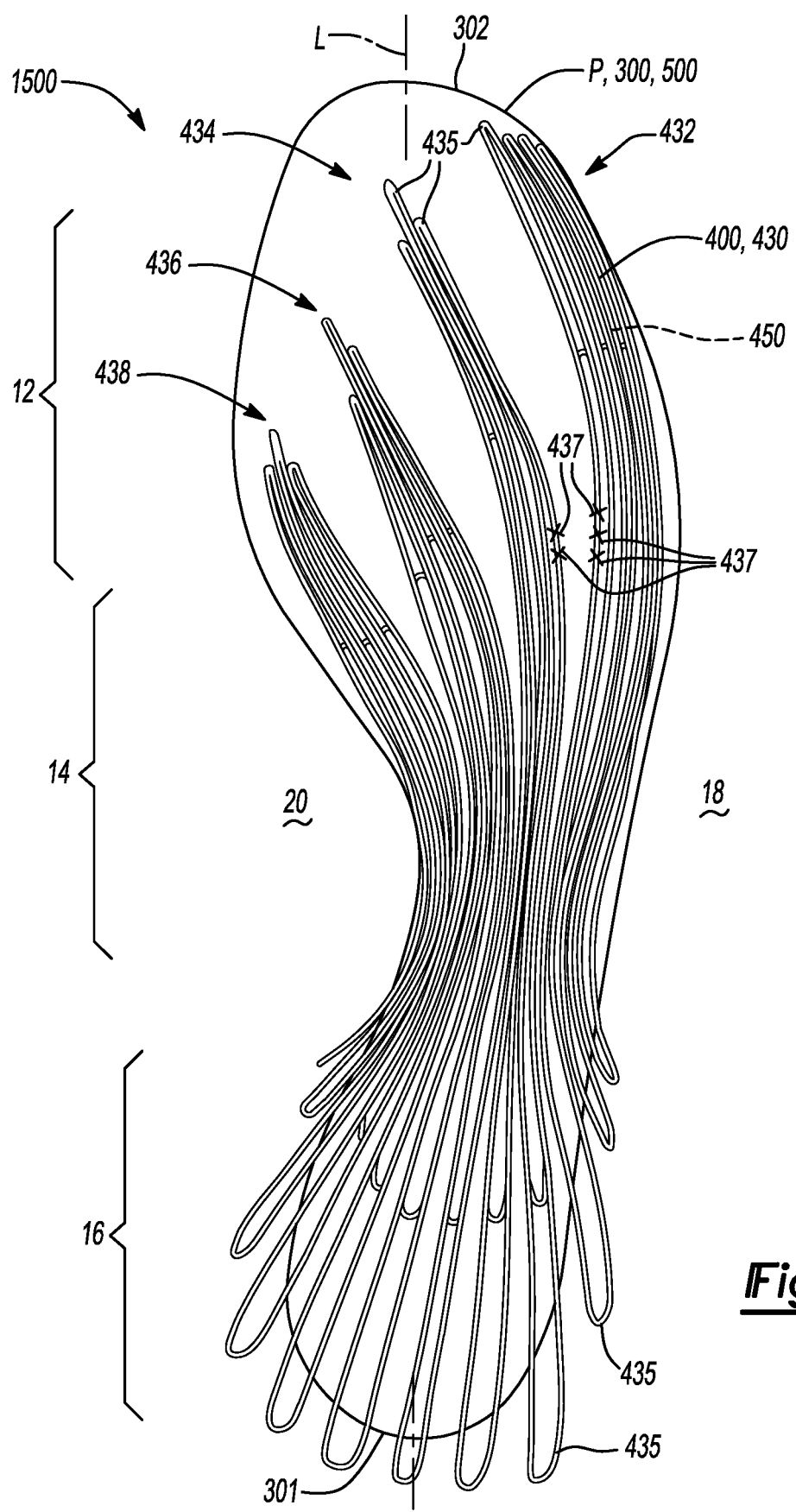
FIG. 15 is a top view of a third tow of fibers used to form a corresponding layer of a footwear plate in accordance with principles of the present disclosure.
Figure 16:
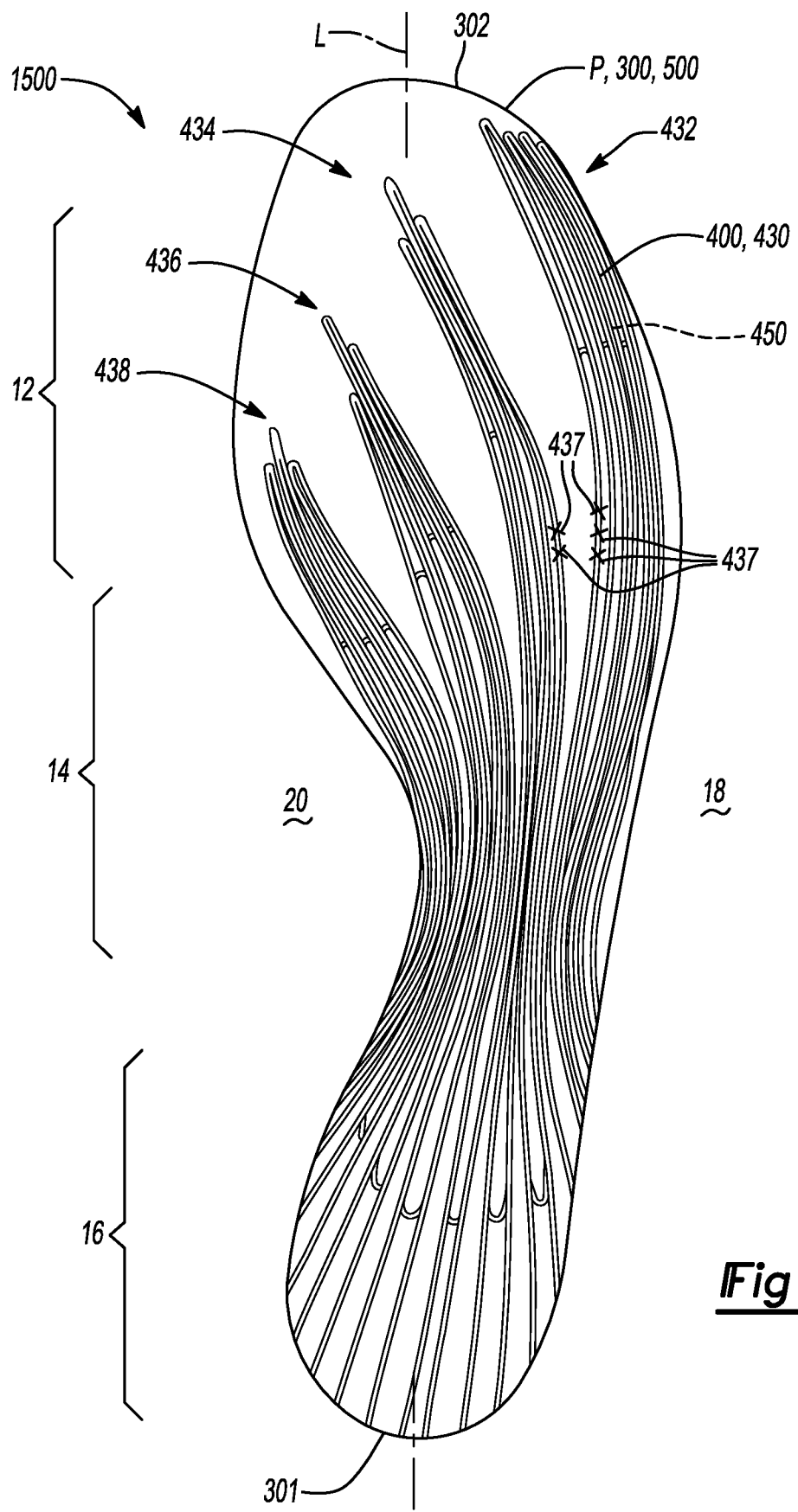
FIG. 16 is a top view of the third tow of fibers of FIG. 15 cut to align around a perimeter of the finished footwear plate.

FIGS. 15 and 16 provide a top view of a third tow/strand 400, 430 of fibers 450 that may form a layer 1500 of the footwear plate 300. The pattern of the third tow 430 of fibers 450 is shown relative to a peripheral edge P of the finished footwear plate 300. In some examples, the third tow 430 is affixed/attached to a base layer that includes a corresponding substrate 500. In other examples, the third tow 430 is affixed/attached on top of a base layer that includes an underlying sheet 600a-600e (FIG. 7) (e.g., unidirectional tape) or layer 700a-700e (FIG. 9) (e.g., strand/tow) of fibers 602, 702 all affixed/attached to a single substrate 500 in a layered configuration. For instance, one or more layers 1500 of the third tow 430 of fibers 450 may replace one or more of the sheets 600a-600e of FIG. 7 or layers 700a-700e of FIG. 9 to form the finished footwear plate 300. Accordingly, any layers/sheets 600a-600e, 700a-700e of fibers lying underneath or over top the layer 1500 associated with the third tow 430 of fibers 450 are omitted from the examples shown in FIGS. 15 and 16.

In some configurations, the third tow 430 of fibers 450 attaches to the substrate 500, or the sheet 600a-600e or layer 700a-700e of fibers 602, 702 lying underneath, via stitching 437. For example, the stitching 437 may zigzag across the third tow 430 between attachment locations located on the substrate 500 or the strand/layer 600a-600e, 700a-700e of fibers 602, 702 lying underneath. Here, the attachment locations may be spaced apart from the third tow 430 along the perimeter edge P of the finished footwear plate 300. The stitching 437 may be formed from the same materials (e.g. resin) as the stitching 416, 426 of FIGS. 11-14 to allow the stitching 437 to melt after the substrate 500 begins to melt when heat is applied, thereby allowing the stitching 437 to melt after the substrate 500 begins to melt. In some examples, the stitching 437 may penetrate the substrate 500 at the attachment locations and/or may also extend through the sheet/layer 600a-600e, 700a-700e of fibers 602, 702 disposed upon the substrate 500 and underlying the third tow 430. For instance, the stitching 437 may attach the third tow 430 of fibers 450 to the substrate 500 by crossing over the third tow 430 of fibers 450, extending through the sheet/layer 600a-600e, 700a-700e of fibers 602, 702, and penetrating the substrate 500 at the attachment locations. Moreover, comingling the fibers 450 of the third tow 430 with the thermoset polymer material and/or the thermoplastic polymer material may facilitate bonding between the corresponding layer 1500 associated with the third tow/strand 400, 430 of fibers 450, the substrate 500, and/or any other sheets/layers 600a-600e, 700a-700e lying underneath or over top to form the footwear plate 300 when heat and pressure is applied.

As with the first and second tows 410, 420 of fibers 450 of FIGS. 11-14, the third tow 430 of fibers 450 may be formed from a corresponding continuous strand of fibers 450 or two or more strands of fibers 450, and may include at least one of carbon fibers, boron fibers, glass fibers, and polymeric fibers. FIG. 15 shows the third tow 430 including corresponding looped portions 435 for connecting adjacent segments 432, 434, 436, 438 of the third tow 430. The looped portions 435 disposed in the forefoot region 12 are disposed inside the peripheral edge P of the plate/substrate 300, 500, while the looped portions 435 proximate to the heel region 16 are disposed outside the peripheral edge P. To eliminate the presence of pinch points when subjecting the third tow 430 to pressure (e.g., molding) to form the footwear plate 300, FIG. 16 shows the third tow 430 of fibers 450 cut along the peripheral edge P to remove the presence of looped portions 435 extending outside the peripheral edge P.

Compared to the first and second tows 410, 420 of fibers 450 of FIGS. 11-14, the third tow 430 of fibers 450 provides a greater variance in stiffness across the length of the footwear plate 300. Segments/courses of the third tow 430 of fibers 430 within the interior region of the footwear plate 300 extend substantially parallel to the longitudinal axis (L) from the heel region 16 to the midfoot region 14, while segments/tows along the lateral side 18 and the medial side 20 converge toward the interior region of the footwear plate 300 when extending from the heel region 16 to the midfoot region 14. As a result, the third tow 430 of fibers 450 includes a spacing between adjacent segments/courses in the heel region 16 that decreases as the segments/courses extend into the midfoot region 14, whereby the midfoot region 14 of the footwear plate 300 is associated with narrower width than in the heel region 16. As used herein, the width of the footwear plate 300 corresponds to the distance between the peripheral edge P at the lateral side 18 and the peripheral edge P at the medial side 20 in a direction substantially perpendicular to the longitudinal axis (L).

In some configurations, the third tow 430 of fibers 450 disperse into four discrete groups of segments 432, 434, 436, 438 when extending from the midfoot region 14 to the looped portions 435 disposed in the forefoot region 12 of the plate/substrate 300, 500. For instance, a lateral group 432 of segments generally follows the peripheral edge P of the footwear plate 300 at the lateral side 18, while a medial group 438 of segments generally follows the peripheral edge P of the footwear plate 300 at the medial side 20. Moreover, a first interior group 434 of segments is disposed adjacent and spaced inward from the lateral group 432 of segments, and a second interior group 436 of segments is disposed adjacent and spaced inward from the medial group 438 of segments. In the example shown, the first and second interior groups 434, 436 are also spaced apart from one another. Accordingly, the third tow 430 of fibers 450 forms multiple areas between the discrete groups 432, 434, 436, 438 of fibers 450 whereat the presence of fibers 450 is absent and, thus, exposing one or more layers/sheets 600a-600e, 700a-700e situated underneath the third tow 430 of fibers in the forefoot region 12 of the footwear plate 300. Here, the layer 1500 associated with the third tow 430 does not impart any stiffness properties in the areas of the forefoot region 12 where the presence of fibers 450 are absent. Each group 432, 434, 436, 438 of the third tow 430 of fibers 450 corresponds to a respective "tendon" imparting stiffness properties based on the number of segments and/or spacing between adjacent segments in each discrete group 432, 434, 436, 438. More specifically, the discrete groups 432, 434, 436, 438 of segments of the third tow 430 of fibers 450 cooperate to impart anisotropic stiffness and gradient load paths through the forefoot region 12 of the footwear plate 300. For instance, the longitudinal stiffness and the transverse stiffness taken at different locations in the forefoot region 12 may alternate between some magnitude of stiffness provided by the concentration of fibers 450 in the corresponding group 432, 434, 436, 438 and no stiffness where the presence of fibers 450 is absent.

In some examples, the lateral group 432 of segments are longer than the first interior group 434 of segments, the first interior group 434 of segments are longer than the second interior group 436 of segments, and the second interior group 436 of segments are longer than the medial group 438 of segments. In these examples, the looped portions 435 corresponding to the lateral group 432 of segments are disposed closer to the second end 302 of the footwear plate 300 than the looped portions 435 corresponding the medial group 438 of segments. In some configurations, at least one of the groups 432, 434, 436, 438 of segments includes a different number of segments than the other groups 432, 434, 436, 438. In other configurations, each group 432, 434, 436, 438 of segments includes the same number of segments as the other groups 432, 434, 436, 438. Increasing the number of segments in a corresponding group provides a greater concentration of fibers 450 and, thus, imparts a greater stiffness for the corresponding group.

In some implementations, the spacing between adjacent segments in at least one of the groups 432, 434, 436, 438 varies across the length of the plate 300 between the midfoot region 14 and the looped portions 435 in the forefoot region 12. For instance, the spacing between adjacent segments in at least one of the groups 432, 434, 436, 438 may increase as the segments traverse into the forefoot region 12 from the midfoot region 14, and then the spacing may gradually decrease until the segments terminate at the corresponding looped portions 435 in the forefoot region 12. In other implementations, the spacing between adjacent segments in at least one of the groups 432, 434, 436, 438 is substantially uniform across the length of the plate 300 between the midfoot region 14 and the looped portions 435 in the forefoot region 12.

Due to the spacing between adjacent segments of the third tow 430 of fibers 450 being closer in the midfoot region 14 compared to the spacing in the heel region 16, the third tow 430 of fibers collectively provides a greater concentration/density of fibers 450 in the midfoot region 14 compared to the concentration/density of fibers 450 in the heel region 16. Moreover, due to the third tow 430 of fibers 450 branching out into four discrete groups 432, 434, 436, 438 while traversing the footwear plate 300 from the midfoot region 14 to the forefoot region 12, the concentration/density of fibers 450 in the midfoot region 14 is greater than the density concentration/density of fibers 450 in the forefoot region 12 whereat the presence of fibers 450 is absent in the areas between each discrete group 432, 434, 436, 438 of segments. Accordingly, the third tow 430 of fibers 430 imparts different stiffness properties to the footwear plate 300 in each of the forefoot, midfoot, and heel region 12, 14, 16, respectively. FIG. 17 provides a top view of a fourth tow/strand 400, 440 of fibers 450 that may form a layer 1700 of the footwear plate 300. The pattern of the fourth tow 440 of fibers 450 is shown relative to a peripheral edge P of the finished footwear plate 300. In some examples, the fourth tow 440 is affixed/attached to a base layer that includes a corresponding substrate 500. In other examples, the fourth tow 440 is affixed/attached on top of a base layer that includes an underlying sheet 600a-600e (FIG. 7) (e.g., unidirectional tape) or layer 700a-700e (FIG. 9) (e.g., strand/tow) of fibers all affixed/attached to a single substrate 500 in a layered configuration. For instance, one or more layers 1700 of the fourth tow 440 of fibers 450 may replace one or more of the sheets 600a-600e of FIG. 7 or layers 700a-700e of FIG. 9 to form the finished footwear plate 300. Accordingly, any layers/sheets 600a-600e, 700a-700e of fibers lying underneath or over top the layer 1700 associated with the fourth tow 440 of fibers 450 are omitted from the examples shown in FIG. 7. Stitching may attach the fourth tow/strand 440 of fibers 450 to the substrate 500 by zigzagging across the fourth tow 440 of fibers 450 and penetrating the substrate 500 at attachment locations. In some examples, the stitching may also extend through and penetrate an underlying layer/sheet 600a-600e, 700a-700e of fibers.

The fourth tow 440 of fibers 450 is substantially similar to the arrangement of the third tow 430 of fibers 450 of FIGS. 15 and 16 except that segments/courses 442, 444, 446, 448 of the fourth tow 440 of fibers 450 are shorter than the corresponding segments/courses 432, 434, 436, 438 of the third tow 430 of fibers 450. For instance, the fourth tow 440 of fibers 450 defines a shortened length across length of the footwear plate 300 whereby fibers are absent in a majority of both the heel region 16 and the forefoot region 12. As with the third tow 430 of fibers 450, segments/courses of the fourth tow 440 of fibers 450 within the interior region of the footwear plate 300 extend substantially parallel to the longitudinal axis (L) from corresponding looped portions 445 disposed in the heel region 16, while segments/courses closer to the lateral side 18 or the medial side 20 converge toward the interior of region of the footwear when extending from the corresponding looped portions 445 disposed in the heel region 16. However, in contrast to the third tow 430 of fibers 450 having adjacent segments that extend across the width of the footwear plate 300 in the midfoot region 14, the segments corresponding to the fourth tow 440 of fibers 450 are concentrated toward the interior region of the plate 300 within the midfoot region 14 while defining gaps along the peripheral edge P where the presence of fibers 450 are absent and, thus, not imparting stiffness.

Similar to the third tow 430 of fibers 450, the fourth tow 440 of fibers 450 also disperse into four discrete groups of segments 442, 444, 446, 448 when extending from the midfoot region 14 to the looped portions 445 disposed in one of the forefoot region 12 or the midfoot region 14. For instance, a lateral group 442 of segments generally follows the peripheral edge P of the footwear plate 300 at the lateral side 18 and terminate in the forefoot region 12, while a medial group 448 of segments generally follows the peripheral edge P of the footwear plate 300 at the medial side 20 and terminate in the midfoot region 14. Moreover, a first interior group 444 of segments is adjacent and spaced inward from the lateral group 442 of segments, and a second interior group 446 of segments is adjacent and spaced inward from the medial group 448 of segments. Here, the layer 1700 associated with the fourth tow 440 does not impart any stiffness properties in the areas in the forefoot region 12 between the groups 442, 444, 446, 448 of fibers 450. However, the discrete groups 442, 444, 446, 448 of segments of the fourth tow 440 of fibers 450 cooperate to impart anisotropic stiffness and gradient load paths in regions extending toward the forefoot region 12 and away from the high concentration/density of fibers 450 in the midfoot region 14, whereat the magnitude of stiffness is highest.

In some examples, the lateral group 442 of segments are longer than the first interior group 444 of segments, the first interior group 444 of segments are longer than the second interior group 446 of segments, and the second interior group 446 of segments are longer than the medial group 448 of segments. In these examples, the looped portions 445 corresponding to the lateral group 442 of segments are disposed closer to the second end 302 of the footwear plate 300 than the looped portions 445 corresponding the medial group 448 of segments. Each group 442, 444, 446, 448 of segments of the fourth tow 440 may be disposed further away from the second end 302 of the plate 300 than each corresponding group 432, 434, 436, 438 of segments of the third tow 430 of FIGS. 15 and 16. In some configurations, at least one of the groups 442, 444, 446, 448 of segments includes a different number of segments than the other groups 442, 4434, 446, 448. In other configurations, each group 442, 444, 446, 448 of segments includes the same number of segments as the other groups 442, 444, 446, 448. Increasing the number of segments in a corresponding group provides a greater concentration of fibers 450 and, thus, imparts a greater stiffness for the corresponding group. Additionally, the spacing between adjacent segments in at least one of the groups 442, 444, 446, 448 may vary or may be substantially uniform as the segments traverse toward the forefoot region 12 of the plate 300. For instance, the spacing between segments in at least one of the groups 442, 444, 446, 448 may initially increase as the segments begin to traverse toward the forefoot region 12 from the midfoot region 14, and then the spacing may gradually decrease until the segments terminate at the corresponding looped portions 435 in the forefoot region 12 or in the midfoot region 14 at a location proximate to the forefoot region 12.

FIG. 18 provides a top view of a fifth strand/tow 400, 460 of fibers 450 that may form a layer 1800 of the footwear plate 300. The pattern of the fifth tow 460 of fibers 450 is shown relative to a peripheral edge P of the finished footwear plate 300. In some examples, the fifth tow 460 is affixed/attached to a base layer that includes a corresponding substrate 500, e.g., substrate 704. In other examples, the fifth tow 460 is affixed/attached on top of a base layer that includes an underlying sheet 600a-600e (FIG. 7) (e.g., unidirectional tape) or layer 700a-700e (FIG. 9) (e.g., strand/tow) of fibers all affixed/attached to a single substrate 500 in a layered configuration. For instance, one or more layers 1800 of the fifth tow 460 of fibers 450 may replace one or more of the sheets 600a-600e of FIG. 7 or layers 700a-700e of FIG. 9 to form the finished footwear plate 300. Accordingly, any layers/sheets 600a-600e, 700a-700e of fibers lying underneath or over top the layer 1800 associated with the fifth tow 460 of fibers 450 are omitted from the examples shown in FIG. 18. Stitching may attach the fifth tow/strand 460 of fibers 450 to the substrate 500 by zigzagging across the fifth tow 460 of fibers 450 and penetrating the substrate 500 at attachment locations. In some examples, the stitching may also extend through and penetrate an underlying layer/sheet 600a-600e, 700a-700e of fibers.

As with the first tow 410 of fibers 450 of FIGS. 11 and 12, the fifth tow 460 of fibers 450 may be formed from one continuous strand of fibers 450 or from two or more strands of fibers 450, and may range in size from about 1,000 fibers per bundle to about 48,000 fibers per bundle. The fifth tow 460 includes at least one of carbon fibers, boron fibers, glass fibers, and polymeric fibers that may be comingled with a thermoset polymer material and/or a thermoplastic polymer material. Here, comingling the fibers 450 of the fifth tow 460 with the thermoset polymer material and/or the thermoplastic polymer material may facilitate bonding between the corresponding layer 1800 associated with the fifth tow/strand 400, 460 of fibers 450, the substrate 500, and/or any other sheets/layers 600a-600e, 700a-700e lying underneath or over top to form the footwear plate 300 when heat and pressure is applied.

FIG. 18 shows the fifth tow 460 of fibers 450 having a plurality of segments having the same length extending between a first location 462 disposed in the forefoot region 12 and a second location 464 disposed in the heel region 16. The fifth tow 460 of fibers 450 includes looped portions 465 disposed at the first location 462 and the second location 464 for connecting adjacent segments of the fifth tow 460. In the example shown, the segments of the fifth tow 460 proximate to the lateral side 18 of the plate 300 and within the interior of the plate 300 extend substantially parallel to one another and substantially parallel to the longitudinal axis (L) between the first location 462 and the second location 464. However, the segments of the fifth tow 460 proximate to the medial side 20 of the plate 300 converge toward the interior of the plate 300 when extending from the second location 464 toward the medial region 14, and then diverge and fan out away from the interior of the plate 300 when extending from the medial region 14 to the first location 462. Thus, the segments proximate the medial side 20 generally follow the curvature of the peripheral edge P of the plate 300 at the medial side 20. The converging by the segments proximate to the medial side 20 into the interior of the plate 300 causes the spacing between adjacent segments in the medial region 14 of the plate to decrease and, thus, provide a greater magnitude of stiffness in the midfoot region 14 due to the corresponding increase in the concentration/density of fibers 450. Moreover, the spacing between each adjacent segment of the fifth tow 460 is further in the forefoot region 12 proximate to the first location 462 compared to the spacing between each adjacent segment in the heel region 16 proximate to the second location. Accordingly, the fifth tow 460 of fibers 450 provides the heel region 16 with a magnitude of stiffness that is less than the magnitude of stiffness in the midfoot region 14 and greater than the magnitude of stiffness in the forefoot region 12. In other configurations, the spacing between each adjacent segment of the fifth tow 460 of fibers 450 is substantially uniform across the lengths of the segments between the first location 462 and the second location 464.

Figure 19:
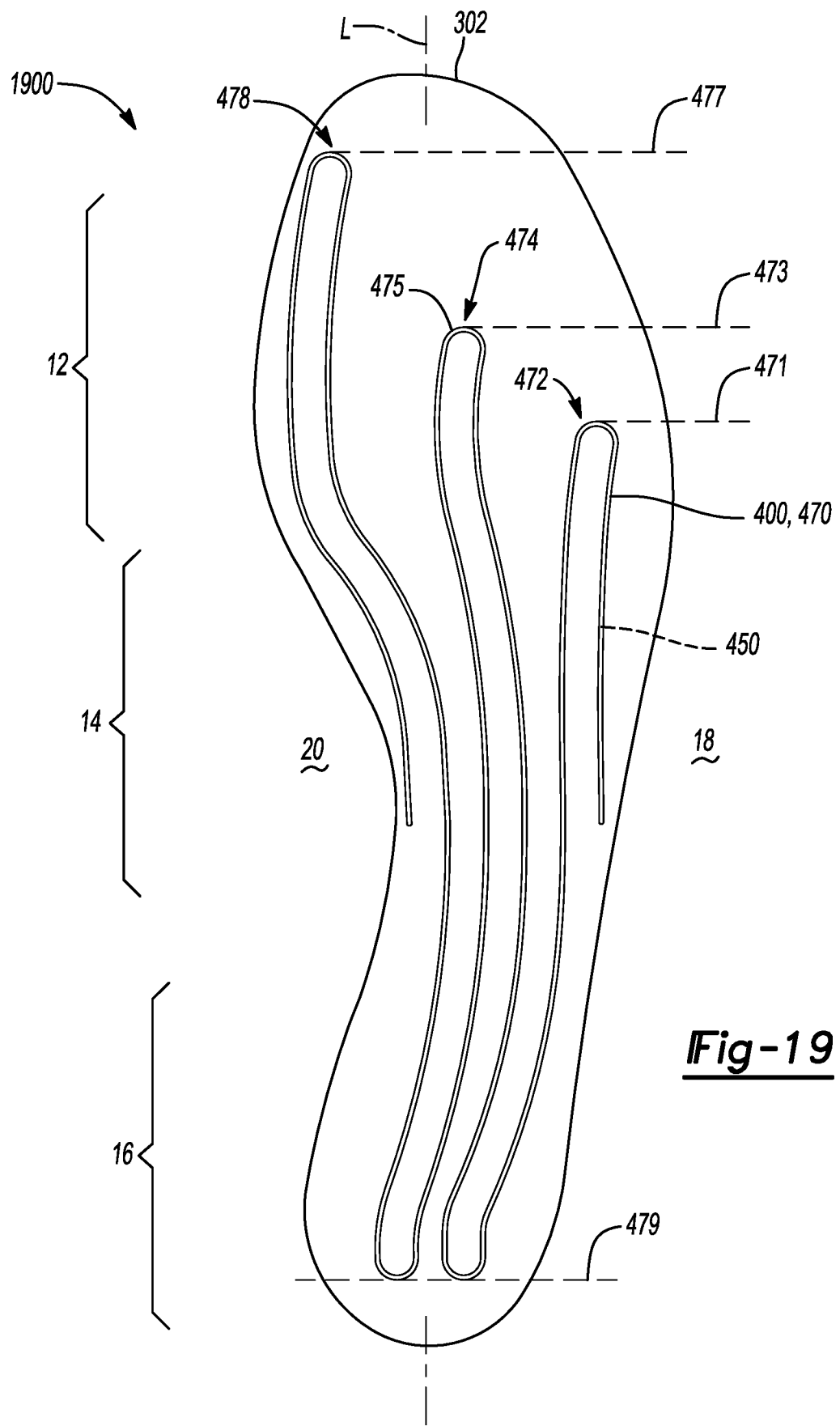
FIG. 19 is a top view of a sixth tow of fibers used to form a corresponding layer of a footwear plate in accordance with principles of the present disclosure.

FIG. 19 provides a top view of a sixth strand/tow 400, 470 of fibers 450 that may form a layer 1900 of the footwear plate 300. The pattern of the sixth tow 470 of fibers 450 is shown relative to a peripheral edge P of the finished footwear plate 300. In some examples, the sixth tow 470 is affixed/attached to a base layer that includes a corresponding substrate 500, e.g., substrate 704. In other examples, the sixth tow 470 is affixed/attached on top of a base layer that includes an underlying sheet 600a-600e (FIG. 7) (e.g., unidirectional tape) or layer 700a-700e (FIG. 9) (e.g., strand/tow) of fibers all affixed/attached to a single substrate 500 in a layered configuration. For instance, one or more layers 1900 of the sixth tow 470 of fibers 450 may replace one or more of the sheets 600a-600e of FIG. 7 or layers 700a-700e of FIG. 9 to form the finished footwear plate 300. Accordingly, any layers/sheets 600a-600e, 700a-700e of fibers lying underneath or over top the layer 1900 associated with the fifth tow 460 of fibers 450 are omitted from the examples shown in FIG. 19. Stitching may attach the sixth tow/strand 470 of fibers 450 to the substrate 500 by zigzagging across the sixth tow 470 of fibers 450 and penetrating the substrate 500 at attachment locations. In some examples, the stitching may also extend through and penetrate an underlying layer/sheet 600a-600e, 700a-700e of fibers.

In the example shown, the sixth tow 470 of fibers 450 is formed from one continuous strand of fibers 450. However, in other examples, the sixth tow 470 may be formed from two or more strands of fibers 450. The sixth tow 470 may range in size from about 1,000 fibers per bundle to about 48,000 fibers per bundle and include at least one of carbon fibers, boron fibers, glass fibers, and polymeric fibers that may be comingled with a thermoset polymer material and/or a thermoplastic polymer material. Here, comingling the fibers 450 of the sixth tow 470 with the thermoset polymer material and/or the thermoplastic polymer material may facilitate bonding between the corresponding layer 1900 associated with the sixth tow/strand 400, 470 of fibers 450, the substrate 500, and/or any other sheets/layers 600a-600e, 700a-700e lying underneath or over top to form the footwear plate 300 when heat and pressure is applied.

FIG. 19 shows the sixth tow 470 of fibers 450 having a plurality of segments 472, 474, 478 that each extend across the length of the plate 300 from a first location 479 disposed in the heel region 16 to a corresponding second location 471, 473, 477 disposed in the forefoot region 12 of the footwear plate 300. For instance, lateral segments 472 extend between the first location 479 and the corresponding second location 471, while medial segments 478 extend between the first location 479 and the corresponding second location 477 disposed closer to the second end 302 of the footwear plate 300 than the second location 471 corresponding to the lateral segments 372. Additionally, interior segments 474 disposed between the lateral segments 472 and the medial segments 478 extend between the first location 479 and the corresponding second location 473. In the example shown, the second location 473 corresponding to the interior segments 474 is disposed closer to the second end 302 of the footwear plate 300 than the second location 471 corresponding to the lateral segments 472 and further away from the second end 302 of the footwear plate 300 than the second location 477 corresponding to the medial segments 478. The sixth tow 470 of fibers 450 includes looped portions 475 disposed at the first location 479 and the second locations 471, 473, 477 for connecting adjacent segments of the sixth tow 470.

In some implementations, the corresponding second locations 471, 473, 477 cooperate to define a terminal end for the sixth tow 470 of fibers 450 in the forefoot region 12 that aligns with an anatomical feature of the foot when the foot is received upon the footwear plate 300 within the interior void 102 of the article of footwear 10. In some examples, the anatomical feature includes a bend line of all the toes of the foot. The bend line may extend through the metatarsal-phalangeal (MTP) joints of the foot where proximal phalanges of the toes meet corresponding metatarsals of the foot. Accordingly, each segment 472, 474, 478 may impart stiffness to the plate 300 under the wearer's foot up to the MTP joints without imparting any stiffness in areas of the plate 300 where the toes of the foot reside to provide desirable flexibility during athletic movements.

The lateral segments 472 may be disposed adjacent and substantially parallel to one another along the longitudinal axis L of the footwear plate 300 proximate to the peripheral edge P at the lateral side 18. In some examples, the spacing between each adjacent lateral segment 472 is substantially uniform across the length of the lateral segments 472 between the first location 479 and the second location 471. In other examples, the spacing between each adjacent lateral segment 472 varies across the length such that the spacing between each adjacent lateral segment 472 is closer within the midfoot region 14 compared to the spacing within the forefoot and heel regions 12, 16, respectively. Providing a narrower spacing between adjacent segments offers a greater concentration/density of fibers 450 to thereby increase the stiffness of the footwear plate 300.

The medial segments 478 may be disposed adjacent and substantially parallel to one another along the longitudinal axis L of the footwear plate 300 proximate to the peripheral edge P at the medial side 20. In some examples, the spacing between each adjacent medial segment 478 is substantially uniform across the length of the medial segments 478 between the first location 479 and the second location 477. In other examples, the spacing between each adjacent medial segment 478 varies across the length such that the spacing between each adjacent medial segment 478 is closer within the midfoot region 14 compared to the spacing within the forefoot and heel regions 12, 16, respectively. Within interior regions of the footwear plate 300, the interior segments 474 may be disposed adjacent and substantially parallel to one another along the longitudinal axis L of the footwear plate 300. As with the lateral segments 472 and the medial segments 478, the spacing between each adjacent interior segment 474 may be substantially uniform or may vary across the length of the interior segments 474 between the first location 479 and the second location 473.

In some configurations, the segments 472, 474, 478 of the sixth tow 470 of fibers are disposed adjacent and substantially parallel to one another within the midfoot and heel regions 14, 16, respectively, and then disperse from one another when extending from the midfoot region 14 to each corresponding second location 471, 473, 477 disposed in the forefoot region 12. For instance, the lateral segments 472 may generally follow the contour of the peripheral edge P of the footwear plate 300 at the lateral side 18, the medial segments 478 may generally follow the contour of the peripheral edge P of the footwear plate 300 at the medial side 20, and the interior segments 474 may extend substantially parallel to the longitudinal axis L as the lateral and medial segments 472 and 478 diverge outward and away from the interior segments 474. Here, the layer 1900 associated with the sixth tow 470 does not impart any stiffness properties in the areas in the forefoot region 12 between the segments 472, 474, 478 where the presence of fibers 450 is absent. However, the dispersing of the segments 472, 474, 478 of the sixth tow 470 imparts anisotropic stiffness and gradient load paths in regions extending into the forefoot region 12 and away from the high concentration/density of fibers 450 in the midfoot region 14, whereat the magnitude of stiffness is highest.

Figure 9:
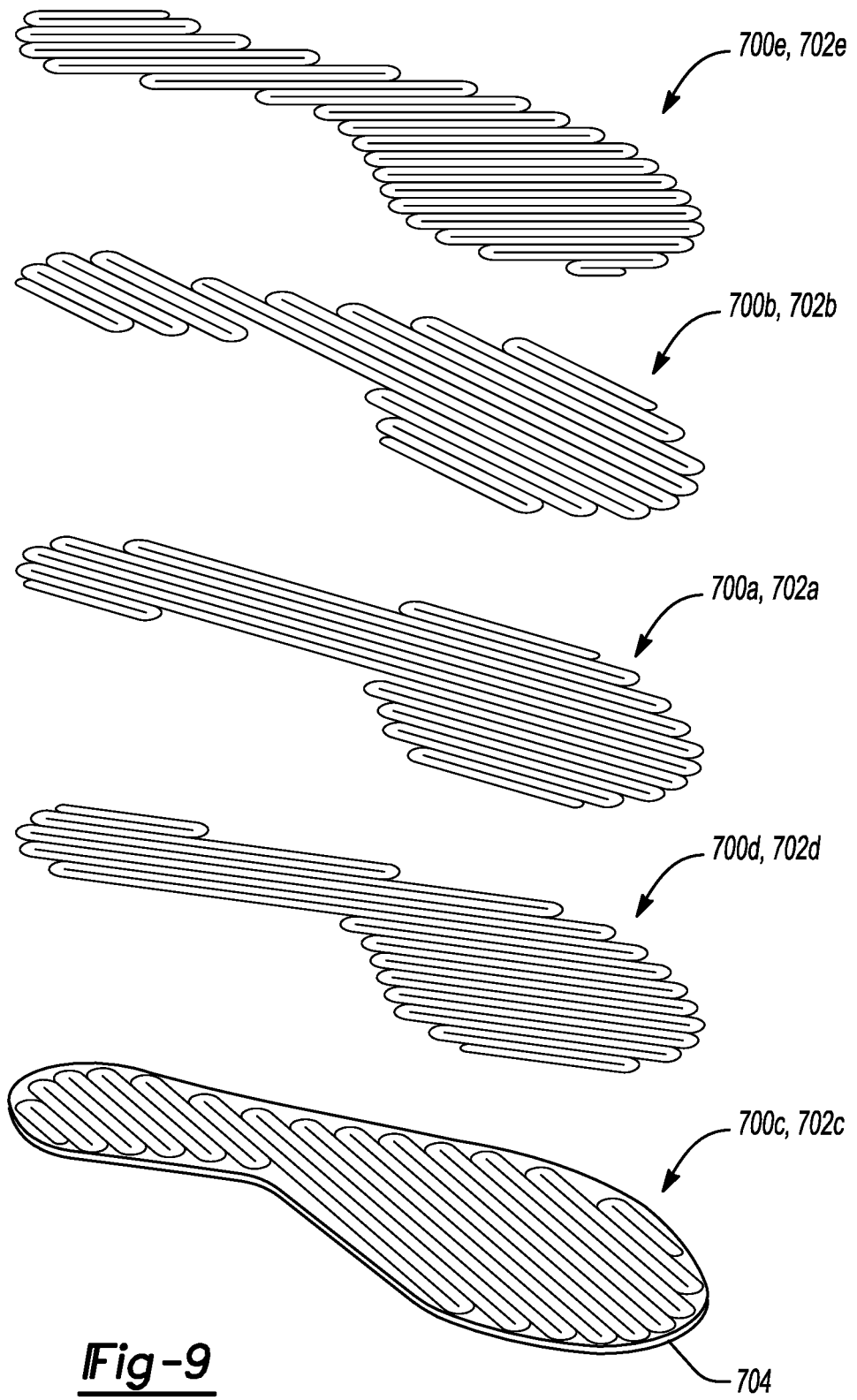
FIG. 9 is an exploded view of layers of fiber strands used to form a footwear plate in accordance with the principles of the present disclosure.

As set forth above, one or more of at least one of the layers 1100, 1300, 1500, 1700, 1800, 1900 of FIGS. 11-19 each formed by a corresponding tow 410, 420, 430, 440, 460, 470 of fibers 450 may be incorporated into the series of stacked, prepreg fiber sheets 600a-600e of FIG. 7 or the individual strands 702a-702e respectively forming layers 700a-700e of FIG. 9 to tune stiffness properties imparted by the finished footwear plate 300. Namely, the one or more sheets 600a provided as the two middle layers of the prepreg fiber sheets 600a-600e stacked in the order shown in FIG. 7, and having the angle (Φ) of 0° relative to the longitudinal axis (L), may be replaced with at least one of the layers 1100, 1300, 1500, 1700, 1800, 1900 to tune stiffness properties in the midfoot region 14 of the footwear plate 300, while maintaining a substantially uniform stiffness in the forefoot region 12 and/or the heel region 16. Similarly, the layer 700a provided as the middle layer of the of the multiple layers 700a-700e layered in the order shown in FIG. 9 and having the angle (Φ) of 0° relative to the longitudinal axis (L) may be replaced with at least one of the layers 1100, 1300, 1500, 1700, 1800, 1900 to tune stiffness properties in the midfoot region 14 of the footwear plate 300.

Referring to FIGS. 7, 8A-8E, 11 and 12, in one configuration, the one (1) or two (2) middle sheets 600a of the stacked, prepreg fiber sheets 600a-600e of FIG. 7 having the angle (Φ) of 0° relative to the longitudinal axis (L) of the footwear plate 300 are replaced with two (2) layers 1100 of the first tow 410 of fibers 450. Accordingly, this configuration includes the bottom sheet 600c including fibers 602 positioned at −15° (or alternatively −30°) relative to the longitudinal axis (L), the next sheet 600d including fibers 602 positioned at 15° relative to the longitudinal axis (L), the two (2) layers 1100 of the first tow 410 of fibers 450, the next sheet 600b including fibers 602 positioned at −15° relative to the longitudinal axis (L), and the top and final sheet 600e includes fibers 602 positioned at 15° (or alternatively 30°) relative to the longitudinal axis (L).

The two (2) layers 1100 of the first tow 410 of fibers 450 increase the stiffness of the footwear plate 300 in the midfoot region 14 compared to the fiber sheets 600a-600e stacked in the order shown in FIG. 7, while substantially maintaining the stiffness in the forefoot region 12 (and also the heel region 16). For instance, the stiffness in the midfoot region 14 may increase from about 35.4 N/mm to about 91.7 N/mm when the two (2) layers 1100 of the first tow 410 replace the two (2) middle sheets 600a having the angle (Φ) of 0° relative to the longitudinal axis (L). The stiffness in the heel region 16 may also be substantially maintained. In an example when the two (2) layers 1100 of the first tow 410 replace the two (2) middle sheets, a stiffness of the heel region is about 15-percent (15%) to about 35-percent (35%) or about 20-percent (20%) to about 30-percent (30%) of a stiffness of the midfoot region, and a stiffness of the forefoot region is about 40-percent (40%) to about 60-percent (60%) or about 45-percent (45%) to about 55-percent (55%) of a stiffness of the midfoot region. In some examples, three (3) layers 1100 of the first tow 410 of fibers 450 are used to replace three (3) middle sheets 600a to increase the stiffness in the midfoot region 14 from about 63.0 N/mm to about 115.5 N/mm. Thus, replacing the middle sheet(s) 600a with one or more layers 1100 of the first tow 410 of fibers 450 provides a stacked configuration that uses substantially the same amount of fibers as the fibers 602 provided by the unidirectional tape of the stacked fiber sheets 600a-600e of FIG. 7. However, by replacing the middle sheet(s) 600a with the layers 1100 of the first tow 410 of fibers 450, the variance in the spacing and pattern of the segments 412, 414, 418 of the first tow 410 provides a concentration/density of fibers 450 in the midfoot region 14 of the plate 300 that is greater than the concentration/density of fibers 450 in the forefoot region 12 and the heel region 16 of the plate 300. As set forth above, other configurations may include placing the first tow 410 of fibers 450 upon the top sheet 600e as a top and final layer 1100 of the fiber sheets 600a-600e stacked in the order shown in FIG. 7.

Referring to FIGS. 9, 10A-10E, 11 and 12, in one configuration, the middle layer 700a of the multiple layers 700a-700e layered in the order shown in FIG. 9 and having the angle (Φ) of 0° relative to the longitudinal axis (L) is replaced with two (2) layers 1100 of the first tow 410 of fibers 450 to increase the stiffness of the footwear plate 300 in the midfoot region 14, while substantially maintaining the stiffness in the forefoot region 12 (and also in the heel region 16). This configuration includes the bottom strand 702c applied to the substrate 704, 500 such that the strand 702c is positioned the angle (Φ) of −15° (or alternatively −30°) relative to the longitudinal axis (L), the second strand 702d is applied to the first strand 702c via stitching, for example, and is positioned at the angle (Φ) of 15° relative to the longitudinal axis (L), the two (2) layers 1100 of the first tow 410 of fibers 450, the fifth layer including strand 702b is applied to the underlying layer 1100 at the angle (Φ) of −15° relative to the longitudinal axis (L), and the sixth and final layer including strand 702e applied to the underlying strand 702b at the angle (Φ) of 15° (or alternatively 30°) relative to the longitudinal axis (L). In some implementations, each tow 410 or stand 702 in each layer includes 12,000 carbon fibers per bundle and is comingled with thermoplastic materials and/or thermoset materials.

In another configuration, three (3) layers 1100 of the first tow 410 of fibers 450 are used to replace the middle layer 700a having the angle (Φ) of 0° relative to the longitudinal axis (L) to further increase the stiffness in the midfoot region 14. The stiffness in the heel region 16 may also be substantially maintained. Thus, replacing the middle layer 700a with one or more layers 1100 of the first tow 410 of fibers 450 provides a layered configuration that uses substantially the same amount of fibers as the fiber strands 702a-702e of the layers 700a-700e of FIG. 9. However, by replacing the middle layer 700a with the layers 1100 of the first tow 410 of fibers 450, the variance in the spacing and pattern of the segments 412, 414, 418 of the first tow 410 provides a concentration/density of fibers 450 in the midfoot region 14 of the plate 300 that is greater than the concentration/density of fibers 450 in the forefoot region 12 and the heel region 16 of the plate 300. As set forth above, other configurations may include placing the first tow 410 of fibers 450 upon the top layer 700e as a top and final layer 1100 of the layers 700a-700e layered in the order shown in FIG. 9.

Referring to FIGS. 7, 8A-8E, and 17, in another configuration, the two (2) middle sheets 600a of the stacked, prepreg fiber sheets 600a-600e of FIG. 7 having the angle (Φ) of 0° relative to the longitudinal axis (L) of the footwear plate 300 are replaced with two (2) layers 1700 of the fourth tow 440 of fibers 450 of FIG. 17. The two (2) layers 1700 of the fourth tow 440 of fibers 450 increase the stiffness of the footwear plate 300 in the midfoot region 14 compared to the fiber sheets 600a-600e stacked in the order shown in FIG. 7, while substantially maintaining the stiffness in the forefoot region 12 (and the heel region 16). For instance, the stiffness in the midfoot region 14 may increase from about 35.4 N/mm to about 76.1 N/mm when the two (2) layers 1700 of the fourth tow 440 replace the two (2) middle sheets 600a having the angle (Φ) of 0° relative to the longitudinal axis (L).

Referring to FIGS. 9, 10A-10E, and 17, in one configuration, the middle layer 700a of the multiple layers 700a-700e layered in the order shown in FIG. 9 and having the angle (Φ) of 0° relative to the longitudinal axis (L) is replaced with two (2) layers 1700 of the fourth tow 440 of fibers 450 to increase the stiffness of the footwear plate 300 in the midfoot region 14, while substantially maintaining the stiffness in the forefoot region 12 (and the heel region 16).

Referring to FIGS. 7, 8A-8E and 15-17, in another configuration, the two (2) middle sheets 600a of the stacked, prepreg fiber sheets 600a-600e of FIG. 7 having the angle (Φ) of 0° relative to the longitudinal axis (L) of the footwear plate 300 are replaced with one (1) layer 1500 of the third tow 430 of fibers 450 of FIGS. 15 and 16 and two (2) layers 1700 of the fourth tow 440 of fibers 450 of FIG. 17. Namely, the third tow 430 of fibers 450 is provided as the middle layer 1500 while each of the two (2) layers 1700 of the fourth tow 440 of fibers are 450 are disposed on opposite sides of the middle layer 1500 to sandwich the third tow 430 of fibers 450 therebetween. Here, the groups 432, 434, 436, 438 of segments of the third tow 430 of fibers 450 correspond to "long tendons" and the groups 442, 444, 446, 448 of segments of the fourth tow 440 of fibers 450 correspond to "short tendons" that extend a lesser extent (e.g., further from the second end 302 of the plate 300) toward or into the forefoot region 12 than the "long tendons" 432, 434, 436, 438 of the middle layer 1500 corresponding to the third tow 430 of fibers 450. The two (2) layers 1700 of the fourth tow 440 of fibers 450 sandwiching the middle layer 1500 of the third tow 430 increase the stiffness of the footwear plate 300 in the midfoot region 14 compared to the fiber sheets 600a-600e stacked in the order shown in FIG. 7, while substantially maintaining the stiffness in the forefoot region 12 (and the heel region 16). For instance, the stiffness in the midfoot region 14 may increase from about 35.4 N/mm to about 99.6 N/mm when the middle layer 1500 of the third tow 430 is disposed between the two (2) layers 1700 of the fourth tow 440 to replace the two (2) middle sheets 600a having the angle (Φ) of 0° relative to the longitudinal axis (L).

Referring to FIGS. 9, 10A-10E, and 15-17, in one configuration, the middle layer 700a of the multiple layers 700a-700e layered in the order shown in FIG. 9 and having the angle (Φ) of 0° relative to the longitudinal axis (L) is replaced with one (1) layer 1500 of the third tow 430 of fibers 450 of FIGS. 15 and 16 and two (2) layers 1700 of the fourth tow 440 of fibers 450 of FIG. 17. Namely, the third tow 430 of fibers 450 is provided as the middle layer 1500 while each of the two (2) layers 1700 of the fourth tow 440 of fibers are 450 are disposed on opposite sides of the middle layer 1500 to sandwich the third tow 430 of fibers 450 therebetween. The two (2) layers 1700 of the fourth tow 440 of fibers 450 sandwiching the middle layer 1500 of the third tow 430 may increase the stiffness of the footwear plate 300 in the midfoot region 14 compared to the multiple layers 700a-700e layered in the order shown in FIG. 9, while substantially maintaining the stiffness in the forefoot region 12 (and the heel region 16).

Figure 21:
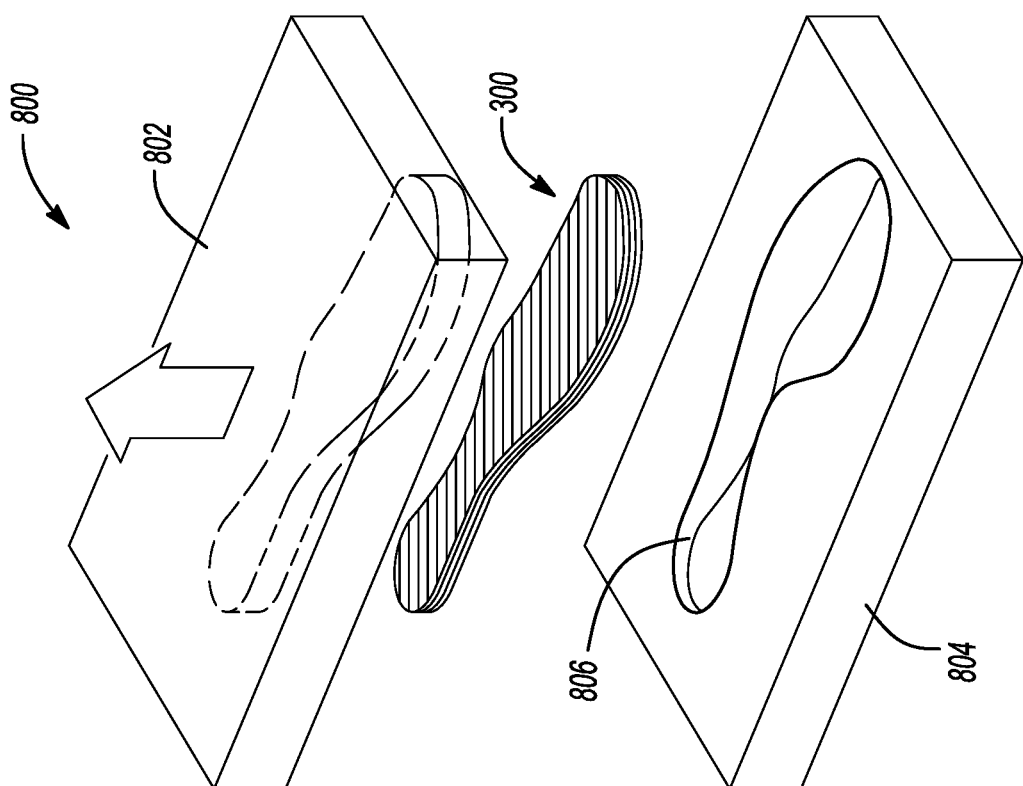
FIG. 21 is a perspective view of a mold for use in forming a footwear plate in accordance with the principles of the present disclosure, the mold shown in conjunction with a formed footwear plate.
Figure 20:
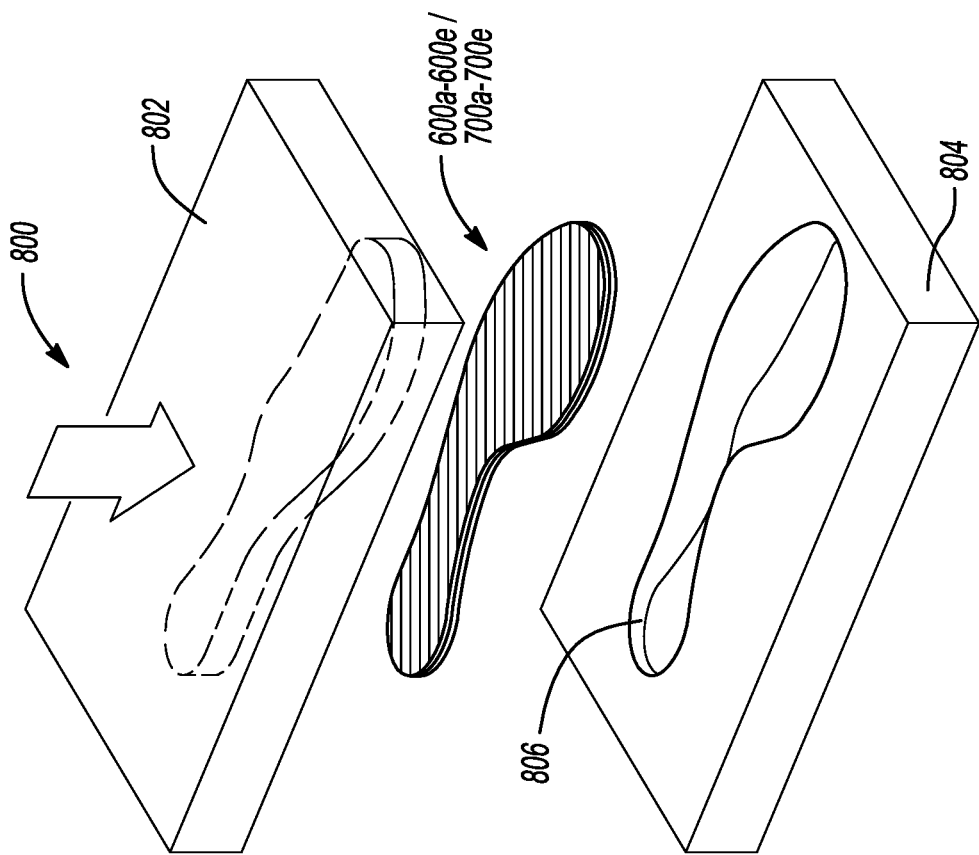
FIG. 20 is a perspective view of a mold for use in forming a footwear plate in accordance with the principles of the present disclosure, the mold shown in conjunction with a stack of fibers prior to being formed into a footwear plate.

With particular reference to FIGS. 20 and 21, formation of a footwear plate 300 is described in conjunction with a mold 800. The mold 800 includes a first mold half 802 and a second mold half 804. The mold halves 802, 804 include a mold cavity 806 having the shape of the footwear plate 300, to allow the mold 800 to impart the desired shape of the particular plate 300 to either the stacked sheets 600a-600e or to the layers 700a-700e incorporating one or more of at least one of the layers 1100, 1300, 1500, 1700, 1800, 1900 of FIGS. 11-19 each formed by the corresponding tow 410, 420, 430, 440, 460, 470 of fibers 450.

After forming the stacked sheets 600a-600e or the layers 700a-700e, the sheets 600a-600e or layers 700a-700e are inserted between the mold halves 802, 804 within the mold cavity 806. At this point, the mold 800 is closed by moving the mold halves 802, 804 toward one another or by moving one of the mold halves 802, 804 toward the other mold half 802, 804. Once closed, the mold 800 applies heat and pressure to the stacked sheets 600a-600e or the layers 700a-700e disposed within the mold cavity 806 to activate the resin associated with the stacked sheets 600a-600e or the layers 700a-700e. The heat and pressure applied to the stacked sheets 600a-600e or the layers 700a-700e causes the particular shape of the mold cavity 806 to be applied to the stacked sheets 600a-600e or the layers 700a-700e and, once cured, the resin associated with the stacked sheets 600a-600e or the layers 700a-700e cause the stacked sheets 600a-600e or the layers 700a-700e to harden and retain the desired shape.

It should be noted that while the sheets 600a-600e and the layers 700a-700e are described as including a resin material, the sheets 600a-600e and the layers 700a-700e could additionally be supplied with resin that is infused within the mold 800. The infused resin could be in addition to the impregnated resin of the sheets 600a-600e and layers 700a-700e or, alternatively, could be used in place of the impregnated resin. In some examples, at least the second mold half 804 is heated to about 160-degrees Fahrenheit (F) to about 165-degrees F. and the resin is poured over the stack to saturate the stacked sheets 600a-600e or the layers 700a-700e and the mold 800a is closed to apply pressure within the range of 75 psi to about 100 psi for a time during a resin gelation curve, i.e., between about 7.5 minutes and about 8.5 minutes. The formed plate 300 may be removed from the mold 800a after about 30 minutes when the plate 300 is fully cured.

Figure 23:
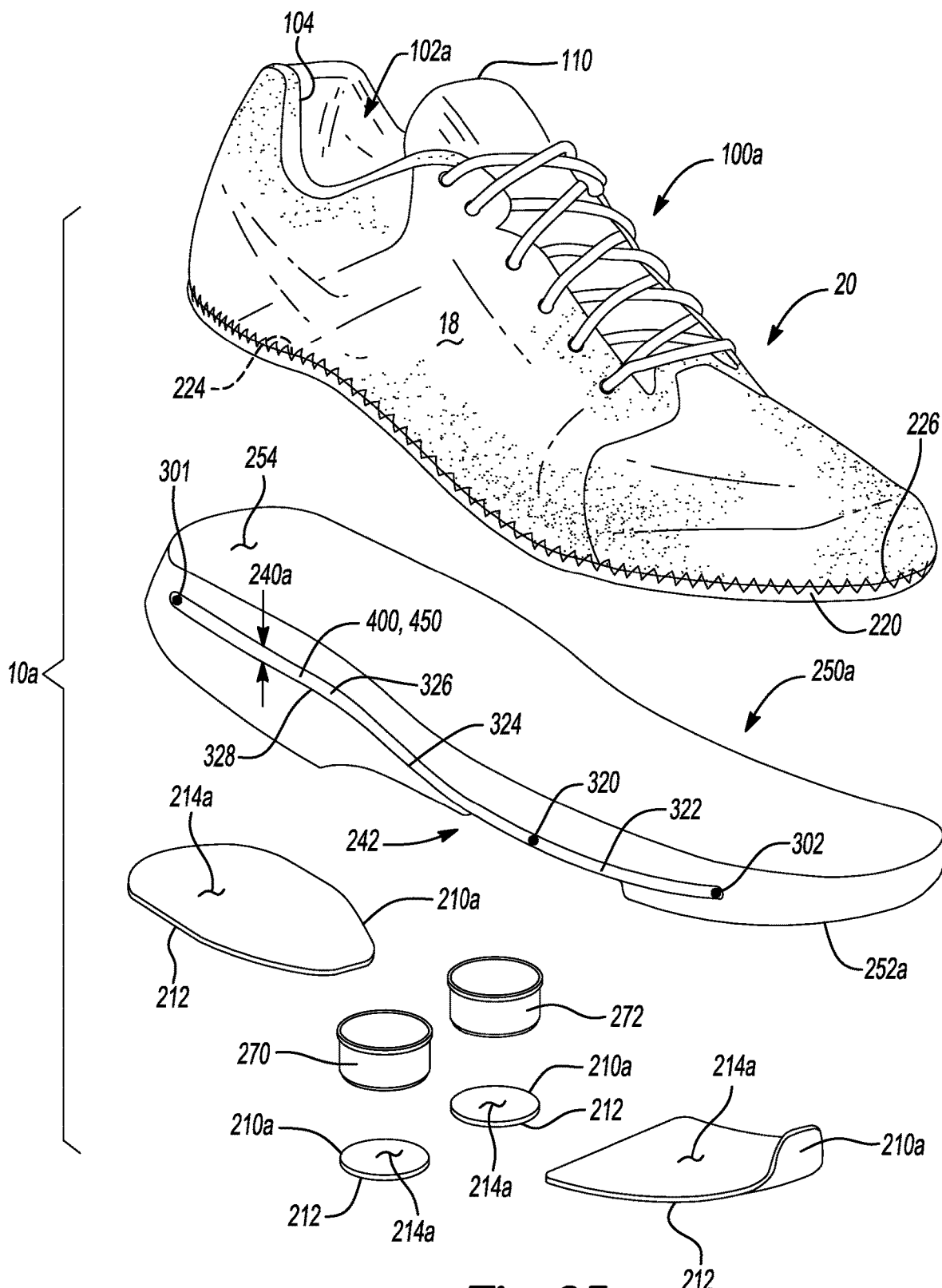
FIG. 23 is an exploded view of the article of footwear of FIG. 22 showing a cushioning member encapsulating a footwear plate and disposed within a cavity between an inner surface of an outsole and a bottom surface of a midsole.

Referring to FIGS. 22 and 23, an article of footwear 10a including an upper 100a and a sole structure 200a attached to the upper 100a is provided. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified.

The upper defines the interior void 102 to receive and secure a foot for support on the sole structure 200a, during use of the article of footwear 10a. The ankle opening may facilitate entry and removal of the foot to and from the interior void, while the upper 100a may be formed from an elastic material to conform to the shape of the foot when the foot is received within the interior void. As with the upper 100 of the article of footwear 10 of FIGS. 1-3, the upper 100a may include apertures such as eyelets and/or other engagement features such as fabric or mesh loops that receive fasteners, e.g., laces, straps, cords, hook-and-loop, or any other suitable type of fastener.

In some implementations, the sole structure 200a includes an outsole 210a, a cushioning member 250a, a pair of fluid-filled chambers 270, 272, a footwear plate 300a, and a strobel 220 arranged in a layered configuration. In view of the substantial similarity in structure and function of the components associated with the footwear plate 300 with respect to the footwear plate 300a, like reference numerals are used hereinafter and in the drawings to identify like components while like reference numerals containing letter extensions are used to identify those components that have been modified. The sole structure 200a (e.g., the outsole 210a, the cushioning member 250a, fluid-filled chambers 270, 272, the footwear plate 300a, and the strobel 220) defines a longitudinal axis L. For example, the outsole 210a engages with a ground surface during use of the article of footwear 10a, the strobel 220 attaches to the upper 100a, and the cushioning member 250a is disposed therebetween in the heel region 16 to separate the strobel 220 from the outsole 210a. For example, the cushioning member 250a defines a bottom surface 252a opposing the outsole 210a and a top surface 254 disposed on an opposite side of the cushioning member 250a than the bottom surface 252a and opposing the strobel 220. The top surface 254 may be contoured to conform to the profile of the bottom surface (e.g., plantar) of the foot within the interior void 102. In some implementations, the footwear plate 300a resides within a cavity 240a defined by the cushioning member 250a. In the example shown, the bottom surface 252a of the cushioning member 250a is contoured through portions of the midfoot region 14 and the forefoot region 12 to define a gap 242 operative to expose the MTP point 320 of the footwear plate 300a, as well as expose portions of the anterior curved portion 322 extending from one side of the MTP point 320 and the posterior curved portion 324 extending from the other side of the MTP point 320. The pair of fluid-filled chambers 270, 272 may be disposed between the exposed portions of the footwear plate 300a within the gap 242 defined by the bottom surface 252a of the cushioning member 252a. For instance, the pair of fluid-filled chambers 270, 272 may attach directly to the plate 300 within the gap 242 and underneath the MTP joint that connects the metatarsal bones with the phalanx bones of the foot. Here, the fluid-filled chambers 270, 272 may provide resilient cushioning as the foot pushes off the ground surface during running movements (e.g., long-distance running movements), while the cushioning member 250a provides soft-type cushioning in the heel region 16 to absorb initial ground-reaction forces as the heel strikes the ground before the foot rolls for engagement and pushes off the ground surface. One of the fluid-filled chambers 270, 272 may be disposed adjacent to the lateral side 18 of the footwear 10a, while the other one of the fluid-filled chambers 270, 272 may be disposed adjacent to the medial side 20 of the footwear 10a. Each fluid-filled chamber 270, 272 may include a corresponding segment of the outsole 210a attached thereto. The forefoot region 12 proximate to the toe end of the cushioning member 250a and the heel region 16 of the cushioning member 250 may each also include separate corresponding segments of the outsole 210a attached thereto. A small gap may separate the fluid-filled chambers 270, 272 along an interior region of the footwear 10a between the lateral and medial sides 18, 20.

As with the footwear plate 300 of FIGS. 1-21, the footwear plate 300a is disposed within the sole structure 200a to reduce energy loss at the MTP joint while enhancing rolling of the foot as the footwear 10a rolls for engagement with a ground surface during a running movement. In view of the substantial similarity in structure and function of the components associated with the footwear plate 300 with respect to the footwear plate 300a, like reference numerals are used hereinafter and in the drawings to identify like components while like reference numerals containing letter extensions are used to identify those components that have been modified. The sleeve/cavity 240a is defined within an interior portion between the top surface 254 and the bottom surface 252a, whereby the footwear plate 300a is received within the cavity 240a and held in place between the top surface 254 and the bottom surface 252a. In other configurations, the footwear plate 300 is disposed upon the top surface 254 of the cushioning member 250 and underneath the strobel 220. In these configurations, the strobel 220 is optional and the footwear plate 300a may secure to the upper 100a to define the interior void 102 with or without the insole disposed on top of the footwear plate 300a. For instance, the footwear plate 300a may secure to the upper 100a using adhesives. In some implementations, the footwear plate 300a is sandwiched between the top surface 254 of the cushioning member 250a and an additional cushioning member (not shown) underneath the strobel 220. The footwear plate 300a may define a length extending through at least a portion of the length of the sole structure 200a. In some examples, the length of the plate 300a extends through the forefoot, midfoot, and heel portions 12, 14, 16 of the sole structure 200. In other examples, the length of the plate 300a extends through the forefoot portion 12 and the midfoot portion 14, and is absent from the heel portion 16. In other configurations, the plate 300a is disposed upon the footbed 224 (FIG. 23) of the strobel 220 within the interior void 102 of the upper 100 and an additional cushioning member or insole, may be disposed within the interior void 102 to sandwich the plate 300a between the footbed 224 of the strobel 220 and a bottom surface of the additional cushioning member or insole within the interior void 102.

As with the footwear plate 300, the footwear plate 300a may be formed from at least two layers of fibers 450 to impart anisotropic stiffness where the stiffness in one direction across the plate 300a is different from the stiffness in another direction. Here, the at least two layers of fibers 450 are anisotropic to one another to impart gradient stiffness and gradient load paths across the plate 300. In one configuration, the plate 300 provides a greater longitudinal stiffness (e.g., in a direction along the longitudinal axis L) than a transverse stiffness (e.g., in a direction transverse to the longitudinal axis L). In one example, the transverse stiffness is at least ten percent (10%) lower than the longitudinal stiffness. In another example, the transverse stiffness is from about ten percent (10%) to about twenty percent (20%) of the longitudinal stiffness. The fibers 450 may include one or more layers of tows 400a and/or layers of fibers 450 including at least one of carbon fibers, boron fibers, glass fibers, and polymeric fibers. In a particular configuration, the fibers 450 include carbon fibers, or glass fibers, or a combination of both carbon fibers and glass fibers. The tows 400a of fibers 450 may be affixed to a substrate. The tows 400a of fibers 450 may be affixed by stitching and/or using an adhesive. Additionally or alternatively, the tows 400a of fibers 450 and/or layers of fibers 450 may be consolidated with a resin formed from a thermoset polymer material(s) and/or a thermoplastic polymer material(s).

Accordingly, the plate 300a may have a tensile strength or flexural strength in a transverse direction substantially perpendicular to the longitudinal axis L. The stiffness of the plate 300a may be selected for a particular wearer based on the wearer's tendon flexibility, calf muscle strength, and/or MTP joint flexibility. Moreover, the stiffness of the plate 300a may also be tailored based upon a running motion of the athlete. In other configurations, the plate 300a is formed from one or more layers/plies of unidirectional tape. In some examples, each layer in the stack includes a different orientation than the layer disposed underneath. The plate 300a may be formed from unidirectional tape including at least one of carbon fibers, boron fibers, glass fibers, and polymeric fibers. In some examples, the one or more materials forming the plate 300 include a Young's modulus of at least 70 gigapascals (GPa). The plate 300a may define any of the geometries of the plate 300 of FIGS. 1-21, including the footwear plate geometries disclosed in U.S. Provisional Application Ser. No. 62/474,030, filed on Mar. 20, 2017, U.S. patent application Ser. No. 15/248,051, filed on Aug. 26, 2016, and U.S. patent application Ser. No. 15/248,059, filed on Aug. 26, 2016, which are hereby incorporated by reference in their entirety.

The length of the footwear plate 300a may extend between the first end 301, disposed proximate to the heel portion 16 of the sole structure 200a, and the second end 302, disposed proximate to the forefoot portion 12 of the sole structure 200a. The first end 301 may be disposed proximate to the heel portion 16 of the sole structure 200 and the second end 302 may be disposed proximate to the forefoot portion 12 of the sole structure 200. In some examples, the length of the footwear plate 300a is less than a length of the cushioning member 250a. The footwear plate 300a may also include a thickness extending substantially perpendicular to the longitudinal axis L of the sole structure 200a and a width extending between the lateral side 18 and the medial side 20. Accordingly, the length, the width, and the thickness of the plate 300a may substantially occupy the cavity 240a defined by the cushioning member 250a. In some examples, peripheral edges of the footwear plate 300a are visible along the lateral and/or medial sides 18, 20 of the footwear 10a.

FIG. 23 provides an exploded view of the article of footwear 10a showing the segments of the outsole 210a, the cushioning member 250a disposed upon inner surfaces 214a of the outsole 210a at the heel region 16 and the toe end of the forefoot region 12, the substantially rigid footwear plate 300a residing within the cavity 240a defined by the cushioning member 250a, and the fluid-filled bladders 270, 272 attached to the exposed portions of the footwear plate 300a proximate to the MTP joint of the foot within the gap 242 defined by the countoured bottom surface 252a of the cushioning member 250a. Each fluid-filled bladder 270, 272 may include a corresponding segment 210a of the outsole 210a attached thereto. The cushioning member 250a and the plate 300a may substantially occupy the entire volume of space between the strobel 220 and the outsole 210a at the heel region 16 and the toe end of the forefoot region 12, while the cushioning member 250a, the plate 300a and the fluid-filled bladders 270, 272 may substantially occupy the entire volume of space between the strobel 220 and the outsole 210a proximate to the MTP joint of the foot at regions of the sole structure 200a where the midfoot region 14 and the forefoot region 12 intersect. The cushioning member 250a may compress between the strobel 220 and the outsole 210a to provide a level of soft-type cushioning, while the fluid-filled bladders 270, 272 may compress between the footwear plate 300a and the outsole 210a to provide resilient cushioning to assist with pushing off the ground surface during running movements. In some configurations, the cushioning member 250a corresponds to a slab of polymer foam having a surface profile configured to receive the footwear plate 300a therein or thereon. The fluid-filled chambers 270, 272 may include a pressurized fluid (e.g., air) and may be formed from thermoplastic materials, such as thermoplastic polyurethane (TPU).

Figure 24:
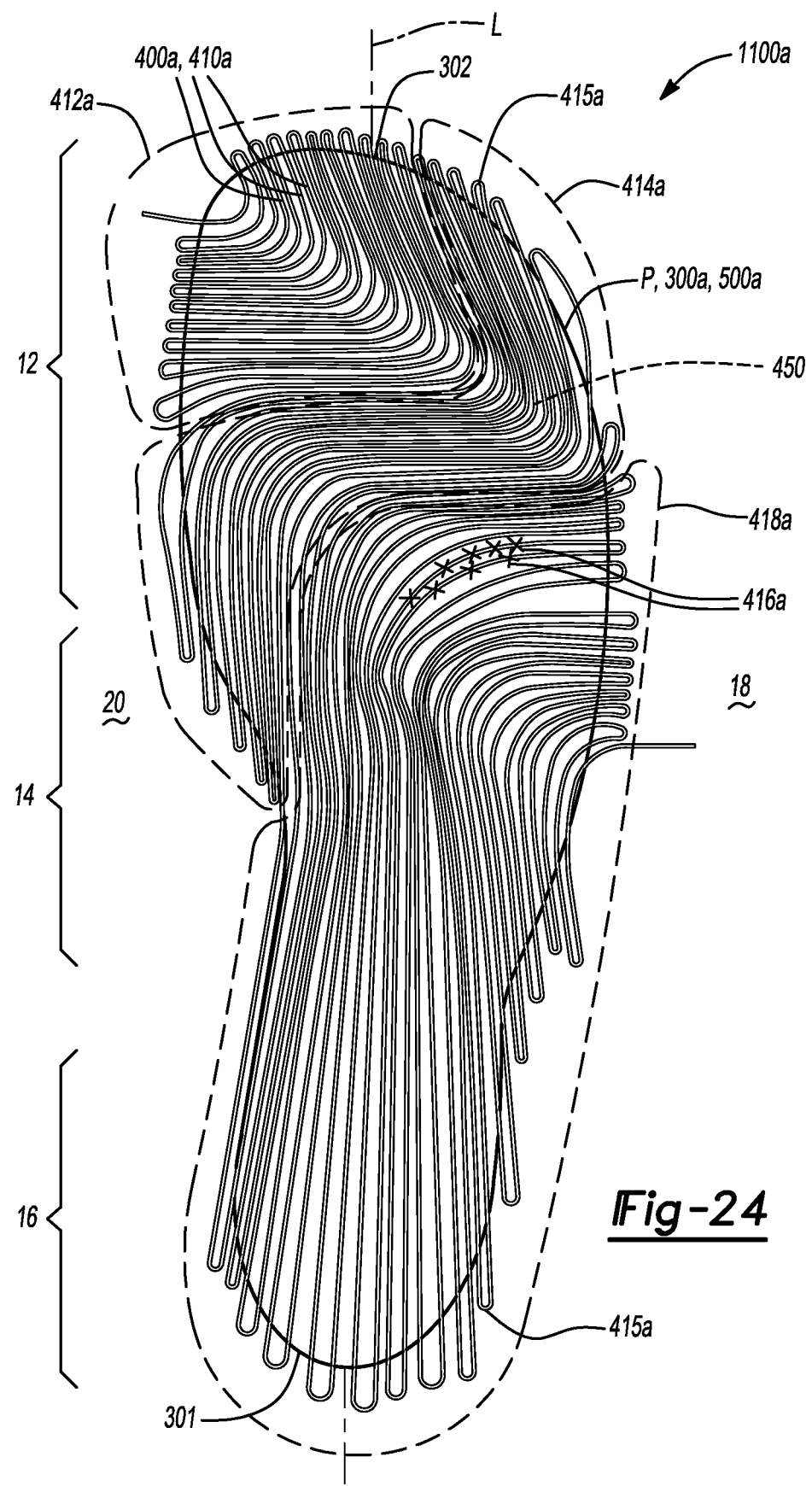
FIG. 24 is a top view of a first tow of fibers used to form a corresponding layer of the footwear plate of FIG. 22.
Figure 25:
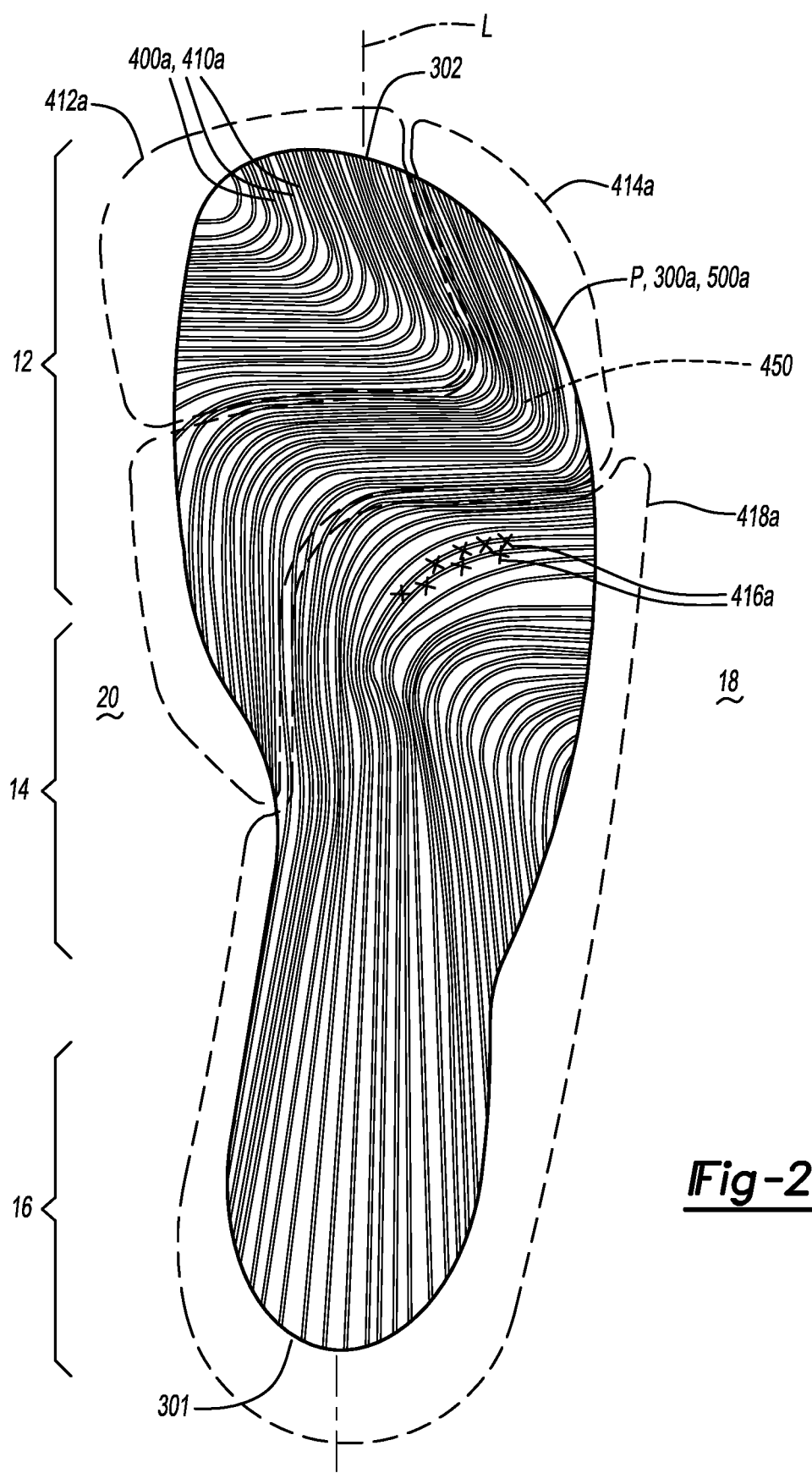
FIG. 25 is a top view of the first tow of fibers of FIG. 24 cut to align around a perimeter of the finished footwear plate.

FIGS. 24 and 25 provide a top view of a first strand/tow 400a, 410a of fibers 450 that may form a layer 1100a of the footwear plate 300a. The pattern of the first tow 410a of fibers 450 is shown relative to a peripheral edge P of the finished footwear plate 300a. In some examples, the first tow 410a is affixed/attached to a base layer that includes a corresponding substrate 500a. In other examples, the first tow 410a is affixed/attached on top of a base layer that includes an underlying layer 900a-900b (FIG. 26), which may be the sheet 600a-600e (FIG. 7) (e.g., unidirectional tape) or the layer 700a-700e (FIG. 9) (e.g., strand/tow), of fibers all affixed/attached to a single substrate 500s in a layered configuration. For instance, one or more layers 1100a of the first tow 410a of fibers 450 may replace one or more of the sheets 600a-600e of FIG. 7 or layers 700a-700e of FIG. 9 to form the finished footwear plate 300a. Accordingly, any layers/sheets 600a-600e, 700a-700e of fibers lying underneath or over top the layer 1100a associated with the first tow 410a of fibers 450 are omitted from the examples shown in FIGS. 24 and 25. Whereas the first strand/tow 400, 410 of fibers 450 forming the layer 1100 of the footwear plate 300 of FIGS. 11 and 12 provides a greater density of fibers 450 in the mid-foot region 14 than in the forefoot region 12, the first strand/tow 400a, 410a of fibers 450 forming the layer 1100a of FIGS. 24 and 25 provides a greater density of fibers 450 in the forefoot region 12 than in the mid-foot region 14 and in the heel region 16. In some examples, the first strand/tow 400a, 410a of fibers 450 forming the layer 1100a provides a stiffness that is greater in the forefoot region 12 than in the mid-foot region 14 along a baseline of the plate 300a, i.e., along the longitudinal axis (L) of the plate 300a from the first end 301 to the second end 302. Additionally, the layer 1100a may provide a stiffness that is greater across the width of the plate 300a from the lateral side 18 to the medial side 20 in the forefoot region 12 than in the midfoot region 14 (and also the heel region 16). Alternatively, the layer 1100a may provide substantially the same stiffness across the width of the plate 300a in both the forefoot region 12 and the midfoot region 14, while still providing a greater stiffness in the forefoot region 12 than in the midfoot region 14 along the baseline of the plate 300a.

In some examples, the first tow 410a is formed from a corresponding continuous strand of fibers 450. In other configurations, however, the first tow 410a is formed from two or more strands of fibers 450. The first tow 410a may range in size from about 1,000 fibers per bundle to about 48,000 fibers per bundle. In some examples, the first tow 410a includes 12,000 carbon fibers per bundle comingled with Nylon 6 or Nylon 12 resin material. The first tow 410a may include the same or different fiber types than the fiber types forming the layers/sheets 900a-900b, 600a-600e, 700a-700e of fibers lying underneath or over top the first tow in the layered configuration to form the finished footwear plate 300a. For instance, the first tow 410a may include at least one of carbon fibers, boron fibers, glass fibers, and polymeric fibers. The fibers 450 may be comingled with a thermoset polymer material and/or a thermoplastic polymer material to assist with affixing the first tow 410a to the substrate 500a and/or any layers/sheets 600a-600e, 700a-700e of fibers lying underneath or over top the first tow 410a of fibers 450 to form the plate 300a.

FIG. 24 shows the first tow 410a of fibers 450 including looped portions 415a disposed outside the peripheral edge P of the footwear plate 300a or substrate 500a for connecting adjacent segments/courses 412a, 414a, 418a of the first tow 410. The loop portions 415a may be consolidated when the first tow 410a and other layers/sheets 600a-600e, 700a-700e are subjected to heat and pressure to consolidate the fibers 450, and thereby form the footwear plate 300a. In some scenarios, the looped portions 415a extending outside the peripheral edge P create pinch points when the layered configuration is subjected to pressure (e.g., molding) for consolidating the fibers 450 to form the footwear plate 300a. Accordingly, FIG. 25 shows the first tow 410a of fibers 450a cut along the peripheral edge P of the footwear plate 300a to remove the looped portions 415a, thereby removing the presence of pinch points when applying pressure to form the finished footwear plate 300a.

In some configurations, the first tow 410a of fibers attaches to the substrate 500a via stitching 416a. For example, the stitching 416a may zigzag across the first tow 410a between first attachment locations located on the substrate 500a or a layer of fibers (e.g., strand or unidirectional tape) lying underneath. Here, the attachment locations may be spaced apart from the first tow 410a along the perimeter edge P of the finished footwear plate 300a. The stitching 416a may be formed from the same material as the substrate 500a or the stitching 416a may be formed from a different material than the material forming the substrate 500a such that the stitching 416a is associated with a higher melting point than the substrate 500a. Providing the stitching 416a with a higher melting point than the substrate 500a allows the stitching 416a to melt after the substrate 500a when heat is applied, thereby allowing the stitching 416a to melt after the substrate 500a begins to melt. In some examples, the stitching 416, or at least a portion thereof, is formed from resin. In some configurations, a layer 900a-900b of fibers 902 (FIG. 26), such as the sheet 600a-600e (FIG. 7) (e.g., unidirectional tape) or the layer 700a-700e (FIG. 9) (e.g., strand/tow) of fibers 602, 702, is disposed between the substrate 500a and the first tow 410a and the stitching 416a may zigzag across the first tow 410a between attachment locations located on the substrate 500a. In these configurations, the stitching 416a may penetrate the substrate 500a at the attachment locations and/or may also extend through the sheet/layer 900a-900b, 600a-600e, 700a-700e of fibers 602, 702, 902 disposed upon the substrate 500a and underlying the first tow 410a. For instance, the stitching 416a may attach the first tow 410a of fibers 450 to the substrate 500a by crossing over the first tow 410a of fibers 450a, extending through the sheet/layer 900a-900b, 600a-600e, 700a-700e of fibers 602, 702, 902, and penetrating the substrate 500a at the attachment locations. In some examples, the stitching 416a and the substrate 500a are formed from the thermoplastic material Nylon 6/6 material.

The first tow 410 of fibers 450 includes a plurality of first courses/segments 412a, a plurality of second courses/segments 414a, and a plurality of third courses/segments 418a. In the example shown, the first segments 412a of the first tow 410a are associated with a first shape and the second segments 414a of the first tow 410a are associated with a second shape different than the first shape. Similarly, the third segments 418a of the first tow 410a are associated with a third shape that is different than the first and third shapes. Accordingly, different shapes provided by the first, second and third segments 412a, 414a, 418a may impart anisotropic stiffness properties across the finished footwear plate 300a. Moreover, the first segments 412a of the first tow 410a may be associated with a first length that is shorter than the lengths of the second segments 414a of the first tow 410a and the third segments 418a of the first tow 410a. Similarly, the second segments 414a of the first tow 410a may be associated with a second length that is longer than the lengths of the first segments 412a of the first tow 410a and shorter than the lengths of the third segments 414a of the first tow 410a. Thus, the third segments 418a of the first tow 410a may be associated with a third length that is longer than the first and second lengths of the first and second segments 412a, 414a, respectively. The corresponding shapes and lengths of each segment 412a, 414a, 418a of the first tow 410a may be designed with an emphasis to provide a corresponding performance characteristic different from the corresponding performance characteristic provided by the other segments 412a, 414a, 418a of the first tow 410a. Moreover, the corresponding shapes and lengths of each segment 412a, 414a, 418a of the first tow 410a may cooperate to tune the stiffness across the footwear plate 300a such that adjacent segments 412a, 414a, 418a are disposed closer to one another across the width of the plate 300a between the medial side 20 and the lateral side 18 at the forefoot region 12 of the plate 300a than at the mid-foot region 14 and the heel region 16 and, thus, a density/ concentration of the fibers 450 is greater in the forefoot region 12 of the plate 300a than in the mid-foot and heel region 14, 16 of the plate 300a.

The first segments 412a may be disposed adjacent and substantially parallel to one another. Each first segment 412a has a corresponding first length that extends between a corresponding first end proximate to the perimeter edge P at the second end 302 of the plate 300a, and a corresponding second end proximate to the perimeter edge P at the medial side 20 of the plate 300a in the forefoot region 12. Moreover, each first segment 412a of the first tow 410a traverses the footwear plate 300a in the shape of an inverted "C" such that portions along the length of each first segment 412a extend from the second end 302 of the plate 300a in a direction substantially parallel to the longitudinal axis L of the plate 300a into the interior region along the forefoot region 14, then bend and extend in a direction substantially perpendicular to the longitudinal axis L of the plate 300a toward the medial side 20 of the plate 300a in the forefoot region 12. FIGS. 24 and 25 show a spacing between each adjacent first segment 412a that is longer along the bend extending through the interior region of the plate 300a in a direction convergent with the longitudinal axis (L) than the spacing proximate to the perimeter edge P of the plate 300a. In other words, the distances separating adjacent first segments 412a decrease as the segments 412a traverse away from the bend and toward the perimeter edges P of the plate 300a at the second end 302 of the plate 300a and the medial side 20 of the plate 300a in the forefoot region 12.

The second segments 414a may be convergent to the first segments 412a and disposed adjacent and substantially parallel to one another. Each second segment 414a has a corresponding second length that extends between a corresponding first end proximate to the perimeter edge P at the lateral side 18 of the plate 300a in the forefoot region 12, and a corresponding second end proximate to the perimeter edge P at the medial side 20 of the plate 300a in the mid-foot region 14. Moreover, each second segment 414a of the first tow 410a traverses the footwear plate 300a in the shape of an inverted "S" such that portions along the second length of each second segment 414a extend from the lateral side 18 of the plate 300a in the forefoot region 12 in a direction substantially parallel to the longitudinal axis L, then bend to extend from the lateral side 18 to the medial side 20 of the plate in a direction substantially perpendicular to the longitudinal axis L of the plate 300a, before bending a second time to extend along the medial side 20 in the mid-foot region 14 in the direction substantially parallel to the longitudinal axis L of the plate 300a. As with the first segments 412a, a spacing between each adjacent second segment 412a is longer along the first bend proximate to the lateral side 18 of the plate 300 and the second bend proximate to the medial side 20 of the plate 300a than the spacing of each adjacent segment traversing away from the first and second bends. In other words, the spacing of adjacent second segments 414a decreases when the segments 414a extend in the directions parallel and perpendicular to the longitudinal axis (L). FIGS. 24 and 25 show the first bend of the second segments 414a aligned with the bend of the first segments 412a to form a continuous bend in the forefoot region 12 that extends from the medial side 20 to the lateral side 18 in a direction convergent with the longitudinal axis (L).

The third segments 418a may be convergent to the first segments 412a and the second segments 414a and disposed adjacent and substantially parallel to one another. Each third segment 418a has a corresponding third length that extends between a corresponding first end proximate to the perimeter edge P at the lateral side 18 of the plate 300a in the mid-foot region 14, and a corresponding second end proximate to the first end 301 the plate 300a in the heel region 16. Moreover, each third segment 418a of the first tow 410a traverses the footwear plate 300a in the shape of a "C" such that portions along the first length of each third segment 418a extend from the lateral side 18 of the plate 300a in a direction substantially perpendicular to the longitudinal axis L of the plate 300a toward the interior region, then bend and extend in a direction substantially parallel to the longitudinal axis L of the plate 300a toward the first end 301 of the plate 300a in the heel region 16. The bend of the third segments 418a is substantially aligned with the second bend of the second segments 414a to form a continuous bend extending through the midfoot region 14 of the plate 300a in a direction convergent with the longitudinal axis (L) and parallel with the first bend extending through the forefoot region 12. FIGS. 24 and 25 show a spacing between each adjacent third segment 418a that is closer in the mid-foot region 14 than in the heel region 16. In other words, the distances separating adjacent third segments 418a increases as the segments 418a traverse away from the mid-foot region 14 of the plate 300a and toward the heel region 16 of the plate 300a.

Due to the spacing between adjacent segments 412a, 414a, 418a of the first tow 410a of fibers 450 being closer in the forefoot region 12 compared to the spacing in the midfoot and heel regions 14, 16, respectively, the segments 412a, 414a, 418a collectively provide a greater concentration/density of fibers 450 in the forefoot region 12 compared to the concentration/density of fibers in the midfoot and heel regions 14, 16, respectively. Accordingly, the first tow 410a of fibers 450 provides the footwear plate 300a with a stiffness in the forefoot region 12 that is greater than the stiffness of the footwear plate 300a in each of the midfoot region 14 and the heel region 16. In some examples, the stiffness of the footwear plate 300a is greater in the forefoot region 12 than in the midfoot region 14 along the baseline of the plate 300a, i.e., along the longitudinal axis (L) of the plate 300a from the first end 301 to the second end 302. The stiffness across the width of the footwear plate 300a from the lateral side 18 to the medial side 20 may be greater in the forefoot region 12 than in the midfoot region 14, or the stiffness across the width of the footwear plate 300a may be substantially the same in the forefoot region 12 and the midfoot region 14.

Figure 26:
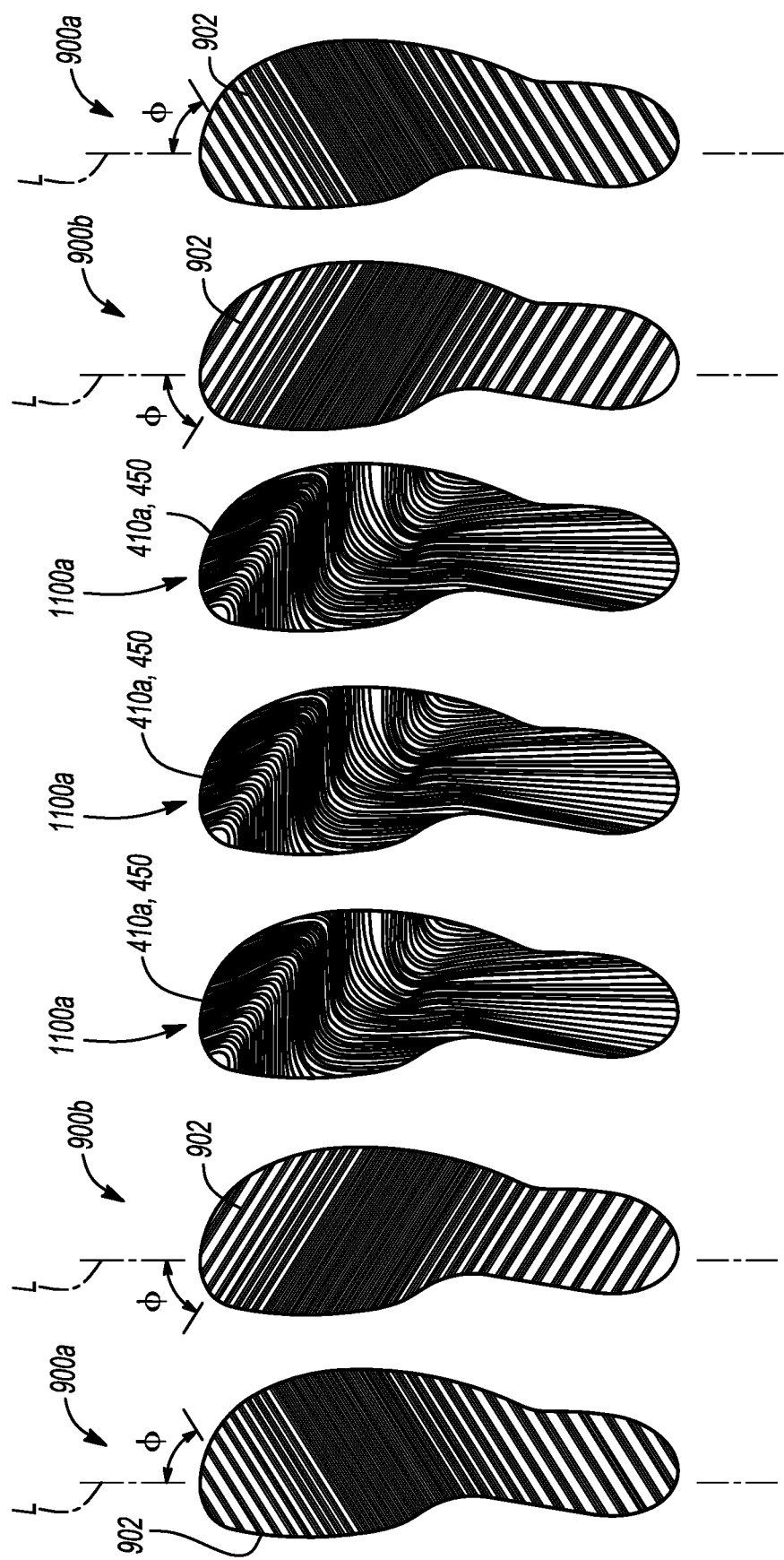
FIG. 26 shows various layers of fiber strands and the first tow of fibers of FIG. 25 used to form the footwear plate of FIG. 22.

Referring to FIG. 26, in some implementations, one or more of the layers 1100a formed by the corresponding first tow 410a of fibers 450 may be incorporated into a series of stacked layers 900a-900b of fibers 902 to tune stiffness properties imparted by the finished footwear plate 300a. In some examples, the stacked layers 900a-900b include the prepreg fiber sheets 600a-600e of FIG. 7 that may be the unidirectional tape or the multi-axial fabric having the fibers 902 impregnated with resin. Alternatively, some of the layers 900a-900b may be a unidirectional tape while others of the layers 900a-900b may be a multi-axial fabric. Here, one of the layers 900a-900b may be the unidirectional tape and the other may be the multi-axial fabric. In other examples, the stacked layers 900a-900b include the layers 700a-700e of FIG. 9 formed from individual strands 902 of fibers. In these examples, each strand 902 refers to a tow of a plurality of fibers, a monofilament, a yarn, or a polymer pre-impregnated tows. For instance, the strand 902 may include a plurality of carbon fibers and a plurality of resin fibers that, when activated, solidify and hold the carbon fibers in a desired shape and position relative to one another. As used herein, the term "tow" refers to a bundle (i.e., plurality of filaments (e.g., fibers 450) that may be twisted or untwisted and each tow may be designated a size associated with a number of fibers the corresponding tow contains. For instance, a single strand 902 may range in size from about 1,000 fibers per bundle to about 48,000 fibers per bundle. Each strand 902 may affix to a corresponding substrate 500a, or all of the strands 902 may affix to a same substrate 500 representative of a base layer for the preformed footwear plate 300a. Whether the layers 900 correspond to sheets of unidirectional tape or multi-axial fabric having the fibers 902 or layers formed by corresponding strands 902 of fibers, the fibers 902 include at least one of carbon fibers, boron fibers, glass fibers, and polymeric fibers. Fibers such as carbon fibers, aramid fibers, and boron fibers may provide a high Young's modulus while glass fibers (e.g., fiberglass) and polymer fibers (e.g., synthetic fibers) provide a medium modulus. The fiberglass fibers may include E6 318 fibers manufactured by Jushi™. Carbon fibers may include Teryfyl TC35 fibers, Hyosun H2550 fibers or Tenax-E HTS 40 fibers.

In some implementations, the layers 900a-900b include fibers 902 formed at different angles relative to one another such that a longitudinal axis of the fibers 902 (unidirectional tape, multi-axial fabric, strand) is positioned at an angle (Φ) relative to a longitudinal axis (L) of each layer 900a-900b. In one configuration, the fibers 902 of the layer 900a are positioned at the angle (Φ) equal to 60 degrees (60°) relative to the longitudinal axis (L) and the fibers 902 of the layer 900b are positioned at the angle (Φ) equal to −60 degrees (−60°) relative to the longitudinal axis (L). Accordingly, when the layers 900a-900b are stacked on one another, the longitudinal axes of the fibers 902 are positioned at different angles relative to the longitudinal axis (L) of the plate 300a. Moreover, a spacing between each adjacent row/strand of fibers 902 is closer near the MTP point 320 (FIG. 23) of the plate 300, i.e., proximate to where the forefoot region 12 and the midfoot region 14 meet, and increases in the directions toward the first end 301 (e.g., heel end) and the second end 302 (e.g., toe end) of the plate 300a. Therefore, regions proximate to the MTP point 320 of each layer 900a-900b includes a greater density/concentration of fibers 902 compared to the density/concentration of fibers 902 further away from the MTP point 320.

FIG. 26 shows a stacked configuration that includes a total of seven (7) layers with a bottom layer 900a including fibers 902 positioned at 60° relative to the longitudinal axis (L), the next layer 900b including fibers 902 positioned at −60° relative to the longitudinal axis (L), three (3) layers 1100a of the first tow 410a of fibers 450, the next layer 900b including fibers 902 positioned at −60° relative to the longitudinal axis (L), and the top and final layer 900a including fibers 902 positioned at 60° relative to the longitudinal axis (L). The three (3) layers 1100a of the first tow 410a of fibers 450 increase the stiffness of the footwear plate 300 along the baseline of the plate 300 (e.g., along the longitudinal axis (L) from the first end 301 to the second end 302) in the forefoot region 12 and along the width of the plate 300 (e.g., perpendicular to the longitudinal axis (L)) in the forefoot region 12, while substantially maintaining the stiffness in the midfoot region 14 (and also the heel region 16). The variance in the spacing and pattern of the segments 412a, 414a, 418a of the first tow 410a may provide a concentration/density of fibers 450 in the forefoot region 12 of the plate 300a that is greater than the concentration/density of fibers 450 in the midfoot region 14 and the heel region 16 along the baseline of the plate 300a. In some configurations, the bottom layer 900a includes fibers 902 applied in 16 layers of unidirectional tape.

In one configuration, the stiffness in the forefoot region 12 across the width of the plate 300a from the lateral side 18 to the medial side 20 is greater than 150 N/mm. In another configuration, the stiffness in the forefoot region 12 across the width of the plate 300a from the lateral side 18 to the medial side 20 is about 200 N/mm. In yet another configuration, the stiffness in the forefoot region 12 across the width of the plate 300a from the lateral side 18 to the medial side 20 is about 225 N/mm.

In one configuration, the stiffness in the forefoot region 12 across the baseline of the plate 300a from the first end 301 to the second end 302 is greater than 350 N/mm. In another configuration, the stiffness in the forefoot region 12 across the baseline of the plate 300a from the first end 301 to the second end 302 is about 375 N/mm. In yet another configuration, the stiffness in the forefoot region 12 across the baseline of the plate 300a from the first end 301 to the second end is about 400 N/mm.

In one configuration, the stiffness in the midfoot region 14 across the width of the plate 300a from the lateral side 18 to the medial side 20 is greater than 150 N/mm. In another configuration, the stiffness in the midfoot region 14 across the width of the plate 300a from the lateral side 18 to the medial side 20 is about 175 N/mm. In yet another configuration, the stiffness in the midfoot region 14 across the width of the plate 300a from the lateral side 18 to the medial side 20 is about 200 N/mm.

Figure 27:
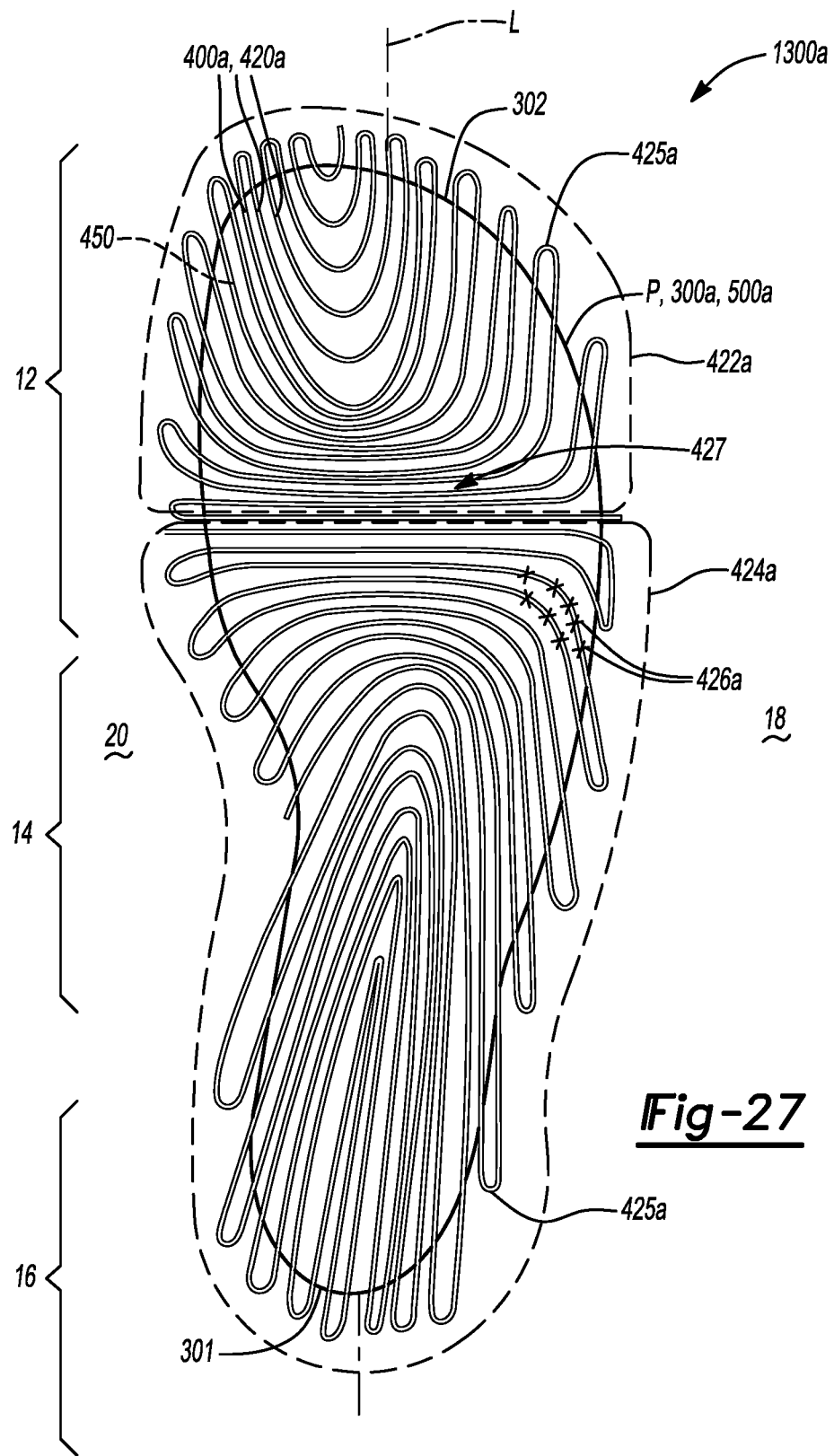
FIG. 27 is a top view of a second tow of fibers used to form a corresponding layer of the footwear plate of FIG. 22.
Figure 28:
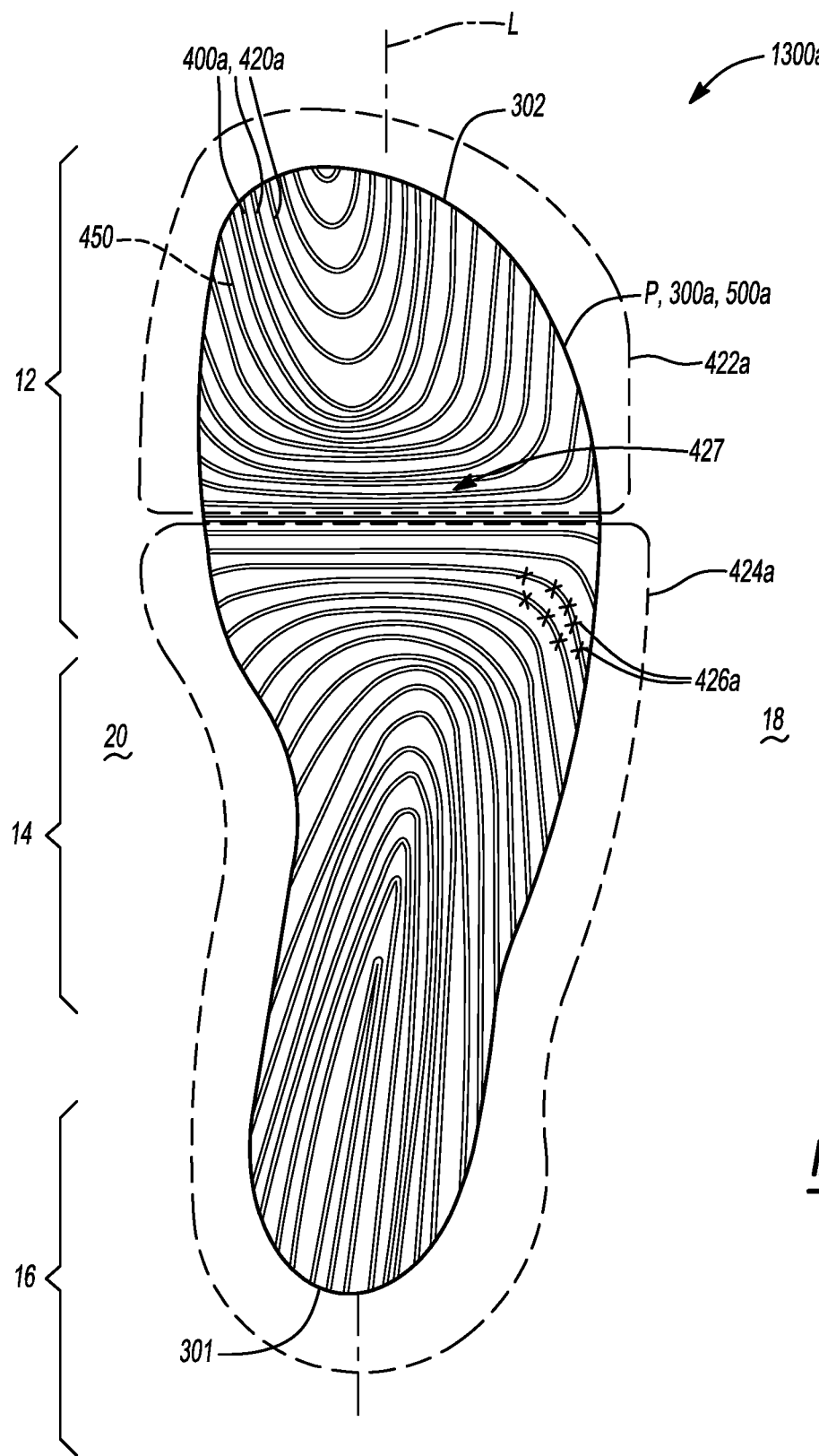
FIG. 28 is a top view of the first tow of fibers of FIG. 27 cut to align around a perimeter of the finished footwear plate.

FIGS. 27 and 28 provide a top view of a second strand/tow 400a, 420a of fibers 450 that may form a layer 1300a of the footwear plate 300a. The pattern of the second tow 420a of fibers 450 is shown relative to a peripheral edge P of the finished footwear plate 300a. In some examples, the second tow 420a is affixed/attached to a base layer that includes the corresponding substrate 500a. In other examples, the second tow 420a is affixed/attached on top of a base layer that includes an underlying layer 1000a-1000b (FIG. 29), which may be the sheet 600a-600e (FIG. 7) (e.g., unidirectional tape) or the layer 700a-700e (FIG. 9) (e.g., strand/tow), of fibers all affixed/attached to a single substrate 500s in a layered configuration. For instance, one or more layers 1300a of the second tow 420a of fibers 450 may replace one or more of the sheets 600a-600e of FIG. 7 or layers 700a-700e of FIG. 9 to form the finished footwear plate 300a. Accordingly, any layers/sheets 600a-600e, 700a-700e of fibers lying underneath or over top the layer 1300a associated with the second tow 420a of fibers 450 are omitted from the examples shown in FIGS. 27 and 28. As with the first strand/tow 400a, 410a of fibers 450 forming the layer 1100a of FIGS. 24 and 25, the second strand/tow 400a, 420a of fibers 450 forming the layer 1300a of FIGS. 27 and 28 may provide a stiffness that is greater in the forefoot region 12 than in the midfoot region 14 along the baseline of the plate 300a, i.e., along the longitudinal axis (L) of the plate 300a from the first end 301 to the second end 302. Additionally, the layer 1300a may provide a stiffness that is greater across the width of the plate 300a from the lateral side 18 to the medial side 20 in the forefoot region 12 than in the midfoot region 14 (and also the heel region 16). Alternatively, the layer 1300a may provide substantially the same stiffness across the width of the plate 300a in both the forefoot region 12 and the midfoot region 14, while still providing a greater stiffness in the forefoot region 12 than in the midfoot region 14 along the baseline of the plate 300a.

As with the first strand/tow 410a of FIGS. 24 and 25, the second strand/tow 420a may be formed from a corresponding continuous strand of fibers 450 or from two or more strands of fibers 450 and range in size from about 1,000 fibers per bundle to about 48,000 fibers per bundle. The second tow 420a may include the same or different fiber types than the fiber types forming the layers/sheets 1000a-1000b, 600a-600e, 700a-700e of fibers lying underneath or over top the first tow in the layered configuration to form the finished footwear plate 300a. For instance, the second tow 420a may include at least one of carbon fibers, boron fibers, glass fibers, and polymeric fibers. The fibers 450 may be comingled with a thermoset polymer material and/or a thermoplastic polymer material to assist with affixing the second tow 420a to the substrate 500a and/or any layers/sheets 600a-600e, 700a-700e of fibers lying underneath or over top the first tow 410a of fibers 450 to form the plate 300a.

FIG. 27 shows the second tow 420a of fibers 450 including looped portions 425a disposed outside the peripheral edge P of the footwear plate 300a or substrate 500a for connecting adjacent segments/courses 422a, 424a of the second tow 420a. The loop portions 425a may be consolidated when the second tow 420a and other layers/sheets 1000a-1000b, 600a-600e, 700a-700e are subjected to heat and pressure to consolidate the fibers 450, and thereby form the footwear plate 300a. In some scenarios, the looped portions 425a extending outside the peripheral edge P create pinch points when the layered configuration is subjected to pressure (e.g., molding) for consolidating the fibers 450 to form the footwear plate 300a. Accordingly, FIG. 28 shows the second tow 420a of fibers 450 cut along the peripheral edge P of the footwear plate 300a to remove the looped portions 425a, thereby removing the presence of pinch points when applying pressure to form the finished footwear plate 300a.

In some configurations, the second tow 420a of fibers 450 attaches to the substrate 500a via stitching 426a. For example, the stitching 426a may zigzag across the second tow 420a of fibers 450 between first attachment locations located on the substrate 500a or a layer of fibers (e.g., strand or unidirectional tape) lying underneath. Here, the attachment locations may be spaced apart from the second tow 420a of fibers 450 along the perimeter edge P of the finished footwear plate 300a. The stitching 426a may be formed from the same material as the substrate 500a or the stitching 426a may be formed from a different material than the material forming the substrate 500a such that the stitching 426a is associated with a higher melting point than the substrate 500a. Providing the stitching 426a with a higher melting point than the substrate 500a allows the stitching 426a to melt after the substrate 500a when heat is applied, thereby allowing the stitching 426a to melt after the substrate 500a begins to melt. In some examples, the stitching 426, or at least a portion thereof, is formed from resin. In some configurations, a layer 1000a-1000b of fibers 1002 (FIG. 29), such as the sheet 600a-600e (FIG. 7) (e.g., unidirectional tape) or the layer 700a-700e (FIG. 9) (e.g., strand/tow) of fibers 602, 702, is disposed between the substrate 500a and the second tow 420a and the stitching 426a may zigzag across the second tow 420a between attachment locations located on the substrate 500a. In these configurations, the stitching 426a may penetrate the substrate 500a at the attachment locations and/or may also extend through the sheet/layer 1000a-1000b, 600a-600e, 700a-700e of fibers 602, 702, 1002 disposed upon the substrate 500a and underlying the second tow 420a. For instance, the stitching 426a may attach the second tow 420a of fibers 450 to the substrate 500a by crossing over the second tow 420a of fibers 450, extending through the sheet/layer 1000a-1000b, 600a-600e, 700a-700e of fibers 602, 702, 1002, and penetrating the substrate 500a at the attachment locations.

The second tow 420a of fibers 450 includes a plurality of first courses/segments 422a and a plurality of second courses/segments 424a. In the example shown, the first segments 422a of the second tow 420a are associated with a first shape and the second segments 424a of the second tow 420a are associated with a second shape different than the first shape. The different shapes imparted by the first and second segments 422a, 422a may impart anisotropic stiffness properties across the finished footwear plate 300a. Moreover, the corresponding shapes of each segment 422a, 424a of the second tow 420a may cooperate to tune the stiffness across the footwear plate 300a such that adjacent segments 422a, 424a are disposed closer to one another across the width of the plate 300a between the medial side 20 and the lateral side 18 at the forefoot region 12 of the plate 300a than at the mid-foot region 14 and the heel region 16 and, thus, a density/concentration of the fibers 450 is greater in the forefoot region 12 of the plate 300a than in the mid-foot and heel region 14, 16 of the plate 300a.

The first segments 422a may be disposed adjacent and substantially parallel to one another within the forefoot region 12. Each first segment 422a has a corresponding length that extends between a corresponding first end proximate to the perimeter edge P on the lateral side 18 of the plate 300a in the forefoot region 12, and a corresponding second end proximate to the perimeter edge P at the medial side 20 of the plate 300a in the forefoot region 12. More specifically, each first segment 422a of the second tow 420a traverses the footwear plate 300a in a U-shaped configuration such that portions along the length of each first segment 422a extend from the perimeter edge P at the lateral side 18 of the plate 300a in a direction substantially parallel to the longitudinal axis L and toward the first end 301 of the plate 300a, then bend and extend into the interior region of the plate 300a, before bending again to extend toward the perimeter edge P at the medial side 20 of the plate 300a in a direction substantially parallel to the longitudinal axis L and toward the second end 302 of the plate 300a. FIGS. 27 and 28 show a spacing between each adjacent first segment 422a that is shorter within an MTP region 427 of the plate 300a than along the perimeter edge P of the plate 300a. For instance, the distances separating adjacent first segments 422a increase as the adjacent segments 422a become closer to the second end 302 (e.g., toe end) of the footwear plate 300a and as the segments 422a traverse toward the perimeter edges P of the plate 300a.

The second segments 424a may be convergent to the first segments 422a and disposed adjacent and substantially parallel to one another in the midfoot region 14 and/or the heel region 16. Each second segment 424a has a corresponding length that extends between a corresponding first end proximate to the perimeter edge P on the lateral side 18 of the plate 300a in a corresponding one of the midfoot region 14 and the heel region 16, and a corresponding second end proximate to the perimeter edge P at the medial side 20 of the plate 300a in the corresponding one of the midfoot region 14 and the heel region 16. More specifically, each second segment 424a of the second tow 420a traverses the footwear plate 300a in an inverted U-shaped configuration such that portions along the length of each second segment 424a extend from the perimeter edge P at the lateral side 18 of the plate 300a in a direction substantially parallel to the longitudinal axis L and toward the second end 301 of the plate 300a, then bend and extend into the interior region of the plate 300a, before bending again to extend toward the perimeter edge P at the medial side 20 of the plate 300a in a direction substantially parallel to the longitudinal axis L and toward the first end 302 of the plate 300a. Accordingly, the second segments 424a are inverted relative to the first segments 422a. FIGS. 27 and 28 show a spacing between each adjacent second segment 424a that is shorter within the interior regions of the plate 300a than along the perimeter edge P of the plate 300a. A portion of the second segments 424a cooperate with a portion of the first segments 422a to provide the MTP region 427 having the spacing between adjacent segments 422a, 422a that is closer than a spacing between adjacent segments 422a, 424a than along the perimeter edges P of the plate 300a. For instance, the distances separating adjacent first segments 422a increase as the adjacent segments 422a become closer to the second end 302 (e.g., toe end) of the footwear plate 300a and as the segments 422a traverse toward the perimeter edges P of the plate 300a. Moreover, the distances separating adjacent second segments 424a increases as the segments 424a traverse away from the midfoot region 14 of the plate 300a and toward the heel region 16 of the plate 300a.

Due to the spacing between adjacent segments 412a, 414a, 418a of the first tow 410a of fibers 450 being closer in the forefoot region 12 compared to the spacing in the midfoot and heel regions 14, 16, respectively, the segments 412a, 414a, 418a collectively provide a greater concentration/density of fibers 450 in the forefoot region 12 compared to the concentration/density of fibers in the midfoot and heel regions 14, 16, respectively. Accordingly, the first tow 410a of fibers 450 provides the footwear plate 300a with a stiffness in the forefoot region 12 that is greater than the stiffness of the footwear plate 300a in each of the midfoot region 14 and the heel region 16. In some examples, the stiffness of the footwear plate 300a is greater in the forefoot region 12 than in the midfoot region 14 along the baseline of the plate 300a, i.e., along the longitudinal axis (L) of the plate 300a from the first end 301 to the second end 302. The stiffness across the width of the footwear plate 300a from the lateral side 18 to the medial side 20 may be greater in the forefoot region 12 than in the midfoot region 14, or the stiffness across the width of the footwear plate 300a may be substantially the same in the forefoot region 12 and the midfoot region 14.

Due to the spacing between adjacent segments 422a, 424a of the second tow 420a of fibers 450 being closest in the MTP region 427 of the forefoot region 12 (and a portion of the midfoot region 14) compared to the spacing in the midfoot and heel regions 14, 16, respectively, as well as the spacing proximate to the perimeter edge P, the segments 422a, 424a collectively provide a greater concentration/density of fibers 450 in the MTP region 427 compared to the concentration/density of fibers outside of the MTP region 427. Accordingly, the first tow 410a of fibers 450 provides the footwear plate 300a with a stiffness in the forefoot region 12, and more specifically in the MTP region 427, that is greater than the stiffness of the footwear plate 300a in each of the midfoot region 14 and the heel region 16. In some examples, the stiffness of the footwear plate 300a is greater in the forefoot region 12 than in the midfoot region 14 along the baseline of the plate 300a, i.e., along the longitudinal axis (L) of the plate 300a from the first end 301 to the second end 302. The stiffness across the width of the footwear plate 300a from the lateral side 18 to the medial side 20 may be greater in the forefoot region 12 than in the midfoot region 14, or the stiffness across the width of the footwear plate 300a may be substantially the same in the forefoot region 12 and the midfoot region 14.

Figure 29:
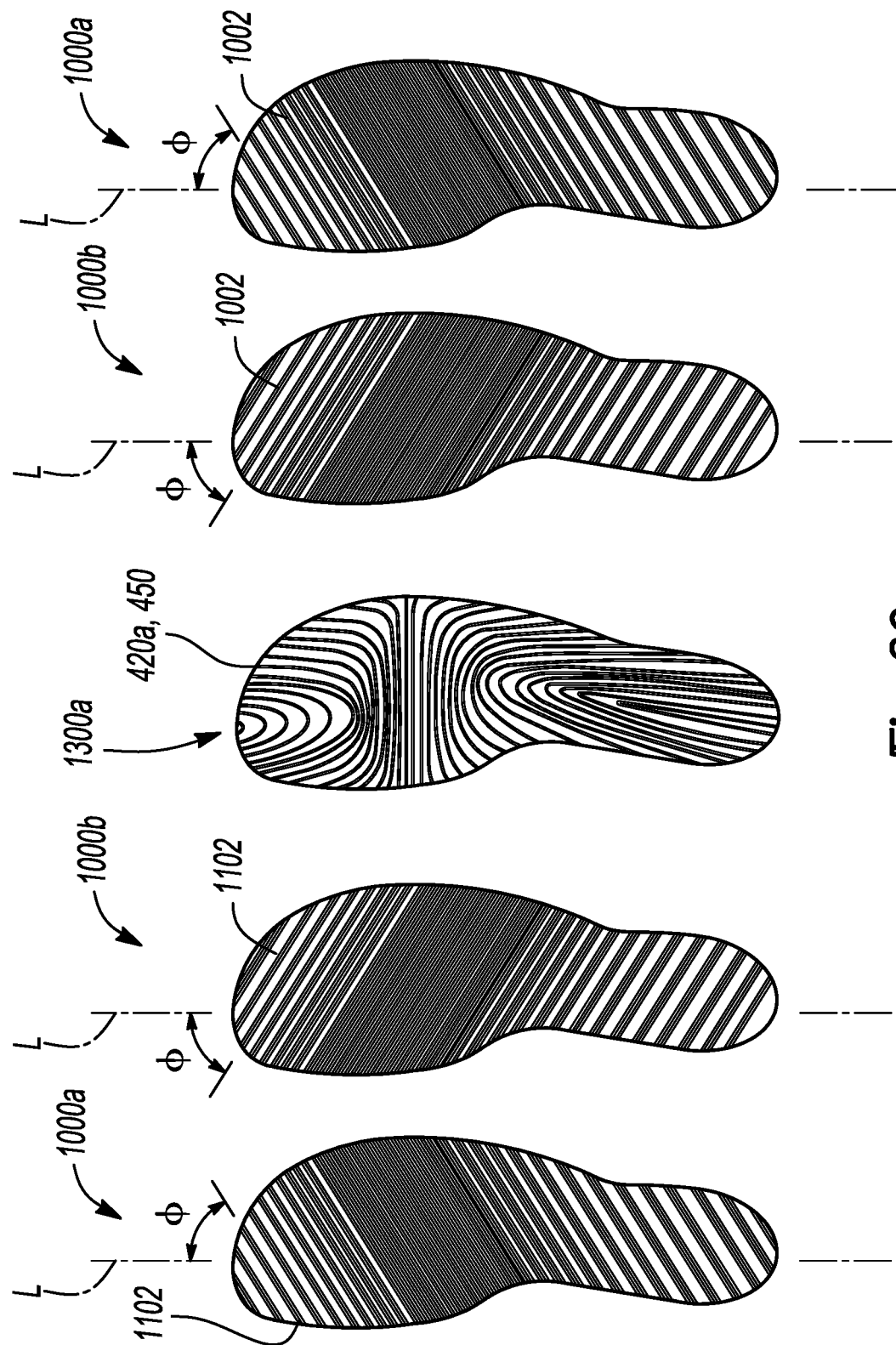
FIG. 29 shows various layers of fiber strands and the second tow of fibers of FIG. 28 used to form the footwear plate of FIG. 22.

Referring to FIG. 29, in some implementations, one or more of the layers 1300a formed by the corresponding second tow 420a of fibers 450 may be incorporated into a series of stacked layers 1000a-1000b of fibers 1002 to tune stiffness properties imparted by the finished footwear plate 300a. In some examples, the stacked layers 1000a-1000b include the prepreg fiber sheets 600a-600e of FIG. 7 that may be the unidirectional tape or the multi-axial fabric having the fibers 1002 impregnated with resin. Alternatively, some of the layers 1000a-1000b may be a unidirectional tape while others of the layers 1000a-1000b may be a multi-axial fabric. Here, one of the layers 1000a-1000b may be the unidirectional tape and the other may be the multi-axial fabric. In other examples, the stacked layers 1000a-1000b include the layers 700a-700e of FIG. 9 formed from individual strands 1002 of fibers. In these examples, each strand 1002 refers to a tow of a plurality of fibers, a monofilament, a yarn, or a polymer pre-impregnated tows. For instance, the strand 1002 may include a plurality of carbon fibers and a plurality of resin fibers that, when activated, solidify and hold the carbon fibers in a desired shape and position relative to one another. As used herein, the term "tow" refers to a bundle (i.e., plurality of filaments (e.g., fibers 450) that may be twisted or untwisted and each tow may be designated a size associated with a number of fibers the corresponding tow contains. For instance, a single strand 1002 may range in size from about 1,000 fibers per bundle to about 48,000 fibers per bundle. Each strand 1002 may affix to a corresponding substrate 500a, or all of the strands 1002 may affix to a same substrate 500 representative of a base layer for the pre-formed footwear plate 300a. Whether the layers 1000 correspond to sheets of unidirectional tape or multi-axial fabric having the fibers 1002 or layers formed by corresponding strands 1002 of fibers, the fibers 1002 include at least one of carbon fibers, boron fibers, glass fibers, and polymeric fibers. Fibers such as carbon fibers, aramid fibers, and boron fibers may provide a high Young's modulus while glass fibers (e.g., fiberglass) and polymer fibers (e.g., synthetic fibers) provide a medium modulus.

In some implementations, the layers 1000a-1000b include fibers 1002 formed at different angles relative to one another such that a longitudinal axis of the fibers 1002 (unidirectional tape, multi-axial fabric, strand) is positioned at an angle ($\Phi$) relative to a longitudinal axis (L) of each layer 1000a-1000b. In one configuration, the fibers 1002 of the layer 1000a are positioned at the angle ($\Phi$) equal to 60 degrees (60°) relative to the longitudinal axis (L) and the fibers 1002 of the layer 1000b are positioned at the angle ($\Phi$) equal to −60 degrees (−60°) relative to the longitudinal axis (L). Accordingly, when the layers 1000a-1000b are stacked on one another, the longitudinal axes of the fibers 1002 are positioned at different angles relative to the longitudinal axis (L) of the plate 300a. Moreover, a spacing between each adjacent row/strand of fibers 1002 is closer near the MTP point 320 (FIG. 23) of the plate 300, i.e., proximate to where the forefoot region 12 and the midfoot region 14 meet, and increases in the directions toward the first end 301 (e.g., heel end) and the second end 302 (e.g., toe end) of the plate 300a. Therefore, regions proximate to the MTP point 320 of each layer 1000a-1000b includes a greater density/concentration of fibers 1002 compared to the density/concentration of fibers 1002 further away from the MTP point 320.

FIG. 29 shows a stacked configuration that includes a total of five (5) layers with a bottom layer 1000a including fibers 1002 positioned at 60° relative to the longitudinal axis (L), the next layer 1000b including fibers 1002 positioned at −60° relative to the longitudinal axis (L), the layer 1300a of the second tow 420a of fibers 450, the next layer 1000b including fibers 1002 positioned at −60° relative to the longitudinal axis (L), and the top and final layer 1000a including fibers 1002 positioned at 60° relative to the longitudinal axis (L). The single layer 1300a of the second tow 420a of fibers 450 increases the stiffness of the footwear plate 300 along the baseline of the plate 300 (e.g., along the longitudinal axis (L) from the first end 301 to the second end 302) in the forefoot region 12 and along the width of the plate 300 (e.g., perpendicular to the longitudinal axis (L)) in the forefoot region 12 proximate to the MTP point 320 (FIG. 23) of the plate 300a, while substantially maintaining the stiffness in the midfoot region 14 (and also the heel region 16). The variance in the spacing and pattern of the segments 422a, 424a of the second tow 420a may provide a concentration/density of fibers 450 in the forefoot region 12 of the plate 300a that is greater than the concentration/density of fibers 450 in the midfoot region 14 and the heel region 16 along the baseline of the plate 300a.

In one configuration, the stiffness in the forefoot region 12 across the width of the plate 300a from the lateral side 18 to the medial side 20 is greater than 175 N/mm. In another configuration, the stiffness in the forefoot region 12 across the width of the plate 300a from the lateral side 18 to the medial side 20 is about 225 N/mm. In yet another configuration, the stiffness in the forefoot region 12 across the width of the plate 300a from the lateral side 18 to the medial side 20 is about 250 N/mm. The second tow 420a of fibers 450 forming the second layer 1300a of the footwear plate 300a may provide a greater stiffness in the forefoot region 12 across the width of the plate 300a from the lateral side 18 to the medial side 20 compared to a stiffness provided by the first tow 410a of fibers 450a forming the first layer 1100a of FIGS. 24 and 25.

In one configuration, the stiffness in the forefoot region 12 across the baseline of the plate 300a from the first end 301 to the second end 302 is greater than 400 N/mm. In another configuration, the stiffness in the forefoot region 12 across the baseline of the plate 300a from the first end 301 to the second end 302 is about 425 N/mm. In yet another configuration, the stiffness in the forefoot region 12 across the baseline of the plate 300a from the first end 301 to the second end is about 450 N/mm. The second tow 420a of fibers 450 forming the second layer 1300a of the footwear plate 300a may provide a greater stiffness in the forefoot region 12 along the baseline of the plate 300a compared to the stiffness provided by the first tow 410a of fibers 450 forming the first layer 1100a of FIGS. 24 and 25.

In one configuration, the stiffness in the midfoot region 14 across the width of the plate 300a from the lateral side 18 to the medial side 20 is greater than 125 N/mm. In another configuration, the stiffness in the midfoot region 14 across the width of the plate 300a from the lateral side 18 to the medial side 20 is about 150 N/mm. In yet another configuration, the stiffness in the midfoot region 14 across the width of the plate 300a from the lateral side 18 to the medial side 20 is about 175 N/mm. The second tow 420a of fibers 450 forming the second layer 1300a of the footwear plate 300a may provide a lower stiffness in the midfoot region 12 across the width of the plate 300a from the lateral side 18 to the medial side 20 compared to a stiffness provided by the first tow 410a of fibers 450a forming the first layer 1100a of FIGS. 24 and 25.

Stiffness data of the footwear plate 300a may be obtained using an Instron 5965 impact tester having a quarter-inch (0.25") diameter upper diameter and a half-inch (0.5") diameter pair of lower support parts. Testing may include Aonix plates with a span of the lower support bars increasing to 70 mm, 25N of preload to prevent slippage and a load applied at a rate of 300 mm/min to 5 mm compressive extension. To reduce risk of plate failure, only a single cycle was applied.

With particular reference to FIGS. 30 and 31, formation of a footwear plate 300a is described in conjunction with a mold 800a. In view of the substantial similarity in structure and function of the components associated with the mold 800 of FIGS. 20 and 21 with respect to the mold 800a, like reference numerals are used hereinafter and in the drawings to identify like components while like reference numerals containing letter extensions are used to identify those components that have been modified.

The mold 800a includes a first mold half 802a and a second mold half 804a having a mold cavity 806a that includes the shape of the footwear plate 300a, to allow the mold 800a to impart the desired shape of the particular plate 300 to either the stacked layers 900a-900b of FIG. 26 incorporating one or more of the layers 1100a of FIGS. 24 and 25 formed by the corresponding first tow 410a of fibers 450, or to the stacked layers 1000a-1000b of FIG. 29 incorporating one or more of the layers 1300a of FIGS. 27 and 28 formed by the corresponding second tow 420a of fibers 450.

After forming the stacked layers 900a-900b/1000a-1000b, the layers 900a-900b/1000a-1000b are inserted between the mold halves 802a, 804a within the mold cavity 806a. At this point, the mold 800a is closed by moving the mold halves 802a, 804a toward one another or by moving one of the mold halves 802a, 804a toward the other mold half 802a, 804a. Once closed, the mold 800a applies heat and pressure to the stacked layers 900a-900b/1000a-1000b disposed within the mold cavity 806 to activate the resin associated with the stacked layers 900a-900b/1000a-1000b. The heat and pressure applied to the stacked layers 900a-900b/1000a-1000b causes the particular shape of the mold cavity 806a to be applied to the stacked layers 900a-900b/1000a-1000b and, once cured, the resin associated with the stacked layers 900a-900b/1000a-1000b causes the stacked layers 900a-900b/1000a-1000b to harden and retain the desired shape. Moreover, the incorporated layer(s) 1100a, 1300a formed by the corresponding tows 410a, 420a of fibers 450 may include thermoplastic yarns and/or stitching 416a, 426a formed from thermoplastic or thermoset material to assist with attaching to the stacked layers 900a-900b/1000a-1000b to retain the desired shape. In some examples, at least the second mold half 804a is heated to about 160-degrees Fahrenheit (F) to about 165-degrees F. and the resin is poured over the stack to saturate the layers 900a-900b/1000a-1000b/1100a/1300a and the mold 800a is closed to apply pressure within the range of 75 psi to about 100 psi for a time during a resin gelation curve, i.e., between about 7.5 minutes and about 8.5 minutes. The formed plate 300 may be removed from the mold 800a after about 30 minutes when the plate 300 is fully cured.

It should be noted that while the layers 900a-900b/1000a-1000b are described as including a resin material, the layers 900a-900b/1000a-1000b could additionally be supplied with resin that is infused within the mold 800. The infused resin could be in addition to the impregnated resin of the layers 900a-900b/1000a-1000b or, alternatively, could be used in place of the impregnated resin. The infused resin may include a thermoplastic or thermoset material.

The forgoing processes may be used to form footwear plates and cushioning elements that may be used to manufacture custom-made footwear. For instance, various measurements of the foot may be recorded to determine suitable dimensions of the footwear plate and the cushioning member(s) incorporated into the article of footwear. Additionally, data associated with the gate of the foot may be obtained to determine if the foot is indicative of toe striking or heel striking. The foot measurements and obtained data may be used to determine optimal angles and radii of curvature of the footwear plate, as well as the thickness of the one or more cushioning members positioned above, below, or encapsulating the footwear plate. Moreover, the length and width of the footwear plate may be determined based on the collected data and foot measurements. In some examples, the foot measurements and collected data are used to select the footwear plate and/or cushioning member(s) from a plurality of pre-fabricated footwear plates and/or cushioning member(s) of various sizes and dimensions that closely match the foot of the wearer.

Custom footwear plates may further allow for tailoring of the stiffness of the plate for a particular wearer of the footwear. For instance, the tendon stiffness and calf muscle strength of an athlete may be measured to determine a suitable stiffness of the plate for use by the athlete. Here, the stiffness of the footwear plate can vary with the strength of the athlete or for the size/condition of the athlete's tendons. Additionally or alternatively, the stiffness of the plate may be tailored based on biomechanics and running mechanics of a particular athlete, such as how the angles of the athlete's joints change during running movements. In some examples, force and motion measurements of the athlete are obtained before manufacturing a custom plate for the athlete. In other examples, plates are manufactured in particular ranges or increments of stiffness to provide semi-custom footwear such that individual athletes may select a suitable stiffness.

The following Clauses provide an exemplary configuration for a method of forming a plate for an article of footwear described above.

Clause 1: A method of forming a plate for an article of footwear, the method comprising applying a first strand portion to a base layer including positioning first segments of the first strand portion on the base layer adjacent to one another to form a first layer on the base layer, removing portions of the first segments to define an outer edge of the plate, and applying at least one of heat and pressure to the first strand portion and to the base layer to conform the first strand portion and the base layer to a predetermined shape.

Clause 2: The method of Clause 1, wherein removing portions of the first segments includes severing the first strand portion at a first end of each first segment and severing the first strand portions at a second end of each first segment located at an opposite end of the respective first strand portions than the first end.

Clause 3: The method of Clause 1, wherein removing portions of the first segments includes removing loops of the first strand portion connecting adjacent first segments.

Clause 4: The method of Clause 1, wherein applying the first strand portion to a base layer includes applying the first strand portion to a second layer having a plurality of fibers and/or to a second layer formed from unidirectional tape.

Clause 5: The method of Clause 1, wherein applying the first strand portion to a base layer includes applying the first strand portion to a substrate.

Clause 6: The method of any of the preceding Clauses, wherein applying the first strand portion to a base layer includes attaching the first strand portion to the base layer via stitching.

Clause 7: The method of any of the preceding Clauses, wherein applying the first strand portion to a base layer includes applying a continuous strand.

Clause 8: The method of Clause 7, wherein applying a continuous strand of the first strand portion includes forming loops of the first strand portion.

Clause 9: The method of Clause 8, wherein removing portions of the first segments includes removing the loops between adjacent first segments of the first strand portion.

Clause 10: The method of any of the preceding Clauses, further comprising forming the first strand portion from a first tow of fibers.

Clause 11: The method of Clause 10, wherein forming the first strand portion from a first tow of fibers includes forming the first strand portion from at least one of carbon fibers, boron fibers, glass fibers, and polymeric fibers.

Clause 12: The method of any of the preceding Clauses, wherein applying the first strand portion to a base layer includes positioning adjacent first segments closer to one another across a width of the plate between a medial side and a lateral side at a midfoot region of the plate than at a forefoot region of the plate.

Clause 13: The method of any of the preceding Clauses, wherein applying the first strand portion to a base layer includes positioning adjacent first segments closer to one another across a width of the plate between a medial side and a lateral side at a midfoot region of the plate than at a heel region of the plate.

Clause 14: Further comprising incorporating the plate into an article of footwear.

Clause 15: A method of forming a plate for an article of footwear, the method comprising applying a first strand portion to a base layer including positioning adjacent first segments of the first strand portion closer to one another across a width of the plate between a medial side and a lateral side at a midfoot region of the plate than at a heel region of the plate to form a first layer on the base layer, and applying at least one of heat and pressure to the first strand portion and to the base layer to conform the first strand portion and the base layer to a predetermined shape.

Clause 16: The method of Clause 15, further comprising removing portions of the first segments to define an outer edge of the plate.

Clause 17: The method of Clause 16, wherein removing portions of the first segments includes severing the first strand portion at a first end of each first segment and severing the first strand portions at a second end of each first segment located at an opposite end of the respective first strand portions than the first end.

Clause 18: The method of Clause 16, wherein removing portions of the first segments includes removing loops of the first strand portion connecting adjacent first segments.

Clause 19: The method of Clause 15, wherein applying the first strand portion to a base layer includes applying the first strand portion to a second layer having a plurality of fibers and/or to a second layer formed from unidirectional tape.

Clause 20: The method of Clause 15, wherein applying the first strand portion to a base layer includes applying the first strand portion to a substrate.

Clause 21: The method of any of the preceding Clauses, wherein applying the first strand portion to a base layer includes attaching the first strand portion to the base layer via stitching.

Clause 22: The method of any of the preceding Clauses, wherein applying the first strand portion to a base layer includes applying a continuous strand.

Clause 23: The method of Clause 22, wherein applying a continuous strand of the first strand portion includes forming loops of the first strand portion.

Clause 24: The method of Clause 23, further comprising removing the loops between adjacent first segments of the first strand portion to define an outer edge of the plate.

Clause 25: The method of any of the preceding Clauses, further comprising forming the first strand portion from a first tow of fibers.

Clause 26: The method of Clause 25, wherein forming the first strand portion from a first tow of fibers includes forming the first strand portion from at least one of carbon fibers, boron fibers, glass fibers, and polymeric fibers.

Clause 27: The method of any of the preceding Clauses, wherein applying the first strand portion to a base layer includes positioning adjacent first segments closer to one another across the width of the plate between the medial side and the lateral side at the midfoot region of the plate than at a forefoot region of the plate.

Clause 28: Further comprising incorporating the plate into an article of footwear.

Clause 29: A method of forming a plate for an article of footwear, the method comprising applying a first strand portion to a base layer including positioning adjacent first segments of the first strand portion closer to one another across a width of the plate between a medial side and a lateral side at a midfoot region of the plate than at a forefoot region of the plate to form a first layer on the base layer, and applying at least one of heat and pressure to the first strand portion and to the base layer to conform the first strand portion and the base layer to a predetermined shape.

Clause 30: The method of Clause 29, further comprising removing portions of the first segments to define an outer edge of the plate.

Clause 31: The method of Clause 30, wherein removing portions of the first segments includes severing the first strand portion at a first end of each first segment and severing the first strand portions at a second end of each first segment located at an opposite end of the respective first strand portions than the first end.

Clause 32: The method of Clause 30, wherein removing portions of the first segments includes removing loops of the first strand portion connecting adjacent first segments.

Clause 33: The method of Clause 29, wherein applying the first strand portion to a base layer includes applying the first strand portion to a second layer having a plurality of fibers and/or to a second layer formed from unidirectional tape.

Clause 34: The method of Clause 29, wherein applying the first strand portion to a base layer includes applying the first strand portion to a substrate.

Clause 35: The method of any of the preceding Clauses, wherein applying the first strand portion to a base layer includes attaching the first strand portion to the base layer via stitching.

Clause 36: The method of any of the preceding Clauses, wherein applying the first strand portion to a base layer includes applying a continuous strand.

Clause 37: The method of Clause 36, wherein applying a continuous strand of the first strand portion includes forming loops of the first strand portion.

Clause 38: The method of Clause 37, further comprising removing the loops between adjacent first segments of the first strand portion to define an outer edge of the plate.

Clause 39: The method of any of the preceding Clauses, further comprising forming the first strand portion from a first tow of fibers.

Clause 40: The method of Clause 39, wherein forming the first strand portion from a first tow of fibers includes forming the first strand portion from at least one of carbon fibers, boron fibers, glass fibers, and polymeric fibers.

Clause 41: The method of any of the preceding Clauses, wherein applying the first strand portion to a base layer includes positioning adjacent first segments closer to one another across the width of the plate between the medial side and the lateral side at the midfoot region of the plate than at a heel region of the plate.

Clause 42: Further comprising incorporating the plate into an article of footwear.

Clause 43: The method of any of Clauses 1-42, further comprising consolidating fibers of the first strand portion with a polymeric resin.

Clause 44: The method of Clause 43, wherein consolidating the fibers with a polymeric resin is performed during the application of heat and/or pressure.

Clause 45: A plate for an article of footwear, the plate comprising a first layer including first high tensile strength fibers, a second layer including second high tensile strength fibers, a third layer including third high tensile strength fibers, and a polymeric resin consolidating the first high tensile strength fibers, the second high tensile strength fibers, and the third high tensile strength fibers, wherein the plate includes a forefoot region, a heel region, and a midfoot region disposed between the forefoot region and the heel region, the forefoot region including a stiffness of about 80 N/mm to about 90 N/mm.

Clause 46: The plate of Clause 45, wherein a stiffness of the heel region is about 20 N/mm to about 30 N/mm.

Clause 47: The plate of Clause 45, wherein a stiffness of the midfoot region is about 75 N/mm to about 120 N/mm.

Clause 48: The plate of Clause 45, wherein a stiffness of the heel region is about 50 N/mm to about 60 N/mm.

Clause 49: The plate of Clause 45, wherein a stiffness of the midfoot region is about 20 N/mm to about 55 N/mm.

Clause 50: The plate of any of the preceding clauses, wherein at least one of the first high tensile strength fibers, the second high tensile strength fibers, and the third high tensile strength fibers include at least one of carbon fibers, boron fibers, glass fibers, and polymeric fibers.

Clause 51: The plate of any of the preceding clauses, wherein the polymeric resin is a thermoset resin or a thermoplastic resin.

Clause 52: The plate of any of the preceding clauses, wherein at least one of the first high tensile strength fibers, the second high tensile strength fibers, and the third high tensile strength fibers are applied in a unidirectional tape.

Clause 53: The plate of any of the preceding clauses, wherein at least one of the first high tensile strength fibers, the second high tensile strength fibers, and the third high tensile strength fibers are applied as a strand of fibers stitched down to a base layer.

Clause 54: The plate of Clause 45, wherein at least two of the first high tensile strength fibers, the second high tensile strength fibers, and the third high tensile strength fibers are applied in a unidirectional tape and the other the first high tensile strength fibers, the second high tensile strength fibers, and the third high tensile strength fibers is applied as a strand of fibers stitched down to a base layer.

Clause 55: The plate of Clause 45, wherein the first high tensile strength fibers, the second high tensile strength fibers, and the third high tensile strength fibers are applied as strands of fibers stitched down to a base layer and each including a different pattern.

Clause 56: The plate of Clause 45, wherein at least one of the first high tensile strength fibers, the second high tensile strength fibers, and the third high tensile strength fibers are applied as a strand of fibers stitched down to a base layer.

Clause 57: The plate of Clause 56, wherein adjacent segments of the strand of fibers are positioned closer to one another across a width of the plate between a medial side and a lateral side at the midfoot region of the plate than at the heel region of the plate to form the first layer.

Clause 58: The plate of Clause 56, wherein adjacent segments of the strand of fibers are positioned closer to one another across a width of the plate between a medial side and a lateral side at the midfoot region of the plate than at the forefoot region of the plate to form the first layer.

Clause 59: A plate for an article of footwear, the plate comprising a first layer including first high tensile strength fibers, a second layer including second high tensile strength fibers, a third layer including third high tensile strength fibers, and a polymeric resin consolidating the first high tensile strength fibers, the second high tensile strength fibers, and the third high tensile strength fibers, wherein the plate includes a forefoot region, a heel region, and a midfoot region disposed between the forefoot region and the heel region, the midfoot region including a stiffness of about 60 N/mm to about 70 N/mm.

Clause 60: The plate of Clause 59, wherein a stiffness of the heel region is about 20 N/mm to about 30 N/mm.

Clause 61: The plate of Clause 59, wherein a stiffness of the forefoot region is about 95 N/mm to about 105 N/mm.

Clause 62: The plate of Clause 59, wherein a stiffness of the heel region is about 50 N/mm to about 60 N/mm.

Clause 63: The plate of Clause 59, wherein a stiffness of the forefoot region is about 75 N/mm to about 120 N/mm.

Clause 64: The plate of any of the preceding clauses, wherein at least one of the first high tensile strength fibers, the second high tensile strength fibers, and the third high tensile strength fibers include at least one of carbon fibers, boron fibers, glass fibers, and polymeric fibers.

Clause 65: The plate of any of the preceding clauses, wherein the polymeric resin is a thermoset resin or a thermoplastic resin.

Clause 66: The plate of any of the preceding clauses, wherein at least one of the first high tensile strength fibers, the second high tensile strength fibers, and the third high tensile strength fibers are applied in a unidirectional tape.

Clause 67: The plate of any of the preceding clauses, wherein at least one of the first high tensile strength fibers, the second high tensile strength fibers, and the third high tensile strength fibers are applied as a strand of fibers stitched down to a base layer.

Clause 68: The plate of Clause 59, wherein at least two of the first high tensile strength fibers, the second high tensile strength fibers, and the third high tensile strength fibers are applied in a unidirectional tape and the other the first high tensile strength fibers, the second high tensile strength fibers, and the third high tensile strength fibers is applied as a strand of fibers stitched down to a base layer.

Clause 69: The plate of Clause 59, wherein the first high tensile strength fibers, the second high tensile strength fibers, and the third high tensile strength fibers are applied as strands of fibers stitched down to a base layer and each including a different pattern.

Clause 70: The plate of Clause 59, wherein at least one of the first high tensile strength fibers, the second high tensile strength fibers, and the third high tensile strength fibers are applied as a strand of fibers stitched down to a base layer.

Clause 71: The plate of Clause 70, wherein adjacent segments of the strand of fibers are positioned closer to one another across a width of the plate between a medial side and a lateral side at the midfoot region of the plate than at the heel region of the plate to form the first layer.

Clause 72: The plate of Clause 70, wherein adjacent segments of the strand of fibers are positioned closer to one another across a width of the plate between a medial side and a lateral side at the midfoot region of the plate than at the forefoot region of the plate to form the first layer.

Clause 73: A plate for an article of footwear, the plate comprising a first layer including first high tensile strength fibers, a second layer including second high tensile strength fibers, a third layer including third high tensile strength fibers and a polymeric resin consolidating the first high tensile strength fibers, the second high tensile strength fibers, and the third high tensile strength fibers, wherein the plate includes a forefoot region, a heel region, and a midfoot region disposed between the forefoot region and the heel region, the heel region including a stiffness of about 35 N/mm to about 45 N/mm.

Clause 74: The plate of Clause 73, wherein a stiffness of the midfoot region is about 20 N/mm to about 55 N/mm.

Clause 75: The plate of Clause 73, wherein a stiffness of the forefoot region is about 95 N/mm to about 105 N/mm.

Clause 76: The plate of Clause 73, wherein a stiffness of the midfoot region is about 75 N/mm to about 120 N/mm.

Clause 77: The plate of Clause 73, wherein a stiffness of the forefoot region is about 75 N/mm to about 120 N/mm.

Clause 78: The plate of any of the preceding clauses, wherein at least one of the first high tensile strength fibers, the second high tensile strength fibers, and the third high tensile strength fibers include at least one of carbon fibers, boron fibers, glass fibers, and polymeric fibers.

Clause 79: The plate of any of the preceding clauses, wherein the polymeric resin is a thermoset resin or a thermoplastic resin.

Clause 80: The plate of any of the preceding clauses, wherein at least one of the first high tensile strength fibers, the second high tensile strength fibers, and the third high tensile strength fibers are applied in a unidirectional tape.

Clause 81: The plate of any of the preceding clauses, wherein at least one of the first high tensile strength fibers, the second high tensile strength fibers, and the third high tensile strength fibers are applied as a strand of fibers stitched down to a base layer.

Clause 82: The plate of Clause 73, wherein at least two of the first high tensile strength fibers, the second high tensile strength fibers, and the third high tensile strength fibers are applied in a unidirectional tape and the other the first high tensile strength fibers, the second high tensile strength fibers, and the third high tensile strength fibers is applied as a strand of fibers stitched down to a base layer.

Clause 83: The plate of Clause 73, wherein the first high tensile strength fibers, the second high tensile strength fibers, and the third high tensile strength fibers are applied as strands of fibers stitched down to a base layer and each including a different pattern.

Clause 84: The plate of Clause 73, wherein at least one of the first high tensile strength fibers, the second high tensile strength fibers, and the third high tensile strength fibers are applied as a strand of fibers stitched down to a base layer.

Clause 85: The plate of Clause 84, wherein adjacent segments of the strand of fibers are positioned closer to one another across a width of the plate between a medial side and a lateral side at the midfoot region of the plate than at the heel region of the plate to form the first layer.

Clause 86: The plate of Clause 84, wherein adjacent segments of the strand of fibers are positioned closer to one another across a width of the plate between a medial side and a lateral side at the midfoot region of the plate than at the forefoot region of the plate to form the first layer.

Clause 87: A method of forming a plate for an article of footwear, the method comprising applying a first strand portion to a base layer including positioning adjacent segments of the first strand portion to form a first layer on the base layer, the adjacent segments of the first strand portion having a greater density across a width of the plate between a medial side and a lateral side at a midfoot region of the plate than at a forefoot region of the plate and at a heel region of the plate, and applying at least one of heat and pressure to the first strand portion and to the base layer to conform the first strand portion and the base layer to a predetermined shape.

Clause 88: The method of Clause 87, further comprising removing loops of the first strand portion connecting adjacent segments to define an outer edge of the plate.

Clause 89: The method of any of the preceding Clauses, wherein applying the first strand portion to a base layer includes applying the first strand portion to at least one of a substrate and a second layer having a plurality of fibers and/or to a second layer formed from unidirectional tape.

Clause 90: The method of any of the preceding clauses, further comprising positioning a second strand portion on the first layer to form a second layer on the first layer.

Clause 91: The method of Clause 90, wherein applying the first strand portion to the base layer includes applying first stitching that crosses over the first strand portion and penetrates the base layer at first attachment locations that are spaced apart from the first strand portion and positioning the second strand portion on the first layer includes applying second stitching that crosses over the second strand portion, extends through the first strand portion, and penetrates the base layer at second attachment locations.

Clause 92: The method of any of the preceding Clauses, wherein applying the first strand portion to a base layer includes positioning adjacent segments closer to one another across the width of the plate between the medial side and the lateral side at the midfoot region of the plate than at the forefoot region of the plate and at the heel region of the plate.

Clause 93: The method of any of the preceding Clauses, wherein applying the first strand portion to the base layer includes positioning first segments of the first strand portion on the base layer with each first segment having a corresponding length that extends between a corresponding first end proximate to one of the medial side and the lateral side at the forefoot region of the plate and a corresponding second end proximate to the one of the medial side and the lateral side at the heel region of the plate, the first segments being disposed adjacent and substantially parallel to one another.

Clause 94: The method of Clause 93, wherein applying the first strand portion to the base layer includes positioning second segments of the first strand portion on the base layer with each second segment having a corresponding length that extends between a corresponding first end proximate to the other one of the medial side and the lateral side at the forefoot region of the plate and a corresponding second end proximate to the other one of the medial side and the lateral side at the heel region of the plate, the second segments being convergent with the first segments and disposed adjacent and substantially parallel with one another.

Clause 95: The method of Clause 94, wherein positioning the second segments of the first strand portion on the base layer includes crossing the second segments over the first segments within an interior region of the plate at the midfoot region.

Clause 96: The method of Clause 94, wherein positioning the first segments includes positioning each adjacent first segment with a substantially uniform spacing across the corresponding length of the first segments, and positioning the second segments includes positioning each adjacent second segment with a substantially uniform spacing across the corresponding length of the second segments.

Clause 97: The method of any of the preceding Clauses, further comprising forming the first strand portion from a first tow of fibers including at least one of carbon fibers, boron fibers, glass fibers, and polymeric fibers.

Clause 98: The method of any of the preceding Clauses, further comprising consolidating fibers of the first strand portion with a polymeric resin during the application of heat and/or pressure, the polymeric resin being a thermoset resin or a thermoplastic resin.

Clause 99: The method of Clause 87, wherein forming the plate includes forming the plate with the forefoot region including a stiffness of about 80 N/mm to about 90 N/mm, the midfoot region including a stiffness of about 75 N/mm to about 120 N/mm or of about 20 N/mm to about 55 N/mm, and the heel region including a stiffness of about 20 N/mm to about 30 N/mm or of about 50 N/mm to about 60 N/mm.

Clause 100: The method of Clause 87, wherein forming the plate includes forming the plate with the midfoot region including a stiffness of about 60 N/mm to about 70 N/mm, the forefoot region including a stiffness of 95 N/mm to about 105 N/mm or of about 75 N/mm to about 120 N/mm, and the heel region including a stiffness of about 20 N/mm to about 30 N/mm or of about 50 N/mm to about 60 N/mm.

Clause 101: The method of Clause 87, wherein forming the plate includes forming the plate with the heel region including a stiffness of about 35 N/mm to about 45 N/mm, the midfoot region including a stiffness of about 20 N/mm to about 55 N/mm or of about 75 N/mm to about 120 N/mm, and the forefoot region including a stiffness of about 95 N/mm to about 105 N/mm or of about 75 N/mm to about 120 N/mm.

Clause 102: A method of forming a plate for an article of footwear, the method comprising applying a first strand portion to a base layer including positioning adjacent segments of the first strand portion to form a first layer on the base layer, the adjacent segments of the first strand portion having a greater density across a width of the plate between a medial side and a lateral side at a midfoot region of the plate than at a forefoot region of the plate and at a heel region of the plate, and applying at least one of heat and pressure to the first strand portion and to the base layer to conform the first strand portion and the base layer to a predetermined shape.

Clause 103: The method of Clause 102, further comprising removing portions of the segments to define an outer edge of the plate.

Clause 104: The method of Clause 103, wherein removing portions of the segments includes severing the first strand portion at a first end of each segment and severing the first strand portions at a second end of each segment located at an opposite end of the respective first strand portions than the first end.

Clause 105: The method of Clause 103, wherein removing portions of the segments includes removing loops of the first strand portion connecting adjacent segments.

Clause 106: The method of Clause 102, wherein applying the first strand portion to a base layer includes applying the first strand portion to a second layer having a plurality of fibers and/or to a second layer formed from unidirectional tape.

Clause 107: The method of Clause 102, wherein applying the first strand portion to a base layer includes applying the first strand portion to a substrate.

Clause 108: The method of any of the preceding Clauses, wherein applying the first strand portion to a base layer includes applying stitching to attach the first strand portion to the base layer.

Clause 109: The method of Clause 108, wherein applying the stitching includes zigzagging the stitching across the first strand portion between first attachment locations.

Clause 110: The method of Clause 102, further comprising positioning a second strand portion on the first layer to form a second layer on the first layer.

Clause 111: The method of Clause 110, wherein applying the first strand portion to the base layer includes applying first stitching that crosses over the first strand portion and penetrates the base layer at first attachment locations that are spaced apart from the first strand portion and positioning the second strand portion on the first layer includes applying second stitching that crosses over the second strand portion, extends through the first strand portion, and penetrates the base layer at second attachment locations.

Clause 112: The method of any of the preceding Clauses, wherein applying the first strand portion to a base layer includes positioning adjacent segments closer to one another across the width of the plate between the medial side and the lateral side at the midfoot region of the plate than at the forefoot region of the plate.

Clause 113: The method of any of the preceding Clauses, wherein applying the first strand portion to a base layer includes positioning adjacent segments closer to one another across the width of the plate between the medial side and the lateral side at the midfoot region of the plate than at the heel region of the plate.

Clause 114: The method of any of the preceding Clauses, wherein applying the first strand portion to the base layer includes positioning adjacent first segments of the first strand portion on the base layer with each first segment having a corresponding length that extends between a corresponding first end proximate to one of the medial side and the lateral side at the forefoot region of the plate and a corresponding second end proximate to the one of the medial side and the lateral side at the heel region of the plate.

Clause 115: The method of Clause 114, wherein applying the first strand portion to the base layer includes positioning adjacent second segments of the first strand portion on the base layer with each second segment having a corresponding length that extends between a corresponding first end proximate to the other one of the medial side and the lateral side at the forefoot region of the plate and a corresponding second end proximate to the other one of the medial side and the lateral side at the heel region of the plate.

Clause 116: The method of Clause 115, wherein positioning the adjacent first segments and positioning the adjacent second segments includes overlapping the first segments and the second segments with one another within an interior region of the plate at the midfoot region.

Clause 117: The method of Clause 115, wherein positioning the adjacent first segments and positioning the adjacent second segments includes extending the first segments and the second segments substantially parallel to a longitudinal axis of the plate at the midfoot region and diverging the first segments and the second segments away from one another when extending from the midfoot region toward the corresponding first ends at the forefoot region.

Clause 118: The method of Clause 115, wherein positioning the adjacent first segments includes positioning the adjacent first segments with a substantially uniform spacing across the corresponding length of each first segment, and positioning the adjacent second segments includes positioning the adjacent second segments with a substantially uniform spacing across the corresponding length of each second segment.

Clause 119: The method of Clause 115, wherein positioning the adjacent second segments includes positioning the adjacent second segments with a corresponding length longer than a corresponding length of the adjacent first segments.

Clause 120: The method of Clause 115, wherein applying the first strand portion to the base layer includes positioning adjacent third segments of the first strand portion on the base layer between the first segments and the second segments with each third segment having a corresponding length that extends between a corresponding first end at the forefoot region of the plate and a corresponding second end at the heel region of the plate.

Clause 121: The method of Clause 120, wherein positioning the adjacent third segments of the first strand portion includes positioning the adjacent third segments with a corresponding length that is different than the corresponding lengths of the first segments and the third segments.

Clause 122: The method of any of the preceding Clauses, wherein applying the first strand portion to a base layer includes applying a continuous strand.

Clause 123: The method of Clause 122, wherein applying a continuous strand of the first strand portion includes forming loops of the first strand portion.

Clause 124: The method of Clause 123, further comprising removing the loops between adjacent segments of the first strand portion to define an outer edge of the plate.

Clause 125: The method of any of the preceding Clauses, further comprising forming the first strand portion from a first tow of fibers.

Clause 126: The method of Clause 124, wherein forming the first strand portion from a first tow of fibers includes forming the first strand portion from at least one of carbon fibers, boron fibers, glass fibers, and polymeric fibers.

Clause 127: Further comprising incorporating the plate into an article of footwear.

Clause 128: The method of any of the preceding Clauses, further comprising consolidating fibers of the first strand portion with a polymeric resin.

Clause 129: The method of Clause 128, wherein consolidating the fibers with a polymeric resin is performed during the application of heat and/or pressure.

Clause 130: A plate for an article of footwear, the plate comprising: a first layer including a first prepreg fiber sheet having fibers positioned at $-15°$ or $-30°$ relative to a longitudinal axis of the plate; a second layer disposed on the first layer and including a second prepreg fiber sheet having fibers positioned at $15°$ relative to the longitudinal axis of the plate; a third layer disposed on the second layer and including a first strand portion having adjacent first segments positioned closer to one another across a width of the plate between a medial side and a lateral side at a midfoot region of the plate than at a forefoot region of the plate; a fourth layer disposed on the third layer and including a second strand portion having adjacent second segments positioned closer to one another across the width of the plate between the medial side and the lateral side at the midfoot region of the plate than at the forefoot region of the plate; a fifth layer disposed on the fourth layer and including a third prepreg fiber sheet having fibers positioned at $-15°$ or $-30°$ relative to the longitudinal axis of the plate; and a sixth layer disposed on the fifth layer and including a fourth prepreg fiber sheet having fibers positioned at $15°$ relative to the longitudinal axis of the plate, wherein a stiffness of the plate is greater at the midfoot region of the plate than at the forefoot region of the plate and at the heel region of the plate.

Clause 131: The plate of Clause 130, further comprising a polymeric resin consolidating the first prepreg fiber sheet, the second prepreg fiber sheet, the first strand portion, the second strand portion, the third prepreg fiber sheet, and the fourth prepreg fiber sheet.

Clause 132: The plate of any of the preceding Clauses, wherein the first prepreg fiber sheet, the second prepreg fiber sheet, the first strand portion, the second strand portion, the third prepreg fiber sheet, and the fourth prepreg fiber sheet include at least one of carbon fibers, boron fibers, glass fibers, and polymeric fibers.

Clause 133: The plate of Clause 132, wherein the first prepreg fiber sheet, the second prepreg fiber sheet, the third prepreg fiber sheet, and the fourth prepreg fiber sheet include glass fibers.

Clause 134: The plate of Clause 132, wherein the first prepreg fiber sheet, the second prepreg fiber sheet, the third prepreg fiber sheet, and the fourth prepreg fiber sheet include carbon fibers.

Clause 135: The plate of any of the preceding Clauses, wherein the first prepreg fiber sheet, the second prepreg fiber sheet, the third prepreg fiber sheet, and the fourth prepreg fiber sheet are applied in a unidirectional tape.

Clause 136: The plate of any of the preceding Clauses, wherein the polymeric resin is a thermoset resin or a thermoplastic resin.

Clause 137: The plate of any of the preceding Clauses, wherein a stiffness of the heel region is about 15-percent (15%) to about 35-percent (35%) or about 20-percent (20%) to about 30-percent (30%) of a stiffness of the midfoot region.

Clause 138: The plate of any of the preceding Clauses, wherein a stiffness of the forefoot region is about 40-percent (40%) to about 60-percent (60%) or about 45-percent (45%) to about 55-percent (55%) of a stiffness of the midfoot region.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A plate for an article of footwear, the plate comprising:
   a base layer having a peripheral edge defining a medial side and a lateral side extending between a heel region and a forefoot region;
   a first strand portion attached to the base layer via first stitching that crosses over the first strand portion and penetrates the base layer at first attachment locations that are spaced apart from the first strand portion, the first strand portion including adjacent segments that form a first layer on the base layer, the adjacent segments of the first strand portion having a greater density across a width of the plate between the medial side and the lateral side at a midfoot region of the plate than at the forefoot region of the plate and at the heel region of the plate; and
   a second strand portion disposed on the first layer to form a second layer on the first layer, the second strand portion attached to the base layer via second stitching that (i) crosses over the second strand portion, (ii) extends through the first strand portion, and (iii) penetrates the base layer at second attachment locations.

2. The plate of claim 1, wherein the base layer includes at least one of (i) a substrate, (ii) a second layer having a plurality of fibers, and (ii) a second layer formed from unidirectional tape.

3. The plate of claim 1, wherein adjacent segments of the first strand portion are disposed closer to one another across the width of the plate between the medial side and the lateral side at the midfoot region of the plate than at the forefoot region of the plate and at the heel region of the plate.

4. The plate of claim 1, wherein the first strand portion is formed from a first tow of fibers including at least one of carbon fibers, boron fibers, glass fibers, and polymeric fibers.

5. The plate of claim 4, wherein fibers of the first strand portion are consolidated with a polymeric resin during application of heat and/or pressure, the polymeric resin being a thermoset resin or a thermoplastic resin.

6. The plate of claim 1, wherein the plate includes a stiffness in the forefoot region of 80 N/mm to 90 N/mm, a stiffness in the midfoot region of 75 N/mm to 120 N/mm or of 20 N/mm to 55 N/mm, and a stiffness in the heel region of 20 N/mm to 30 N/mm or of 50 N/mm to 60 N/mm.

7. The plate of claim 1, wherein the plate includes a stiffness in the midfoot region of 60 N/mm to 70 N/mm, a stiffness in the forefoot region of 95 N/mm to 105 N/mm or of 75 N/mm to 120 N/mm, and a stiffness in the heel region of 20 N/mm to 30 N/mm or of 50 N/mm to 60 N/mm.

8. A plate for an article of footwear, the plate comprising:
   a base layer having a peripheral edge defining a medial side and a lateral side extending between a heel region and a forefoot region;
   a first strand portion attached to the base layer via first stitching that crosses over the first strand portion and penetrates the base layer at first attachment locations that are spaced apart from the first strand portion, the first strand portion including adjacent segments that form a first layer on the base layer, the adjacent segments of the first strand portion disposed closer to one another across the width of the plate between the medial side and the lateral side at a midfoot region of the plate than at the forefoot region of the plate and at the heel region of the plate; and
   a second strand portion disposed on the first layer to form a second layer on the first layer, the second strand portion attached to the base layer via second stitching that (i) crosses over the second strand portion, (ii) extends through the first strand portion, and (iii) penetrates the base layer at second attachment locations.

9. The plate of claim 8, wherein the base layer includes at least one of (i) a substrate, (ii) a second layer having a plurality of fibers, and (ii) a second layer formed from unidirectional tape.

10. The plate of claim 8, wherein the first strand portion is formed from a first tow of fibers including at least one of carbon fibers, boron fibers, glass fibers, and polymeric fibers.

11. The plate of claim 10, wherein fibers of the first strand portion are consolidated with a polymeric resin during application of heat and/or pressure, the polymeric resin being a thermoset resin or a thermoplastic resin.

12. The plate of claim 8, wherein the plate includes a stiffness in the forefoot region of 80 N/mm to 90 N/mm, a stiffness in the midfoot region of 75 N/mm to 120 N/mm or of 20 N/mm to 55 N/mm, and a stiffness in the heel region of 20 N/mm to 30 N/mm or of 50 N/mm to 60 N/mm.

13. The plate of claim 8, wherein the plate includes a stiffness in the midfoot region of 60 N/mm to 70 N/mm, a stiffness in the forefoot region of 95 N/mm to 105 N/mm or of 75 N/mm to 120 N/mm, and a stiffness in the heel region of 20 N/mm to 30 N/mm or of 50 N/mm to 60 N/mm.

14. The plate of claim 8, wherein the plate includes a stiffness in the heel region of 35 N/mm to 45 N/mm, a stiffness in the midfoot region of 20 N/mm to 55 N/mm or of 75 N/mm to 120 N/mm, and a stiffness in the forefoot region of 95 N/mm to 105 N/mm or of 75 N/mm to 120 N/mm.

* * * * *